United States Patent
Martz et al.

(10) Patent No.: US 12,144,703 B2
(45) Date of Patent: Nov. 19, 2024

(54) TOOTH-POSITIONING APPLIANCE, SYSTEMS AND METHODS OF PRODUCING AND USING THE SAME

(71) Applicant: Archform Inc., Bakersfield, CA (US)

(72) Inventors: Martin G. Martz, Bakersfield, CA (US); Andrew S. Martz, Bakersfield, CA (US)

(73) Assignee: Archform Inc., Sunnyvale, CA (US)

( * ) Notice: Subject to any disclaimer, the term of this patent is extended or adjusted under 35 U.S.C. 154(b) by 0 days.

(21) Appl. No.: 16/417,512

(22) Filed: May 20, 2019

(65) Prior Publication Data

US 2019/0321136 A1   Oct. 24, 2019

Related U.S. Application Data

(63) Continuation-in-part of application No. 15/260,026, filed on Sep. 8, 2016, and a continuation-in-part of application No. 15/936,757, filed on Mar. 27, 2018, now Pat. No. 10,292,789, which is a continuation of application No. 14/566,474, filed on Dec. 10, 2014, now Pat. No. 9,937,018.

(60) Provisional application No. 62/215,377, filed on Sep. 8, 2015, provisional application No. 61/914,832, filed on Dec. 11, 2013.

(51) Int. Cl.
*A61C 7/08* (2006.01)
*A61C 7/14* (2006.01)
*A61C 7/22* (2006.01)

(52) U.S. Cl.
CPC .................. *A61C 7/08* (2013.01); *A61C 7/14* (2013.01); *A61C 7/22* (2013.01)

(58) Field of Classification Search
CPC .................................... A61C 7/08; A61C 7/10
See application file for complete search history.

(56) References Cited

U.S. PATENT DOCUMENTS

| | | | |
|---|---|---|---|
| 3,237,305 A | 3/1966 | Hegedus | |
| 3,593,421 A | 7/1971 | Brader | |
| 3,762,050 A | 10/1973 | Dal Pont | |
| 3,988,832 A | 11/1976 | Wallshein | |
| 4,793,803 A | 12/1988 | Martz | |
| 4,880,380 A * | 11/1989 | Martz | A61C 7/12 433/11 |

(Continued)

FOREIGN PATENT DOCUMENTS

KR   200465679 Y1   3/2013

OTHER PUBLICATIONS

International Search Report from PCT Appln. No. PCT/US2016/050787, mailed Jan. 6, 2017, 6 pages.

(Continued)

*Primary Examiner* — Edward Moran
(74) *Attorney, Agent, or Firm* — Cognition IP, P.C.; Edward Steakley

(57) ABSTRACT

Tooth-positioning appliances and apparatuses, components, methods, and techniques for producing and using tooth-positioning appliances are provided. An example tooth-positioning appliance for adjusting the position of teeth of a patient includes a tooth-clasping arrangement shaped to secure the orthodontic appliance to at least one tooth and a flexible arrangement connected to the tooth-clasping arrangement. The flexible arrangement is less rigid than the tooth-clasping arrangement.

11 Claims, 47 Drawing Sheets

(56) References Cited

U.S. PATENT DOCUMENTS

| | | | |
|---|---|---|---|
| 4,976,614 A | 12/1990 | Tepper | |
| 5,055,039 A | 10/1991 | Abbatte et al. | |
| 5,145,364 A | 9/1992 | Martz et al. | |
| 5,310,340 A | 5/1994 | Zedda | |
| 6,299,440 B1 | 10/2001 | Phan et al. | |
| 6,572,372 B1 | 6/2003 | Phan et al. | |
| 7,234,934 B2 | 6/2007 | Rosenberg | |
| 8,292,617 B2 | 10/2012 | Brandt et al. | |
| 8,517,726 B2 | 8/2013 | Kakavand et al. | |
| 8,708,697 B2 | 4/2014 | Li et al. | |
| 9,119,691 B2 | 9/2015 | Namiranian et al. | |
| 9,795,460 B2 | 10/2017 | Martz et al. | |
| 10,555,792 B2 * | 2/2020 | Kopelman | A61C 7/002 |
| 2001/0041320 A1 * | 11/2001 | Phan | B29C 51/002 |
| | | | 433/6 |
| 2002/0106604 A1 | 8/2002 | Phan et al. | |
| 2002/0187451 A1 * | 12/2002 | Phan | A61C 7/00 |
| | | | 433/6 |
| 2003/0190576 A1 | 10/2003 | Phan et al. | |
| 2004/0048222 A1 | 3/2004 | Forster et al. | |
| 2004/0067463 A1 | 4/2004 | Rosenberg | |
| 2004/0170941 A1 | 9/2004 | Phan et al. | |
| 2005/0186524 A1 * | 8/2005 | Abolfathi | A61C 7/10 |
| | | | 433/7 |
| 2005/0233276 A1 | 10/2005 | Kopelman et al. | |
| 2006/0068354 A1 | 3/2006 | Jeckel | |
| 2006/0188834 A1 | 8/2006 | Hilliard | |
| 2007/0231765 A1 | 10/2007 | Phan et al. | |
| 2009/0098500 A1 | 4/2009 | Diaz | |
| 2010/0068671 A1 | 3/2010 | Kakavand et al. | |
| 2010/0279245 A1 * | 11/2010 | Navarro | A61C 7/08 |
| | | | 433/10 |
| 2011/0020761 A1 | 1/2011 | Kalili | |
| 2011/0136072 A1 | 6/2011 | Li et al. | |
| 2011/0311937 A1 | 12/2011 | McCance | |
| 2012/0095732 A1 | 4/2012 | Fisker et al. | |
| 2012/0129117 A1 | 5/2012 | McCance | |
| 2012/0150494 A1 | 6/2012 | Anderson et al. | |
| 2013/0230819 A1 | 9/2013 | Arruda | |
| 2014/0363779 A1 | 12/2014 | Kopelman | |
| 2015/0216627 A1 | 8/2015 | Kopelman | |
| 2015/0265376 A1 | 9/2015 | Kopelman | |
| 2015/0305832 A1 | 10/2015 | Patel | |
| 2015/0366637 A1 | 12/2015 | Kopelman et al. | |
| 2015/0366638 A1 | 12/2015 | Kopelman et al. | |
| 2016/0310236 A1 * | 10/2016 | Kopelman | G06F 30/00 |
| 2018/0014912 A1 * | 1/2018 | Radmand | A61C 5/007 |
| 2018/0368944 A1 * | 12/2018 | Sato | A61C 7/10 |

OTHER PUBLICATIONS

Extended European Search Report for European Application No. 16845053.4, mailed May 9, 2019, 9 pages.

* cited by examiner

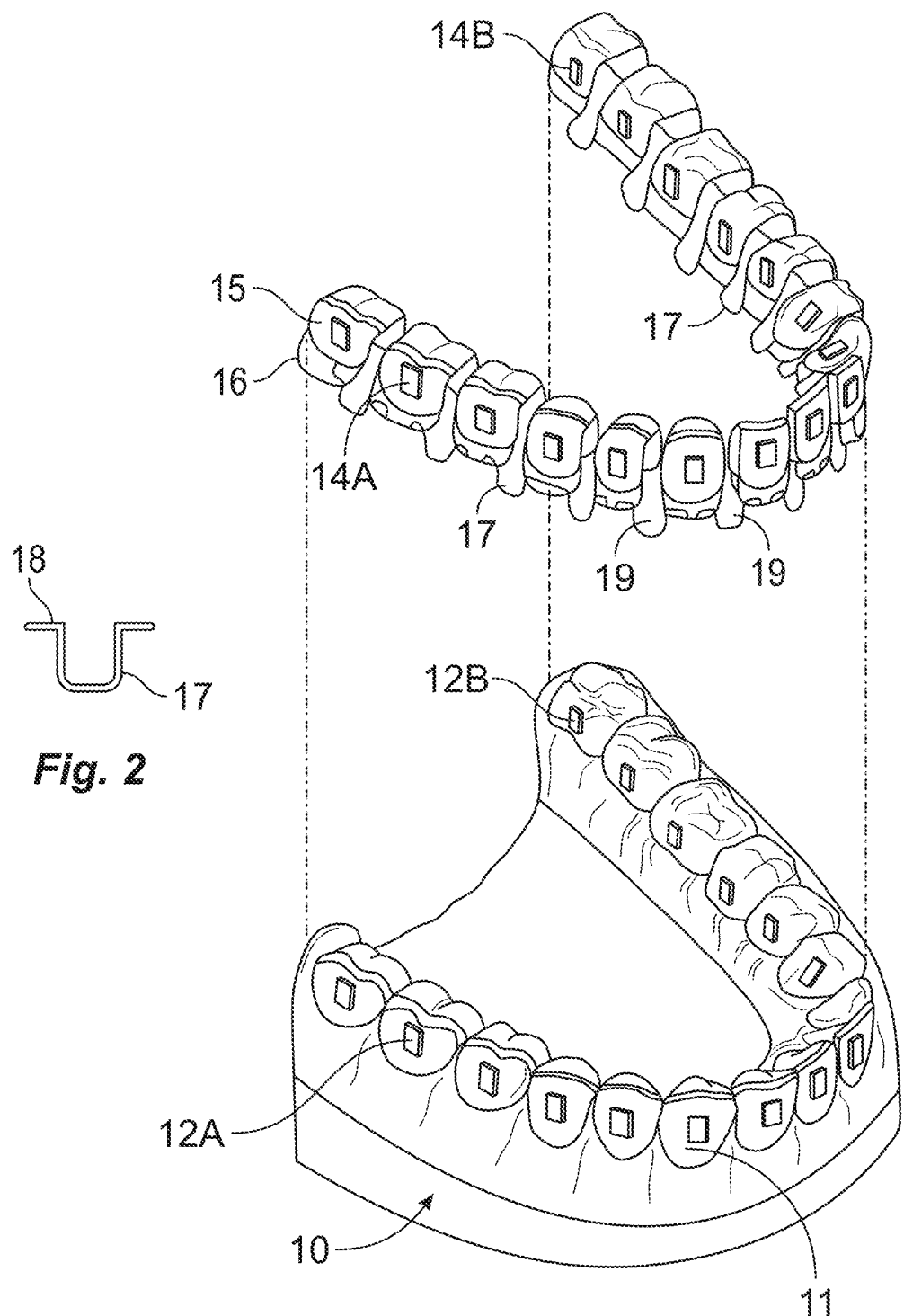

Fig. 14
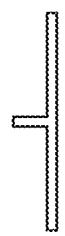
Fig. 15
Fig. 16
Fig. 17
Fig. 18
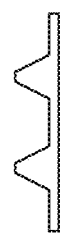
Fig. 19
Fig. 20
Fig. 21

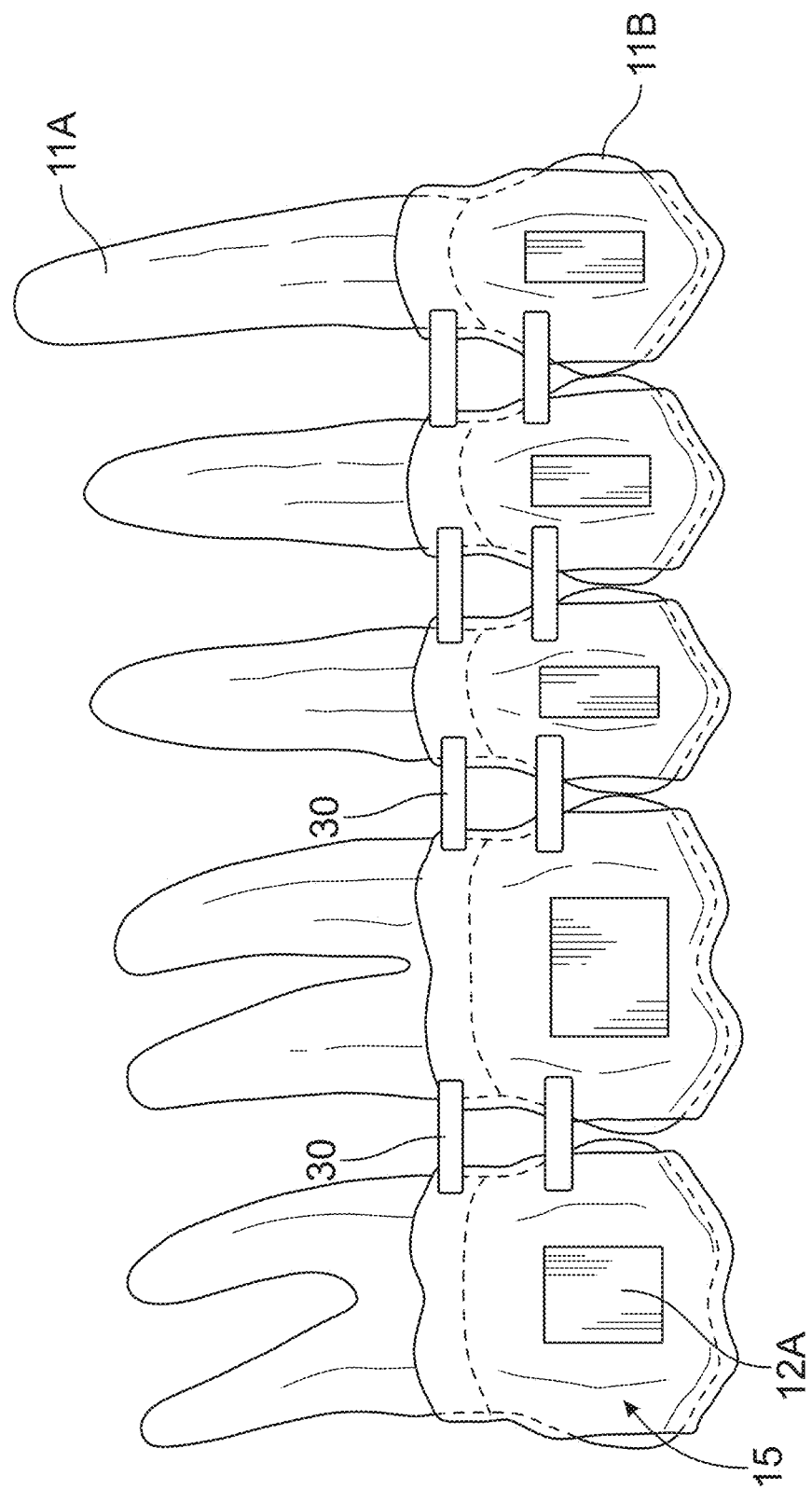

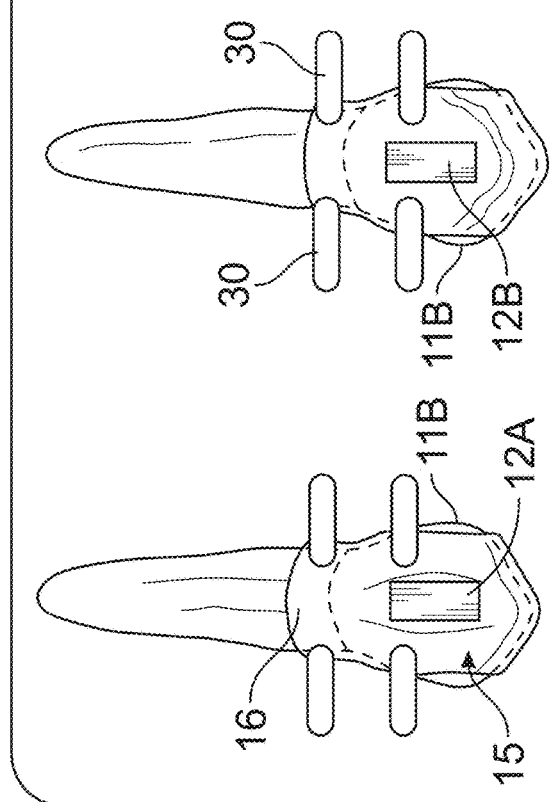
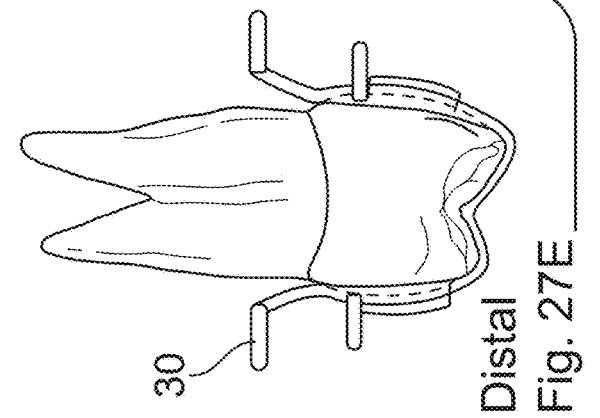
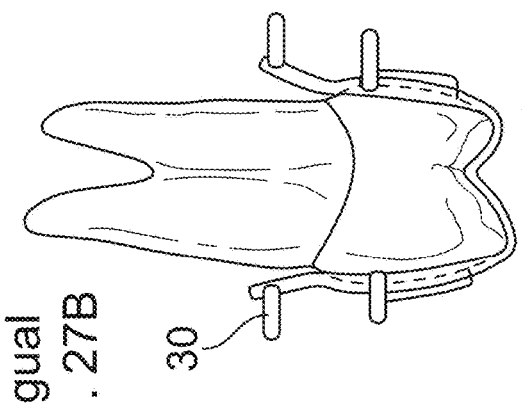
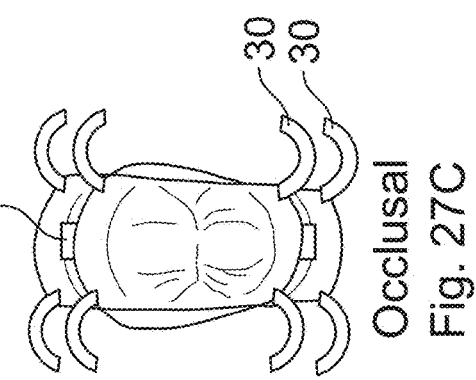
Figs. 27A-27E
Buccal Fig. 27A
Lingual Fig. 27B
Occlusal Fig. 27C
Mesial Fig. 27D
Distal Fig. 27E

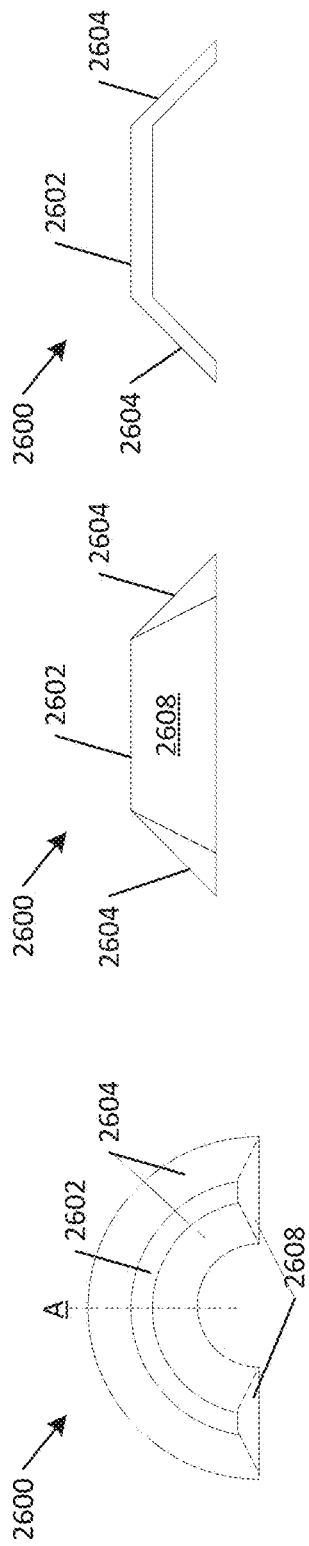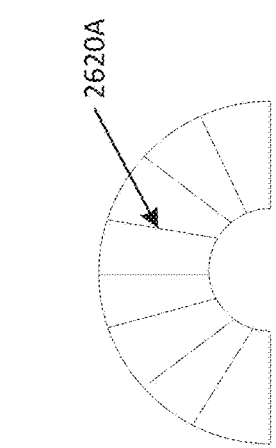
FIG. 62A  FIG. 62B  FIG. 62C
FIG. 62D  FIG. 62E  FIG. 62F
FIG. 62G  FIG. 62H  FIG. 62I

TOOTH-POSITIONING APPLIANCE, SYSTEMS AND METHODS OF PRODUCING AND USING THE SAME

CROSS REFERENCE TO RELATED APPLICATION

This application is a continuation-in-part of and claims priority to U.S. patent application Ser. No. 15/260,026, titled "TOOTH-POSITIONING APPLIANCE, SYSTEMS AND METHODS OF PRODUCING AND USING THE SAME," filed on Sep. 8, 2016, which claims priority to U.S. Patent Application Ser. No. 62/215,377, titled "TOOTH-POSITIONING APPLIANCE," filed on Sep. 8, 2015; and U.S. patent application Ser. No. 15/936,757, titled "TOOTH POSITIONING APPLIANCE WITH CURVED INTERCONNECTING ELEMENTS," filed on Mar. 27, 2018, which claims priority to U.S. patent application Ser. No. 14/566,474, titled "TOOTH POSITIONING APPLIANCE WITH CURVED INTERCONNECTING ELEMENTS," filed on Dec. 10, 2014, which claims priority to U.S. Patent Application Ser. No. 61/914,832, titled "TOOTH POSITIONING APPLIANCE WITH U-SHAPED INTERCONNECTING ELEMENTS," filed on Dec. 11, 2013, the disclosures of which are hereby incorporated by reference in their entirety.

FIELD OF THE DISCLOSURE

The present disclosure relates generally to the field of orthodontics. More specifically, a tooth-positioning appliance with a tooth-clasping assembly for engaging one or more teeth and a flexible assembly for flexibly joining portions of the tooth-clasping assembly.

BACKGROUND

A wide variety of orthodontic aligners have been used for many years in repositioning teeth during orthodontic treatment. It should be noted that the terms "aligner," "positioner," "tooth-positioning appliance" and "orthodontic appliance" are largely synonymous as used in the orthodontic field.

This type of orthodontic treatment typically uses separate tooth-positioning appliances for the upper and lower teeth. The tooth-positioning appliances fit over the teeth, covering at least some of the facial and lingual surfaces of some or all of the teeth, and often at least some of the occlusal, or biting surfaces of the teeth. The early positioners described in the prior art were made from a set of plaster models derived from three-dimensional negative dental impressions of the patient's teeth. The plaster dental models were modified by cutting the teeth apart using a small jeweler's saw or rotary cutting discs, followed by repositioning the plaster teeth in a better, straighter, desired arrangement, and then holding the teeth in the new arrangement with dental wax. The reset teeth molds provide the basis for manufacturing the positioners. The resilience of the material from which the positioner is made provides the energy to move the teeth from their original position toward the new straightened position. From the earliest disclosure of the tooth positioner, many of the proposed designs in the prior art have shown moving the teeth in a series of incremental steps. Making a series of appliances is difficult if the tooth arrangement for each step must be made by hand using plaster and wax.

Starting in the early 1990s, digital technologies have begun to provide orthodontists with fundamentally new tools for delivering orthodontic treatment by fabricating tooth models in small but accurate incremental steps. Commercially-available CAD/CAM software can produce the desired tooth models, from which a progressive series of appliances can be manufactured. These tools include 3D imaging of the patient's dentition, and CAD/CAM (computer-aided design and manufacturing) systems for creating virtual models in orthodontic treatment to then produce customized orthodontic appliances.

An example of the successful orthodontic application of these digital technologies is seen in the commercial service known as the Invisalign® program by Align Technology, Inc. of San Jose, California. The Invisalign program is largely based on U.S. Pat. No. 5,975,893 (Chishti et al.) and many related patents, including U.S. Pat. No. 6,398,548 (Muhammad et al.). Invisalign tooth positioners are a progressive series of thin, transparent plastic appliances formed over computer-generated forming patterns grown from a virtual model of the patient's dental anatomy. The process for forming aligners uses a combination of vacuum, pressure and heat. This forming process is informally referred to within the orthodontic laboratory community as the "suck down" process.

In one process for producing a series of Invisalign-type tooth aligners, a technician first scans a patient's upper and lower model set to obtain CAD-manipulatable virtual models of a patient's dental anatomy. A model set normally consists of one upper and one lower plaster model of the teeth, palate, and gums. Once the virtual model of the original malocclusion has been obtained, a technician will then undertake steps involving extensive manipulation of the virtual malocclusion. This involves extensive repositioning of the teeth according to a comprehensive and sequential procedure, ultimately arriving at a finished or ideal occlusion for that patient. The finished occlusion in the virtual model is consistent with the complete repositioning of the patient's upper and lower occlusion that would result at the end of successful conventional orthodontic treatment. After the steps described above are accomplished, the technician possesses two versions of the patient's teeth available within the virtual CAD environment. One version represents the original malocclusion and the other represents the ideal occlusion. In other words, the technician has the beginning and the end states.

The next step in the process involves the creation of an incremental, progressive series of physical forming models. Each of these forming models represents a snapshot of the patient's future occlusion at specific incremental steps along the patient's proposed treatment sequence between the beginning and the end conditions as described above. To accomplish this, the technician creates a virtual "first transition model" that sees a slight repositioning of all or most of the teeth. This first transition model sees some or all of the teeth being subtly moved from their original pre-treatment positions to a virtual first transition position that is in the direction of their intended finished positions. Similarly, a second virtual transition model is created that sees the virtual teeth being moved again slightly further in the desired directions. The objective of the technician is to create a series of progressive models, with each biased slightly further than the previous one, and each moving the teeth slightly closer to their finished target positions. A final forming model will take the teeth from the series of transition positions and move them into their final, desired positions.

Once such a series of virtual intermediate forming models has been created and a final forming model has been created by the technician, digital code representing each of the models in the series is directed to operate a rapid prototyping machine. Within a rapid prototyping machine, the series of physical forming models are produced using any of a number of conventional processes, such as computer numerically-controlled (CNC) machining, stereo lithography or 3D printing. The production step results in the production of hard, physical duplicates of each of the series of virtual intermediate models and the final model.

The next step of the process sees each of the series of physical models being in turn mounted in a vacuum machine (also referred to as a suck-down machine) where a combination of pressure, heat, and vacuum is used to form the actual series of progressive aligners from plastic sheet material of a constant thickness. Once the series of progressive aligners are formed and trimmed, they are sequentially labeled, packaged, and shipped to the attending orthodontist. The orthodontist then schedules an appointment for the patient, at which time the aligners and instructions for their use are given to the patient. The patient is instructed to wear the first set of aligners for a period of time, typically two weeks. After that, the first set is discarded and the patient transitions to the next set of the series and so on.

The aligners serve to urge the patient's teeth to move according to the positional biases created virtually by the technician. The teeth are progressively biased and urged to move in desired directions toward their predetermined finished positions by the resilience of the polymeric material of the aligner. Ideally, gentle but continuous forces would be delivered by the aligners, causing certain physiological processes involving the creation and resorbtion of the bone supporting the roots of the teeth to take place. The net result should be the slow, progressive orthodontic movement of the roots of the teeth through the underlying bone toward desirable positions and orientations.

Many conventional removable aligners are limited by their design and the mechanical properties of the clear thermoplastic materials that are currently utilized. Clear polymeric materials make the aligner nearly invisible, and that is a great advantage over fixed stainless steel hardware and metal braces. On the other hand, conventional polymeric materials used in forming aligners have a very limited ability to flex in all directions. This is particularly problematic when aligning teeth that are not fairly well lined up in the beginning of treatment. Recent published studies have shown that each stage of conventional aligners deliver fairly high forces when they are first delivered, and then the applied forces diminish rapidly. This results in intermittent force delivery rather than the desired light continuous, gentle forces.

Even when very small movements during each stage are attempted, the appliance may fail to properly engage teeth that need to be moved because the appliance is not adequately flexible and is not designed to allow movement within the plane of the material. If a particular aligner fails to properly engage a tooth, then that tooth will not move to the proper place to engage the next successive aligner in the series. The only present solutions available when aligners fail to properly engage a tooth are: (1) reduce the amount of movement attempted for that particular stage; or (2) place a larger bonded attachment on the tooth. Both of these solutions typically require reworking the computerized treatment plan. If the plan is not revised, with each successive stage of the appliance, the fit of the aligners deteriorates, and after just a few stages, it becomes obvious that the teeth are not moving according to the original computerized treatment plan, forcing a revision of the treatment plan. The ability of the appliance to precisely engage individual teeth, whether they are to be moved, or if they are to be used as anchor teeth to assist in the movement of other teeth is critical to the success of orthodontic treatment.

SUMMARY

This disclosure provides an orthodontic appliance having a thin elastomeric shell with a series of recesses for removably receiving a number of the patient's teeth, and tooth-clasping elements (also referred to as a tooth-clasping portion) for removably engaging selected teeth. The appliance also incorporates a number of flexible zones created by flexible patterns in the shell to allow enhanced flexibility in selected zones of the appliance. For example, the flexible zones can be created by 3D printing a pattern of voids, folds, or areas of reduced thickness in the shell of the appliance.

In some implementations, the present disclosure seeks to overcome the limitations of the lack of flexibility of the appliance material by providing a tooth-clasping element for each tooth that is connected by curved interconnecting elements to the tooth-clasping elements of nearby teeth. The curved interconnecting elements are flexible enough to allow each tooth-clasping element to remain firmly engaged in place. The flexible properties of the interconnecting elements are controlled by the choice of materials, by the cross-section of the interconnecting elements, and by the shape of the interconnecting elements. In some implementations, the shape of the interconnecting elements is a small radius loop configuration, where the radius of the loop may be about half of the width of the tooth.

These and other advantages, features, and objects of the present disclosure will be more readily understood in view of the following detailed description and the drawings.

BRIEF DESCRIPTION OF THE DRAWINGS

The present disclosure can be more readily understood in conjunction with the accompanying drawings, in which:

FIG. 1 is a perspective view of a lower dental arch 10 with the present appliance positioned above it. The U-shaped wire interconnecting elements 17 are shown on both buccal and lingual sides of the teeth 11. Dotted lines indicate the path the appliance would follow to be seated in place on the teeth 11.

FIG. 2 is a front elevational view of an interconnecting element 17 having flattened ends 18.

FIG. 4A is a buccal view. FIG. 4B is a lingual view. FIG. 4C is an occlusal view. FIG. 4D is a mesial view. FIG. 4E is a distal view.

FIG. 6 illustrates an initial view of unmoved tooth, with CR and CC points located. FIG. 7 shows lingual root tipping movement with crown center remaining stationary. FIG. 8 shows a buccal crown tipping movement with center of resistance remaining stationary. FIG. 9 indicates horizontal transverse translational (bodily) movement without tipping.

FIGS. 14-21 show cross-sectional views of interconnecting elements with a variety of shapes for the added support ridges 43, 44. FIG. 14 shows two rectangular projections to form a C-shape. FIG. 15 shows a single rectangular projection to form a T-shape. FIG. 16 shows double rectangular projections. FIG. 17 shows two rectangular projections to form an I-shape. FIG. 18 shows two tapered projections to form a C-shape. FIG. 19 shows a single tapered projection to form a T-shape. FIG. 20 shows double tapered projections. FIG. 21 shows double tapered projections on each side to form an I-shape.

FIG. 26 shows a side view of the appliance fitted on some of the teeth in the upper right quadrant.

FIGS. 27A-27E shows views from five different directions of a single tooth (upper right first premolar) with bonded attachments 12A and 12B, a tooth-clasping element 15, and small, curved flexible interconnecting elements 30 in place. FIG. 27A is a buccal view. FIG. 27B is a lingual view. FIG. 27C is an occlusal view. FIG. 27D is a mesial view. FIG. 27E is a distal view.

FIGS. 62A-62I illustrate various embodiments of flexible interconnecting elements. FIG. 62A illustrates an implementation of a flexible interconnecting element with a tapered shape from a top view. FIG. 62B illustrates the implementation of FIG. 62A from a side view. FIG. 62C illustrates the implementation of FIG. 62A from a cross sectional view (at the line A shown in FIG. 62A). FIG. 62D is a cross-sectional illustration of a flexible interconnecting element geometry. FIG. 62E is a cross-sectional illustration of a flexible interconnecting element geometry. FIG. 62F is a cross-sectional illustration of a flexible interconnecting element geometry. FIG. 62G is an illustration of a top view of a flexible interconnecting element geometry that has a curved shape that includes ridges. FIG. 62H is an illustration of a top view of a flexible interconnecting element geometry that has a rectangular shape and includes ridges. FIG. 62I is an illustration of a top view of a flexible interconnecting element geometry that has a rectangular shape and includes a patterned region.

DETAILED DESCRIPTION

The present disclosure addresses the problem of the lack of flexibility within the shell of the appliance by replacing portions of the shell with a flexible pattern to create zones of enhanced flexibility. For example, these appliances can be produced with flexible zones. The patterns can be produced by a rapid prototyping machine, such as a digital 3D printer, or using thermoforming technology. Alternatively, the flexible patterns could be created in a shell of plastic material by using a numerically-controlled milling machine, or the shape of the appliance and the patterns can be constructed by hand using manual cutting tools or by using rotary-cutting instruments.

A wide variety of flexible patterns are available. The location of the flexible zones can be anywhere on the appliance, but should provide flexure and force application for intended and effective tooth movement. The flexibility of the zones depends on many factors including: the geometry of the pattern chosen, the physical properties of material, and the size and orientation of the patterned area. The flexible zone of the appliance can be designed to provide various types of flexure, including elongation and compression, flexure in and out of the plane of the appliance, and twisting or bending movements. The present disclosure can be employed to accomplish all types of tooth movements that can be accomplished using other types of orthodontic appliances including both fixed and removable appliances. These movements include vertical movements, tipping movements, horizontal bodily movements without tipping, rotational movements, space closure, space opening, intrusion and extrusion of individual teeth or groups of teeth.

Turning to FIG. 1, the present tooth positioning appliance includes the following major elements: (1) bonded attachments 12A, 12B bonded to the lingual or buccal surfaces of selected teeth 11; (2) tooth-clasping elements 15 removably engaging the bonded attachments 12A, 12B; and (3) curved interconnecting elements 17 extending between adjacent tooth-clasping elements 15. In particular, the tooth-clasping elements 15 include recesses designed to fit over projecting elements or buttons called "bonded attachments" 12A, 12B that are bonded directly to the teeth. The bonded attachments 12A, 12B are not typically removable by the patient during the course of active orthodontic treatment.

It is desirable to have the tooth-clasping elements 15 on the front teeth made of a clear polymeric material. Currently, several different plastic materials including urethanes and polycarbonates can be thermoformed over tooth models to produce the desired tooth alignment appliances. The material can be any suitable material. It should also be noted that the tooth-clasping element 15 can be a separately manufactured part or a functional region of a single-piece appliance.

Figure 5:
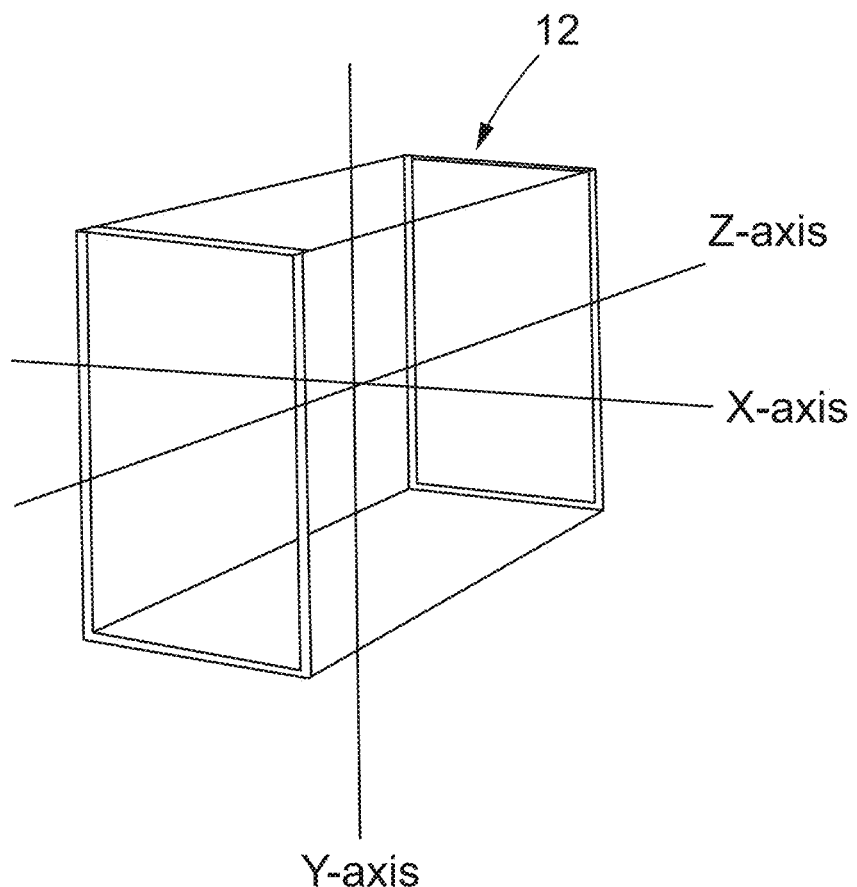
FIG. 5 shows a 3-dimensional view of a rectangular bonded attachment 12A with the X, Y, and Z axes indicated.

The bonded attachments 12A, 12B are typically bonded to the buccal or lingual surfaces of selected teeth 11, as shown in FIG. 1. For example, the bonded attachments can have a substantially rectangular shape with parallel sides, as shown in FIG. 5, although it is to be understood that there are many possible shapes for bonded attachments that would be suitable. The bonded attachments 12A, 12B are utilized for two purposes: (1) the bonded attachments 12A, 12B increase the retention of the tooth-clasping elements 15 to the teeth 11, (or in other words, the appliance is less likely to become dislodged from the desired location on the teeth); and (2) the bonded attachments 12A, 12B have a shape that allows the tooth-clasping elements 15 to transmit desired forces to the teeth in three-dimensions, thereby providing control over root movement. In the rectangular bonded attachment 12A shown in FIG. 5, the parallel outer edges of the attachment 12A provide surfaces for positive engagement to allow forces to be applied to the teeth to accomplish root movement under control. Inner surfaces of an attached projection such as can be provided by grooves or special shapes can also provide this control. Grooves or special outside shaping can help guide the tooth-clasping element into position. The bonded attachments can be pre-made of any suitable material including dental composite, clear or tooth-colored ceramic materials, or any suitable clear plastic material. The attachments 12A can be bonded to the teeth using conventional bonding techniques and adhesives that are well-known in the art including the steps of mildly acid-etching the enamel prior to bracket placement. A technique well known in the art called indirect bonding can be utilized, with a pre-formed guide made of flexible material holding the attachments in the desired position while the adhesive is curing to ensure accurate attachment placement on the teeth. The bonded attachments can alternatively be fabricated out of dental composite using pre-made hand-held molds for one tooth at a time placement, commercially available for this purpose. A third alternative is to utilize a mold made using 3D CAD/CAM technology, where the shape and the size of the bonded attachments are planned in the computer and a model of the entire dental arch with attachments in place is printed using a 3-D printer. From this model, a mold is made from which to fabricate and place dental composite attachments in precisely the right location directly on the teeth.

Preferably, the tooth-clasping elements 15 include a hole of precise dimensions (e.g., a rectangular hole) through which the bonded attachment 12A, 12B projects to removably engage the tooth-clasping element 15. Alternatively, a recess on the inside of the tooth-clasping element 15 of exactly the same shape and size as the bonded attachment 12A, 12B should work equally as well, particularly if the tooth-clasping element 15 is printed, because of the ability of the printing process to produce a more precise fit than can be obtained by thermoforming.

The tooth-clasping elements 15 may be attached to flexible curved interconnecting elements 17 of many types, as illustrated in the drawings. In some embodiments of the present invention, the appliances are made of one piece of material, and the tooth-clasping element and the flexible interconnecting elements are all part of a monolithic whole unit. Functionally, different regions of the single-piece positioner serve as the tooth-clasping element 15 and the flexible interconnecting elements 17. Some example embodiments of appliances that include tooth-clasping elements and flexible interconnecting elements are illustrated and described with respect to FIGS. 37-42. In at least some of these embodiments, the flexible interconnecting elements include flexible regions that connect one or more tooth-clasping elements. In some implementations, multiple flexible interconnecting elements form a continuous flexible region that connects three or more tooth-clasping elements. In some implementations, the flexible interconnecting elements are joined into multiple discontinuous flexible regions. The flexible regions may be formed using different materials than the tooth-clasping elements. In some implementations, the flexible regions (or flexible interconnecting elements) are formed from the same material as the tooth-clasping elements. For example, the material in the flexible regions may have different topographic features than the material in the tooth-clasping elements so as to allow for greater flexibility. Some example embodiments of topographic features are illustrated and described with respect to at least FIGS. 43-56.

It is anticipated that the improved tooth positioners of the present invention will be produced by planning and designing the appliances using computerized 3-D CAD/CAM software. Many off-the-shelf software programs are currently available that are capable of this function. Over the long-term, it will be beneficial to write new software that integrates easily with the skill levels of orthodontist end-users, to simplify their use of the product. Open-source software that can be modified is currently available to perform this function. The standard surface mapping computer algorithms define the surface as a series of triangles. The actual physical production of the appliances can be accomplished by vacuum-forming thermoplastic materials over models produced digitally and combining the thermoformed portion of the appliance with the other necessary elements. This step is followed by using computer automated trimming technologies such as CNC milling or laser cutting. In particular, the clear tooth-clasping elements could be produced by vacuum thermoforming. In the single-piece embodiments of the present invention, the tooth-clasping elements and the flexible interconnecting elements could all be vacuum thermoformed together.

Alternatively, positioners can be made without first producing 3D models via 3D printing. A big advantage of direct 3D printing is that more complex shapes could be more easily printed, and almost no trimming of excess material would be necessary, saving time and avoiding wasted material. Some new 3D printers can print more than one material at the same time. The flexible interconnecting elements could be printed along with the tooth-clasping portion, and they could be made of differing materials. The materials can be blended or intertwined which will avoid the need for a separate attachment step in manufacturing. Another option involves direct CNC milling of the appliances or portions of the appliances from a block of plastic material. It is anticipated that the present appliances will be made in a series. Each appliance will move teeth a small distance, and then successive stages will continue the movement in small steps toward the desired goal. Each stage of the appliance can be fabricated in such a way as to fit over the teeth where they ideally should be for the next step or stage. The appliance will have to be deformed to fit over the teeth in their present position. The tooth-clasping elements 15 should fully engage each tooth. If the patient wears the appliance for a sufficient number of hours each day, after the appliance has been worn for a few weeks, the resiliency of the appliance will carry the teeth toward the desired position for the end of that particular stage. Then the next stage of the appliance will be placed on the teeth and will carry the teeth another prescribed distance, and so on until the desired final position is reached. It is likely to be necessary to take new impressions or new digital scans every few stages to keep the appliances fitting accurately as the process of straightening the teeth progresses.

Many of the accompanying drawings show tooth-clasping elements fitted over individual teeth. If adjacent teeth are aligned, and it is anticipated that this will routinely occur during later stages of treatment, it is not necessary to generate a separate tooth-clasping elements for each individual tooth in each stage. Groups of adjacent teeth may have tooth-clasping portions combined if these teeth are well aligned with each other. It may also be desirable in certain stages of treatment to combine teeth together in groups to be used as anchorage units, to provide better control over the movements of other groups of teeth. In these cases, the present appliance can be divided into multiple thin-shell segments. Each thin-shell segment can be designed to engage a group of adjacent teeth (i.e., one or more adjacent teeth). However, only select teeth in each group are equipped with bonded attachments 12A, 12B to engage corresponding tooth-clasping elements in the thin-shelled segment. This concept is somewhat similar to that used in orthodontic treatment with fixed braces, especially when extraction spaces are being closed and is well-described in the prior art. It is also possible to combine features of several of the embodiments described in this disclosure into one appliance to accomplish certain types of movements more efficiently.

To summarize, the embodiment of the present invention shown in FIGS. 1-4 includes clear tooth-clasping elements 15 fitted over teeth 11 to which bonded attachments 12A, 12B have been placed on both the buccal and lingual sides. The tooth-clasping elements 15 are connected together using flexible U-shaped interconnecting elements 17 made of wire loops attached to the flange (or extension) 16 of the tooth-clasping element 15 that covers part of the gum tissue adjacent to the teeth on both the buccal and lingual sides. FIG. 2 is a front elevational view of a wire interconnecting element 17 having flattened ends 18. The wire can be made preferably of nickel-titanium shape-memory wire, heat treated to the desired shape and of the appropriate dimensions, although other suitable materials can be utilized. The clear tooth-clasping elements 15 will be nearly invisible on the teeth 11, and the wire interconnecting elements 17 will go over the gum tissue in a less visible zone. This embodiment may have the greatest flexibility, and it is therefore anticipated this will be used to correct tooth rotations and crowding in situations where other embodiments cannot be used. This embodiment may be somewhat more difficult to manufacture because of the multiple parts and materials. The curved interconnecting elements 17 can also be mounted in an inverted position. Although the loops will be in a more visible location, inverted loops may be preferred for posterior teeth.

In particular, the bonded attachments 12A, 12B are preferably placed on the buccal and lingual aspects of all teeth, upper and lower, although there may be some instances where not all teeth have all the attachments. In the illustrations, rectangular bonded attachments are shown. The tooth-clasping elements 15 are preferably made of a clear plastic material or other suitable material cover most of the facial, occlusal, and lingual surfaces. The tooth-clasping elements adapt tightly to and conform to the outer contours of the teeth and the bonded attachments.

There can optionally be an open window through which the bonded attachment 12A, 12B projects, or the bonded attachment can be covered completely by the appliance. Either way, the tooth-clasping element 15 adapts tightly to the bonded attachment 12A, 12B and the portion of the crown of the tooth covered by the tooth-clasping element so as to allow forces transmitted to the tooth-clasping element 15 to be directly transmitted to the tooth. The forces can be in any direction needed to correct the malocclusion. The curved interconnecting elements 17 are preferably made of wire with flattened ends to prevent the wire from being pulled out of the material covering it that forms the bond of the wire with the tooth-clasping element 15.

This embodiment of the present invention includes a removable orthodontic appliance that will be worn by an orthodontic patient after the bonded attachments 12A, 12B have been placed on the teeth by the orthodontist, preferably using a method that allows great precision such as the aforementioned indirect bonding method or a computer-generated mold. The appliance will be made in multiple stages, each one moving the teeth in small increments toward a final desired goal envisioned by the orthodontist and planned in the computer using commercially-available CAD/CAM software designed for this purpose. This embodiment is most likely to be used in the early stages of treatment when the teeth are in their most crowded or irregular state. The flexibility of Ni—Ti wires is greater than the flexibility of any of the other materials utilized on the interconnecting elements in other embodiments disclosed herein. Therefore, this should allow complete engagement of the tooth-clasping elements in more complex orthodontic cases than have previously been treatable with removable positioner appliances.

The present appliance may be formed from a model of the patient's dental anatomy made of conventional plaster or a dental stone model, made by pouring the plaster or dental stone when it is uncured (wet) into an impression made of alginate, polyvinyl siloxane, silicone, polysulfide rubber or other suitable dental impression material. After the plaster or stone has cured (dried), the excess material is trimmed using a conventional rotating wheel model trimmer so the base is flat and the edges of the base are smooth. Alternatively, the dental model can be obtained by using conventional digital scanning techniques of the teeth directly in the mouth using a commercially-available digital intra-oral scanner, or the plaster or stone model can be scanned using a commercially available digital model scanner, or the impression itself can be scanned using a digital scanner or a computerized tomography scanner (CT). From the digital data obtained by the scan, a three-dimensional model can be produced using a commercially available stereo lithographic printer, or a commercially-available rapid prototyping printer, or a model can be produced using a commercially-available CNC milling machine operating on any suitable material, most likely a plastic block.

The three-dimensional images of the teeth (anatomic portion) are attached to the base of the dental model. The images of the teeth (virtual teeth) are the same size and shape and in the same relative location to each other as the real teeth in the mouth of the dental patient. In other words, the model of the teeth is an accurate representation of the real teeth in the mouth of the patient.

The bonded attachments 12A, 12B serve the purpose of providing an altered shape attached to, but different from the surface of the tooth. The bonded attachments are vital for retention of the removable appliance in the correct location on each tooth. The bonded attachments also allow the tooth-clasping element to transmit forces to the tooth so as to provide complete control over the position of the tooth in three dimensions. The bonded attachments protrude from the surfaces of the teeth, and in this particular illustration, the attachments have straight sides to properly orient the tooth-clasping elements in a desired position. As a general rule, the bonded attachments will be placed on the teeth prior to beginning any tooth movement.

The tooth-clasping elements 15 are formed utilizing an accurate model of the teeth 11. As shown in FIG. 1, there are separate tooth-clasping elements 15 to fit over each tooth in the arch, with shapes corresponding to the shape of each tooth. It can be seen that there are spaces between each tooth-clasping element (even if the teeth themselves are touching). The inner surface of the tooth-clasping element should be almost exactly the same shape and dimensions as the outer surface of the tooth to which it will be applied. Because the material from which the tooth-clasping element 15 is made has some thickness, the outer surface of the tooth-clasping element 15 will have greater dimensions but a similar shape corresponding to the inner surface of the tooth-clasping element. The outer surface is essentially a slightly enlarged or inflated version of the inner surface. The tooth-clasping element 15 typically has components that touch the tooth 11 on the buccal (outer), occlusal (top of bottom teeth, and bottom of top teeth) and lingual (inner) surfaces.

The tooth-clasping element 15 may also include a clear flange (or extension) 16 as an integral part of the tooth-clasping element 15. The flange 16 generally extends over the gum tissue of the patient on the facial and lingual sides of each tooth by a distance of approximately 2 to 3 mm, although the flange does not have to project that far. The flange 16 does not typically contact the gum tissue. There is clearance of at least 0.5 to 1 mm.

The flange 16 can serve as the attachment area for the flexible curved interconnecting elements 17. It is also possible to attach the flexible interconnecting element 17 directly to the main body of the tooth-clasping element 15, for example in the area between the bonded attachment 12A, 12B and the gum line without utilizing the flange. This may be particularly desirable on posterior teeth where the need to hide the loop behind the lips would not be as much of a cosmetic concern. The advantage this would provide is to reduce the risk of interference between the loops and the buccal frenum attachments. There would be a smaller vertical dimension to the appliance with the same sized loops.

In this particular embodiment, each interconnecting element 17 is a U-shaped wire, preferably made of heat-treated Ni—Ti shape memory wire. The U-shaped interconnecting element 17 extends outward slightly to avoid contact with the gum tissue, and maintains an open space 19 between adjacent tooth-clasping elements and allows range of movement. The exact dimensions of the U-shaped loop, and the thickness and heat-treatment of the wire to achieve the desired shape-memory properties can be varied to produce the desired physiologic forces applied to the tooth-clasping elements, and therefore the desired forces applied to the teeth. Alternatively, the flexible interconnecting element could be made of any suitable material. In this particular embodiment, the attachment means of the interconnecting element 17 to the tooth-clasping portion is not shown, primarily because it is transparent, and therefore would not be readily visible.

It should be noted that the interconnecting elements 17 have flattened ends 18 in the embodiment shown in FIGS. 1 and 2. If the flexible interconnecting element 17 is made of wire, the end of the wire is bent approximately 90 degrees and is placed in a hydraulic press to flatten the end 18, possibly with some small serrations pressed into the metal wire. The bent ends prevent the wire from being pulled out of the clear plastic that encases them. There are several conventional methods by which the interconnecting element could be attached to the flange of the tooth-clasping element. (1) Clear cold-cure acrylic could be applied over the wire in much the same way that wire elements are attached to the plastic of retainers commonly used in orthodontics today. (2) The same plastic material from which the tooth-clasping element is made could be applied in a molten state using a glue-gun nozzle and could cover the wire with a thin layer. This technique could be automated, and the nozzle could be robotically controlled on an assembly line. (3) A small plastic panel of approximately the same size as the flange of the tooth-clasping element could be placed over the flexible interconnecting element ends, and while being held in place, a focused ultrasonic welder waveguide horn could be placed adjacent to the two pieces of plastic to fuse the flange and the small panel together.

Alternatively, rather than flattening the ends of the wire segments, other means could be employed to prevent the wire from pulling out of the plastic, such as a zigzag in the wire, or bending the wire into an L-shape, or doubling it back on itself to form a T-shape, or forming the wire into a small circle, etc.

It should be noted that larger segments of wire could be used than the short segments shown in FIGS. 1 and 2. A longer segment of wire, containing multiple loops could be used to connect multiple tooth-clasping elements together. The wire could be attached using various means, including: (1) direct cementation using a composite or plastic cement, covering the wire; or (2) the tooth clasping elements could be printed or formed in such a way as to have a groove or recess to receive the wire, and the wire could even snap into place if the groove is designed so that the opening to receive the wire is slightly smaller than the wire and the portion of the groove where the wire is intended to reside. The groove can be square or rectangular in cross-section to receive a wire which is square or rectangular in cross-section. The wire could even be one piece with multiple loops in it.

Figure 3:
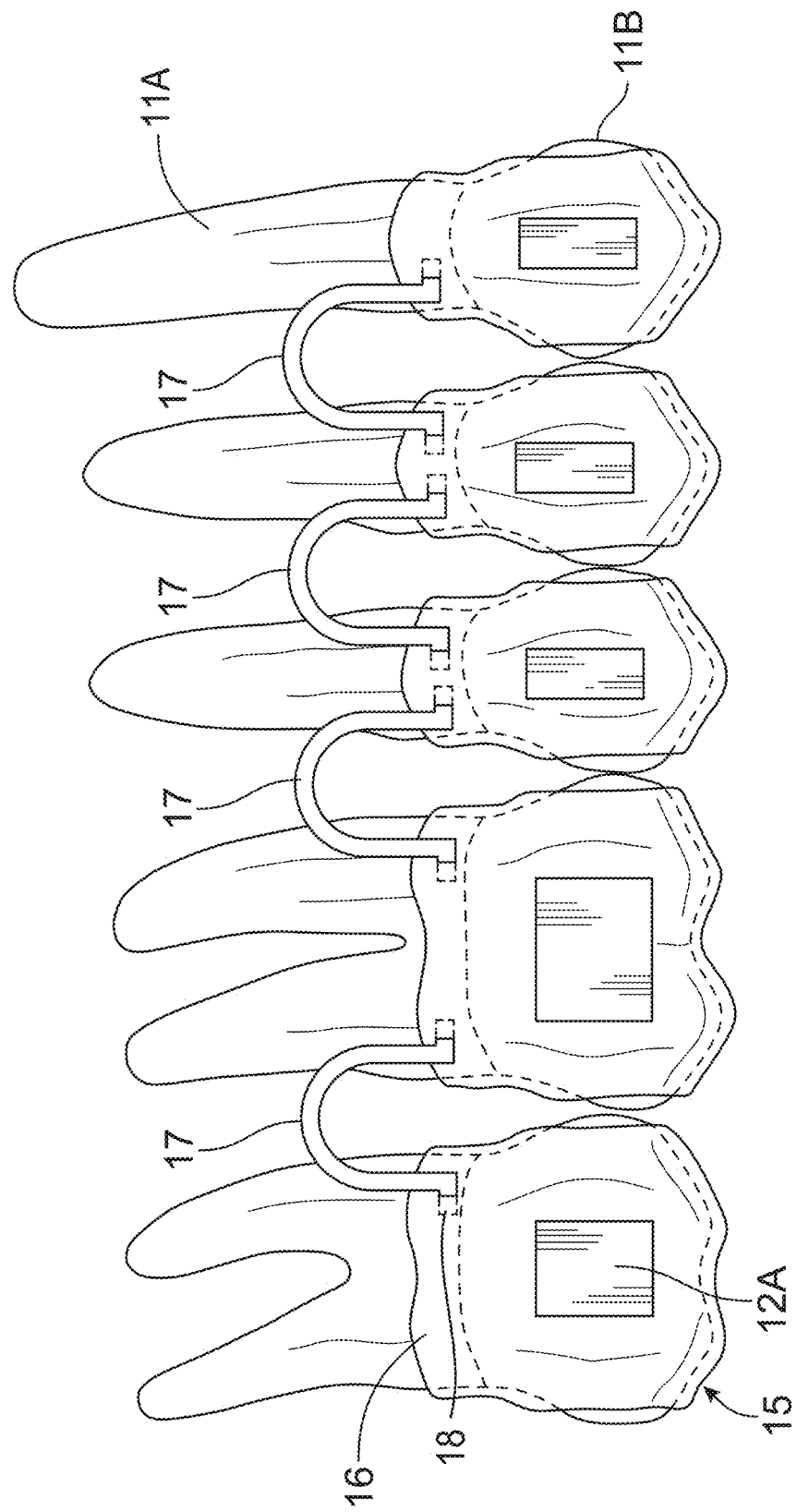
FIG. 3 is a side view of a portion of the appliance fitted on some of the teeth in the upper right quadrant.

FIG. 3 shows a right side view of some of the upper teeth with a portion of the same type of removable appliance shown in FIG. 1 installed on these teeth. Reference number 11A designates the root of the upper right cuspid tooth. The mesial surface 11B of the crown of the upper right cuspid tooth can be seen just sticking out beyond the mesial edge of the tooth-clasping element. FIGS. 4A-4E show views from five different directions of a single tooth (upper right first premolar) with bonded attachments 12A and 12B, a tooth-clasping element 15, and U-shaped wire-loop interconnecting elements 17 in place.

Figure 4:
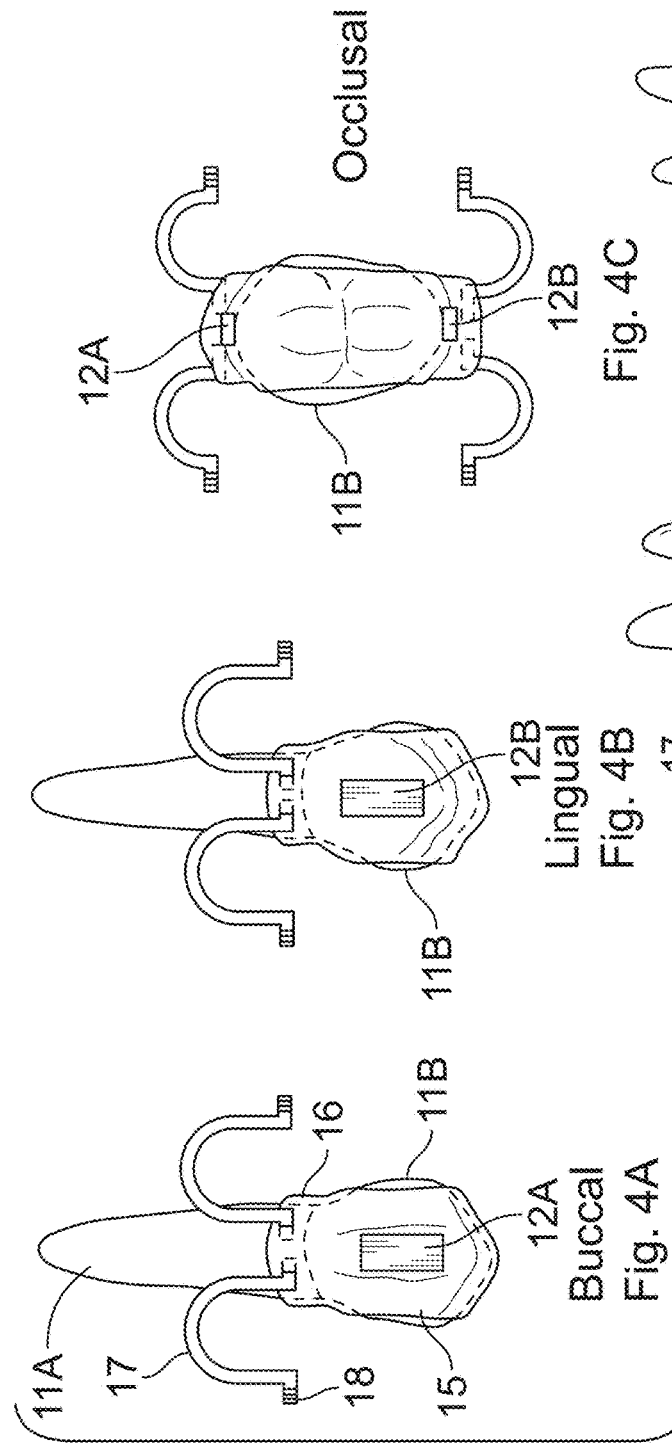
FIGS. 4A-4E shows views from five different directions of a single tooth (upper right first premolar) with bonded attachments 12A and 12B, a tooth-clasping element 15, and U-shaped wire-loop interconnecting elements 17 in place.

Note the size of the bonded attachments 12A varies with the size of the teeth. The bonded attachments in this view protrude through holes in the clear tooth-clasping elements. The holes are of the same size and shape as the bonded attachments. As discussed earlier, it is not necessary to use rectangular bonded attachments, nor is it necessary to use holes in the tooth-clasping elements to allow protrusion of the bonded attachments through the tooth-clasping elements. A simple recess in the inner surface of the tooth-clasping element precisely corresponding to the size and shape of the chosen bonded attachment geometry will still provide the necessary clasp function that is vital to the proper functioning of this appliance. Note there are spaces 19 between each of the tooth-clasping elements 15 even though the teeth themselves may be in contact. The space prevents the tooth-clasping elements from interfering with each other. FIG. 4 provides an upper right first premolar tooth viewed from five different angles showing a single tooth-clasping element 15 with interconnecting elements 17 attached as they would be positioned to reach toward adjacent teeth.

FIG. 5 shows a perspective view of a bonded attachment 12A, with the three axes of tooth movement intersecting within the center of the crown of the tooth (not shown) on which the bonded attachment is fixedly mounted. The x-axis in this case is a horizontal axis in the anterior-posterior direction. The y-axis is a vertical axis. The z-axis is a horizontal axis in the transverse direction. The bonded attachment can be positioned away from the center of the crown of the tooth. When forces act on the bonded attachment, depending on the direction of the force, the force produces a moment, which may cause a more complex movement of the tooth than is at first anticipated.

Figure 6:
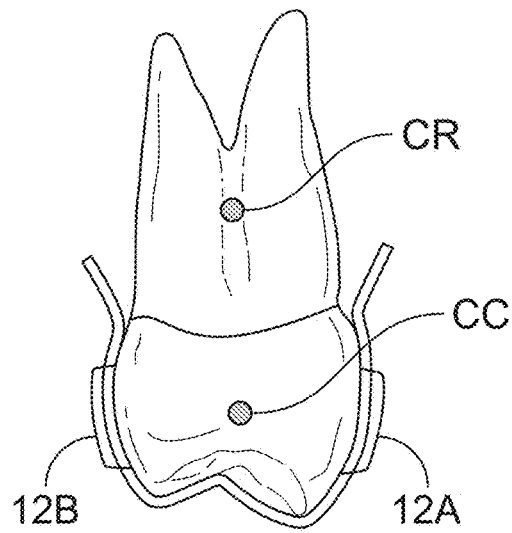
FIGS. 6-9 provide views of three types of simple tooth movement in the transverse plane.
Figure 7:
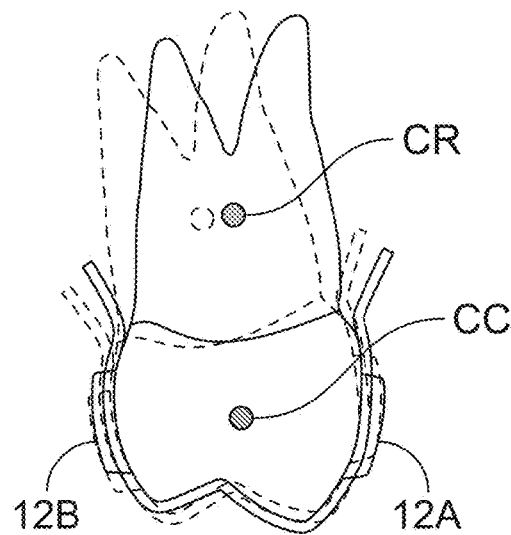

FIGS. 6-9 illustrate three different transverse movements, along the z-axis, as shown in FIG. 5 (i.e., not in the X-Y planes of the bonded attachments.) An upper right first premolar tooth is shown in all the drawings, viewed on the distal side. All of these movements require the resetting of teeth from the original position to a new desired position, either in a digital 3-dimensional file representing the positions of teeth, or using a dental model, whether resetting teeth manually, or when generating 3-D models from computerized digital files. FIG. 6 provides a reference view. FIG. 7 shows lingual transverse movement of the root with the center of the crown (CC) staying in the original position. The movement is a root tipping movement that is relatively difficult to accomplish, even when using fixed braces. For this movement, it would be desirable to use a trans-palatal bar to provide additional support to assure the desired movement. The movement is accomplished primarily by vertically moving the buccal and lingual sides of the teeth with the bonded attachments, although it can be seen that there are small transverse movements of the tooth surface taking place along with the bonded attachments.

Figure 8:
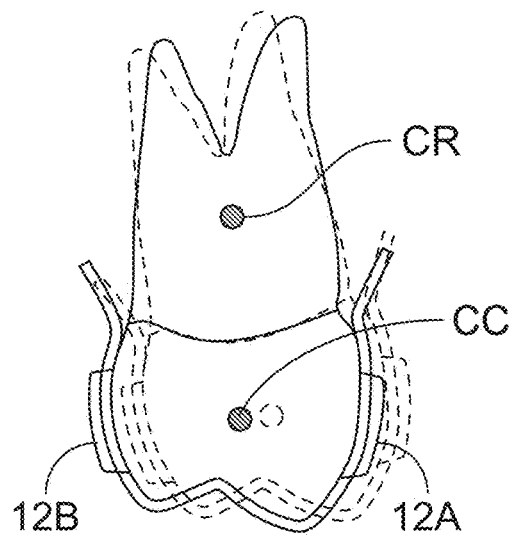

FIG. 8 shows buccal transverse movement of the crown with the center of the root (or center of resistance, CR, to movement of the tooth) staying in the original position. This tipping movement of the crowns of the teeth is relatively easy to accomplish, because the roots of the teeth naturally tend to remain in place. The movement is accomplished by a combination of movements of the buccal and lingual surfaces of the teeth along with the bonded attachments. In this drawing, it can be seen that there is approximately the same amount of vertical and transverse movement of the bonded attachments taking place, although the transverse tipping movements of the crown tend to naturally occur when opposing vertical forces are applied to the crowns of teeth, because of the resistance of the bone surrounding the roots.

Figure 9:
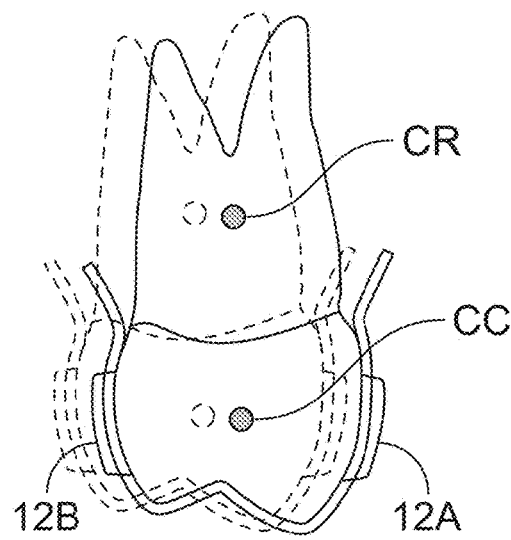

FIG. 9 shows buccal or lingual transverse movement of the entire tooth, with the center of resistance (CR) and the center of the crown (CC) moving exactly the same distance and in the same direction. There is no tipping of the tooth taking place. This type of movement requires bonded attachments, with very good engagement of the tooth-clasping element with the flat top and bottom surfaces of the bonded attachments to prevent the tooth from tipping.

Figure 10:
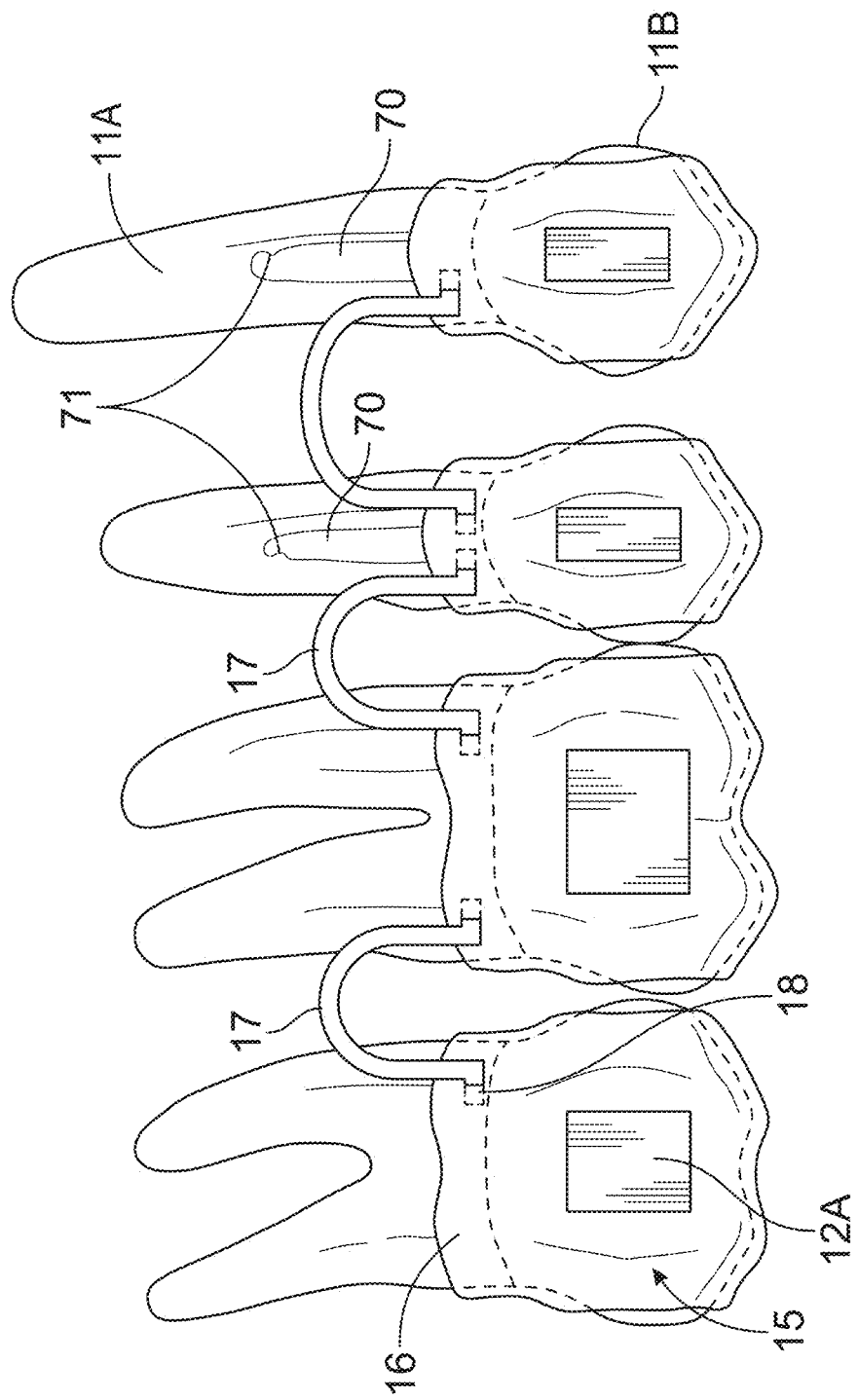
FIG. 10 is a side view of an appliance fitted on some of the teeth in the upper right quadrant. The appliance is similar to that shown in FIG. 3, but a tooth has been extracted and other teeth are being moved to close the extraction space. The tooth-clasping element of the teeth adjacent to the extraction space on either side has been modified to include a straight arm extension of the buccal flange. The arm extends over the gum line and includes a hook, or button, or other attachment means for installing an elastic band to apply additional force to close the space. Because the elastic band is attached near the center of resistance of the tooth near the center of the root of the tooth, the tipping moment is reduced, thereby making it easier to avoid tipping the tooth while the space is closing.

FIG. 10 shows an embodiment of the present invention that includes a localized extension of the flange 16 of the tooth-clasping element 15 on selected teeth to produce what is essentially an arm 70 for the attachment of stretchable elastic members 71 (e.g., rubber elastic bands, made of any suitable material). For instance, if a tooth has been extracted as part of the orthodontic treatment plan, the closure of the space while keeping the tooth roots parallel on either side of the extraction space (avoiding tipping the crowns of the teeth into the extraction site) has typically been a severe problem when using removable orthodontic appliances in the past. This is also a problem with fixed braces on teeth. One of the solutions routinely used with fixed braces is to place a rigid arm with a retentive hook on the brackets (an element commonly used with fixed braces) on either side of the extraction space to allow the use of elastic bands to help close the space. The center of resistance for each tooth is located approximately in the center of the root of the tooth. Placing the attachment point for the elastic band very close to the center of resistance of the tooth reduces the tipping moment as the force from the elastic is applied. The roots tend to stay more parallel when this method is used to close the space. In the same way, the flange 16 of the tooth-clasping element 15 can be extended to a point close to the center of resistance of the tooth, and an elastic band 71 can be utilized in the same way. If there are arms on both the buccal and lingual side of the teeth, the forces would be parallel, and the rotational moment present with a band 71 only on the buccal side would be cancelled. As a practical matter, it would be uncomfortable for the dental patient with a long appliance arm covering the gum tissue on the lingual side of the teeth to wear such a rubber band, although perhaps not impossible under certain circumstances. It depends on the curvature of the palatal tissue. Another possible use might be where root movement is desired, such as to upright a tipped tooth, but where there is no interdental space. To avoid tipping teeth that we do not want to tip, a group of teeth could serve as the anchor.

Figure 11:
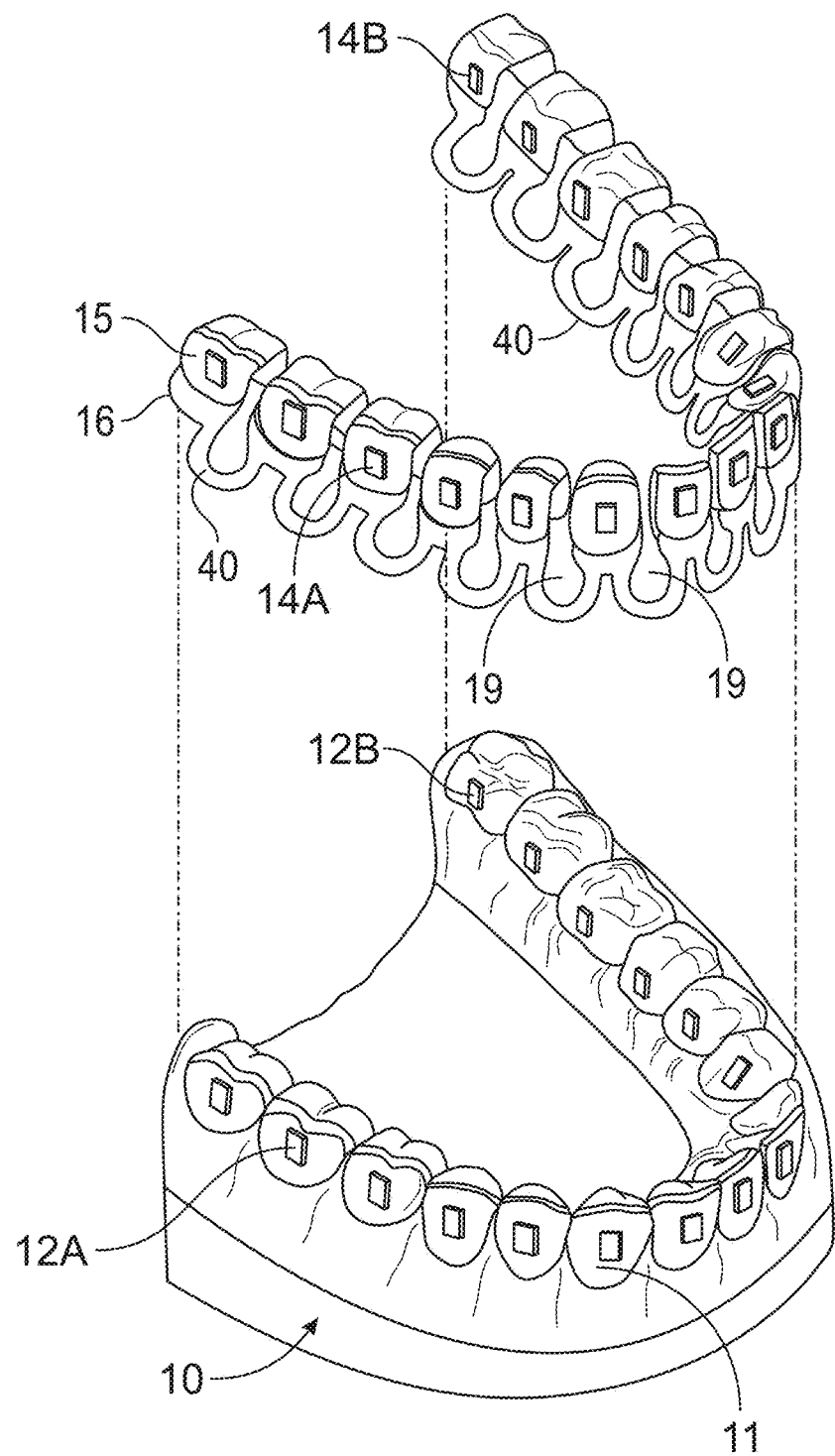
FIG. 11 shows a perspective view of a lower arch dental model with another embodiment of the appliance positioned above it. The appliance is made of a single piece of material, but localized regions of the appliance function as tooth-clasping elements and as flexible curved interconnecting elements. Dotted lines indicate the path the appliance would follow to be seated in place on the model.
Figure 12:
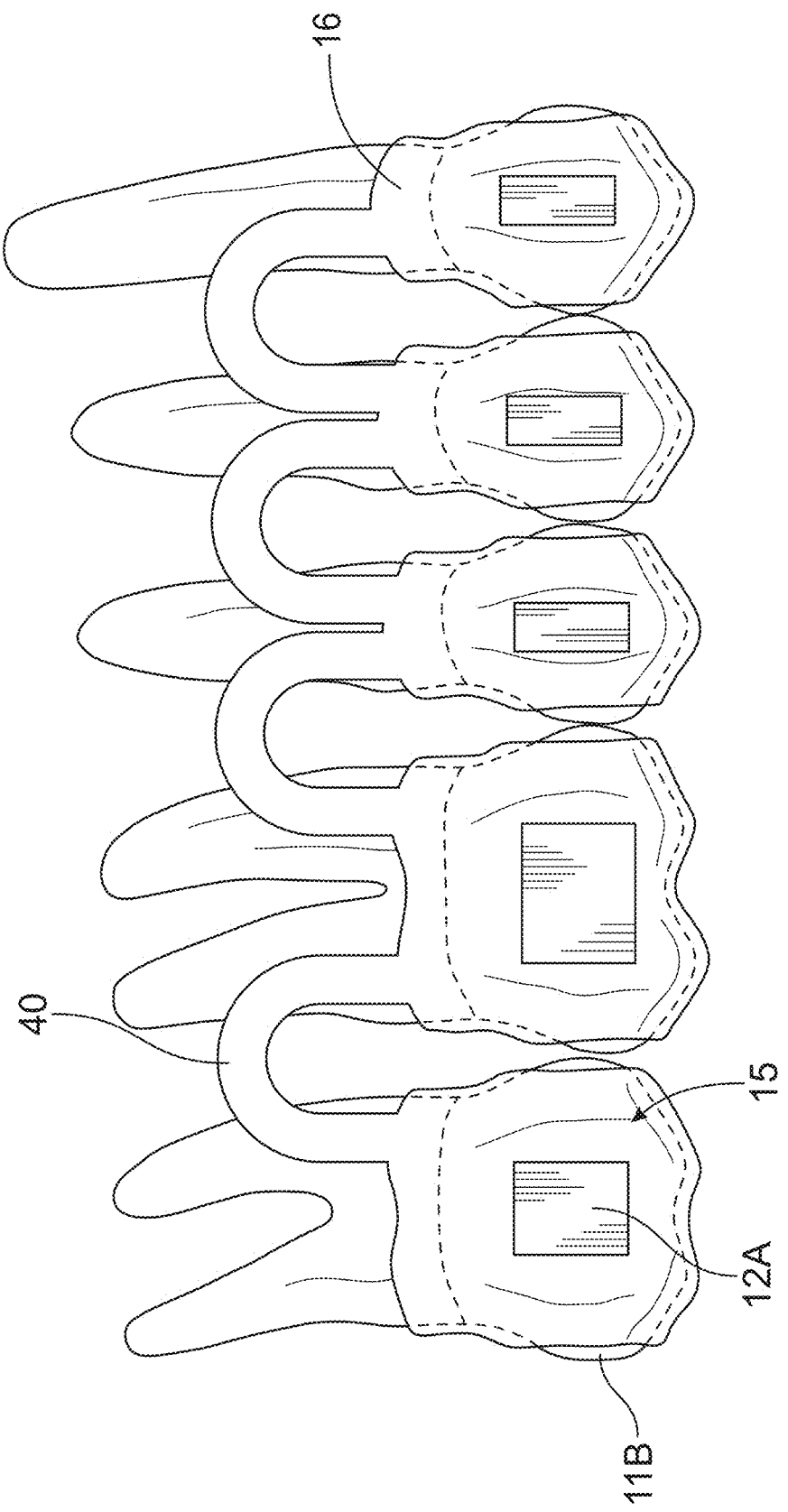
FIG. 12 shows a side view of a portion of the appliance in FIG. 11 fitted on some of the teeth in the upper right quadrant.

FIGS. 11 and 12 show an embodiment formed from a single piece of clear vacuum-formed or printed material. Functionally, the flexible plastic interconnecting elements 40 may not have the flexibility of wire interconnecting elements, but they will be far easier to manufacture if the appliance is printed, and the loops will be less visible. It is anticipated that the flexibility of the clear plastic curved interconnecting elements will be sufficient to make the appliance workable without resorting to the complex manufacturing and assembly process required to utilize wire loops as in the first embodiment. If the appliance is thermoformed and then cut, the instruction set for computerized mill cutting or laser cutting will be complex.

This embodiment utilizes the same bonded attachments 12A, 12B as the other embodiments. The removable positioning appliance is in two pieces, upper and lower. Each arch appliance is fabricated as a single piece appliance with regions that function as tooth-clasping elements 15 and curved, flexible interconnecting elements 40. The regions of the appliance that engage the teeth and function as tooth-clasping elements are almost identical in size shape and form to those of the previous embodiments. The regions 40 of the appliance that serve the function of the flexible interconnecting elements are curved, and are approximately the same overall size as the U-shaped wire connecting elements of the first embodiment. Functionally it is almost identical to the first embodiment, except the plastic loop is not as flexible or as strong as a wire loop. This embodiment can be made as a thermoformed appliance over a series of tooth models, much like currently-marketed aligners, but trimming away the excess material may be more difficult. It can be accomplished using a CNC milling cutter, or a laser cutter, but will require more complex programming than is needed for currently used aligners, where only the edge along the gum line needs to be trimmed. Alternatively, the entire apparatus can be 3-D printed and it is likely that is the way the industry will turn once non-toxic printable plastics become available.

The curved interconnecting elements can be a relatively flat, U-shaped ribbon made of plastic or metal, for example. However, FIGS. 13-21 illustrate that the physical properties of the curved interconnecting elements can be modified by the placement of reinforcing ribs or ridges 43, 44 to change the cross-section of the interconnecting elements 40. The ribs 43 strengthen the U-shaped loops and can change the torsional and flex properties of the loops. The ribs 44 can extend beyond the loops onto the bodies of the tooth-clasping elements 15 to increase the strength of the tooth-clasping elements, especially in the central areas of the clasps 15 where they engage the bonded attachments 12A, 12B. It is relatively easy to manufacture these strengthening ribs 43, 44 if the appliances are printed using a 3-D printer. In addition, the interconnecting elements are not necessarily flat, but rather could have any desired cross-sectional shape (e.g., circular, oval, tubular, a multi-strand cable, or a composite structure).

Figure 13:
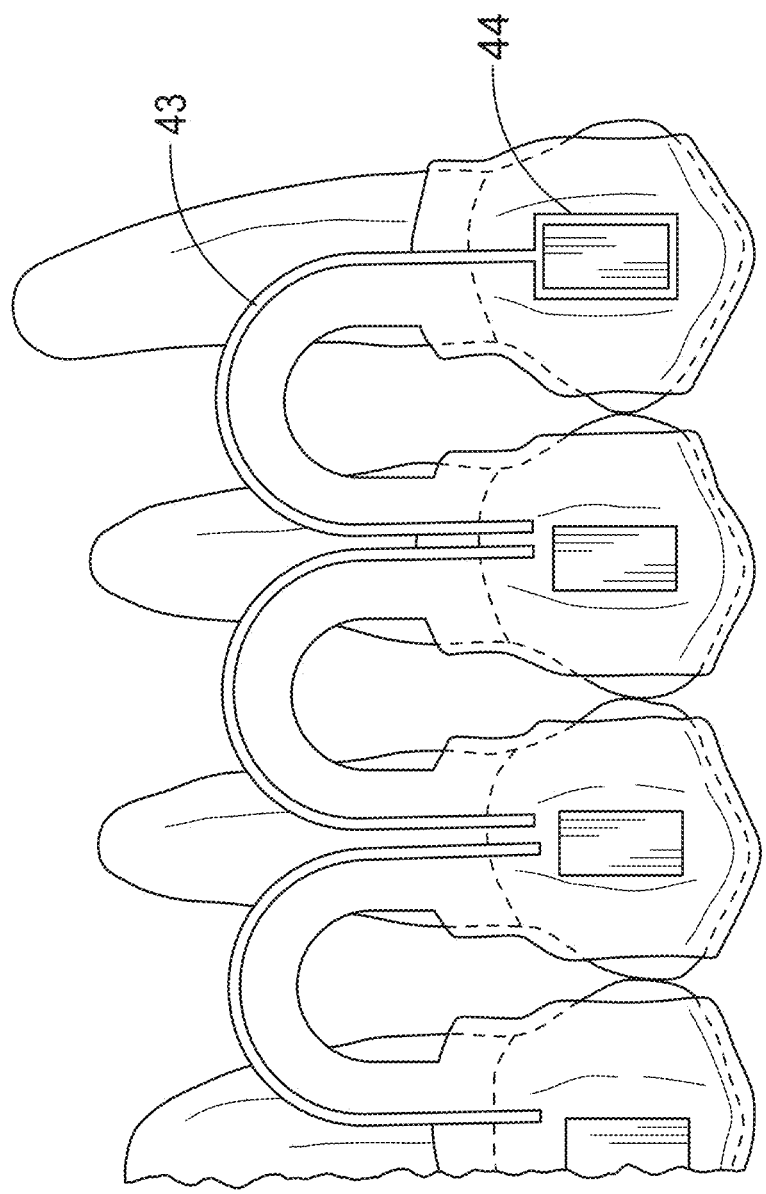
FIG. 13 presents an enlarged view of FIG. 12 with added support ridges 43 to the interconnecting elements and added support ridges 44 around the bonded attachments.

FIG. 13 is an enlargement of a portion of the appliance shown in FIG. 12. The outer edge of the flexible interconnecting elements include reinforcing ridges 43 that will be printed into the material forming the interconnecting elements. Note that the ridges 43 extend onto the flange section of the tooth-clasping elements and also onto the main tooth-contacting portion of the tooth-clasping elements. On one tooth, in this case the upper right canine tooth, the reinforcing ridge extends to and becomes continuous with a reinforcing ridge 44 that surrounds entirely the bonded attachment on the buccal surface of that tooth. The purpose of the reinforcing ridges is to add strength and to control the flex properties of both the tooth-clasping elements and the flexible interconnecting elements. It is to be understood that this disclosure does not limit the reinforcing ridges 43, 44 to this particular location or configuration. The reinforcing ridges can be located anywhere they are needed to add strength and to control the flex properties of the tooth-clasping elements and the flexible interconnecting elements.

FIGS. 14-21 illustrate several possible configurations for reinforcing ridges that can be placed where they are needed on the flexible interconnecting elements or on tooth-clasping elements. These reinforcing ridges can be any suitable cross-sectional shape. FIG. 14 shows two rectangular projections to form a C-shape. FIG. 15 shows a single rectangular projection to form a T-shape. FIG. 16 shows double rectangular projections. FIG. 17 shows two rectangular projections to form an I-shape. FIG. 18 shows two tapered projections to form a C-shape. FIG. 19 shows a single tapered projection to form a T-shape. FIG. 20 shows double tapered projections. FIG. 21 shows double tapered projections on each side to form an I-shape. The reinforcing ridges illustrated in FIGS. 14-21 are example of topographic features that may be added to appliance to alter the flexibility or rigidity of the appliance in specific regions. Some other examples of topographic features include bumps, dimples, and protrusions having other shapes. Other examples of topographic features are illustrated and described with respect to at least FIGS. 43-56. Topographic features may be used to provide flexibility or rigidity along various dimensions of the appliance. For example, topographic features may be added to provide increased elongational flexure along the mesial-distal dimension of the application (e.g., the dimension that follows the arch curve). Some embodiments include multiple different types of topographic features, such as ridges and patterns. In some implementations, the types and positions of topographic feature are determined based on the desired movements and the expected forces on the appliance using, for example, the processes illustrated and described with respect to FIGS. 58 and 59.

FIGS. 62A-62I illustrate several embodiments of flexible interconnecting elements. FIGS. 62A-C illustrates an implementation of a flexible interconnecting element 2600 with a tapered shape from a top view in FIG. 62A, a side view in FIG. 62B, and a cross sectional view in FIG. 62C (at the line A shown in FIG. 62A). The interconnecting element 2600 has a top portion 2602 with tapered portions 2604, and sides 2606. The sides 2602 may join to tooth-clasping elements in an aligner. The flexible interconnecting element may be formed from material having a thickness of 100 micros to 1 mm or another thickness. In some implementations, there is a hollow region under the flexible interconnecting element 2600 as shown in FIG. 62C. The implementation shown in FIGS. 62A-C may allow the material from which the flexible interconnecting element 2600 is formed to flex to a greater degree without permanently distorting (and therefore losing some of the materials resiliency and ability to apply a force to a patient's teeth). FIGS. 62D-F are cross-sectional illustrations of other flexible interconnecting element geometries. The geometries illustrated in FIGS. 62D-F may be hollow or solid. FIGS. 62G-I are illustrations of top views of additional flexible interconnecting element geometries. In FIG. 62G, the flexible interconnecting element has a curved shape and includes ridges, such as ridge 2620a, that are oriented orthogonally to the curve of the flexible interconnecting element. In FIG. 62H, the flexible interconnecting element has a rectangular shape and includes ridges 2630 that arranged are orthogonally to a midline of the flexible interconnecting element. In FIG. 62I, the flexible interconnecting element has a rectangular shape and includes a patterned region 2640. The patterned 2640 region may include any of the topographic features described herein.

Figure 22:
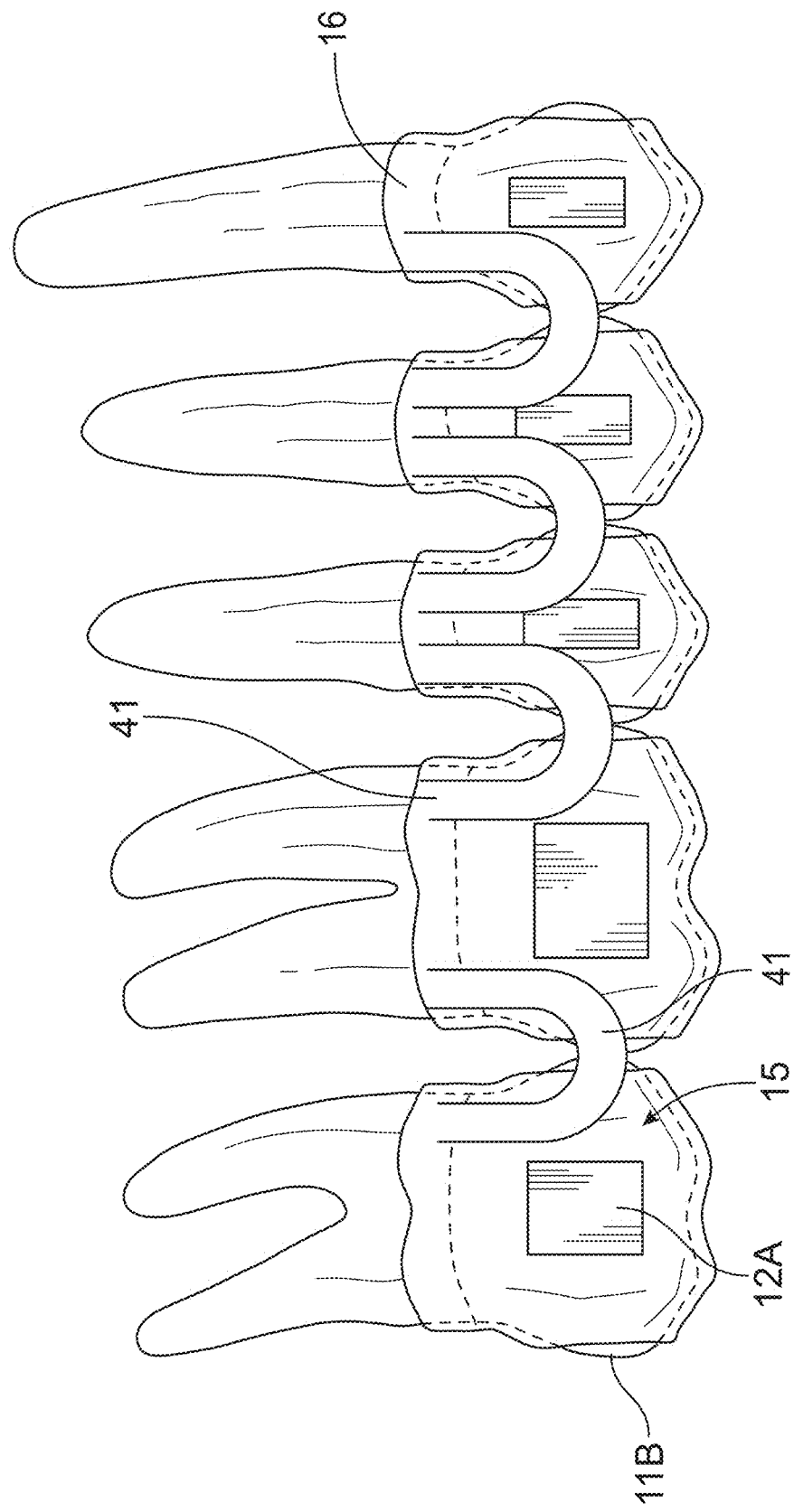
FIG. 22 shows another embodiment of the appliance fitted on teeth in the upper right quadrant, similar to the view shown in FIG. 12. In this embodiment the large curved loops of the interconnecting elements 41 are folded over so they are in an inverted position. In this position they still function in much the same way, but they are less likely to interfere with buccal frenum attachments. The mechanics of the inverted loop tend to keep the crown positions closer together as the loop is stretched open. It should be noted that the entire appliance, including the interconnecting elements 41, can still be fabricated as a single piece.

The embodiment in FIG. 22 utilizes interconnecting elements 41 in an inverted U-shape. The inverted loop geometry may be better for keeping favorable forces applied to the teeth to minimize tooth tipping during space closure. Conversely, the tooth-clasping elements may be more difficult to place on the teeth if the loops are stretched open when the loops are inverted. In this embodiment, if produced by using vacuum-formed thin-shell plastic, the appliance can be fully fabricated with the loops in the normal configuration. After completion, the loops can be heated and flexed downward to assume their reverse configuration. This embodiment should become easily mass-producible using computer 3-D printing technology, and the inverted configuration should not require a separate step for loop flexion. The first embodiment shown in FIGS. 1-4 using wire interconnecting elements can also be manufactured with the wire loops in an inverted position, because a wire loop embodiment may be better suited for closing interdental spaces.

Returning to FIG. 22, this type of appliance can also be made from a thermoformed sheet by reheating the loops of the interconnecting elements 41 and flexing them downward into the inverted position. An electric heat gun with a blower, or an ultrasonic welder could be used to heat and re-form the thermoplastic material. If the appliance is printed, it can simply be printed in the inverted position. The appliance does not extend as deeply into the buccal vestibule, and therefore would not be as likely to cause irritation of the tissue of the cheek or gum tissue. It also conveys a mechanical advantage. If a loop is stretched open, such as when there is a space between teeth you are trying to close, there is not as much pressure placed to move the root apices closer together. If the loop is inverted, and the loop is stretched open, it tends to move the crowns closer together. This same inverted loop geometry could be considered in the first embodiment, although you would not want to bend the wires downward. They should be mounted in the inverted position in the beginning.

Figure 23:
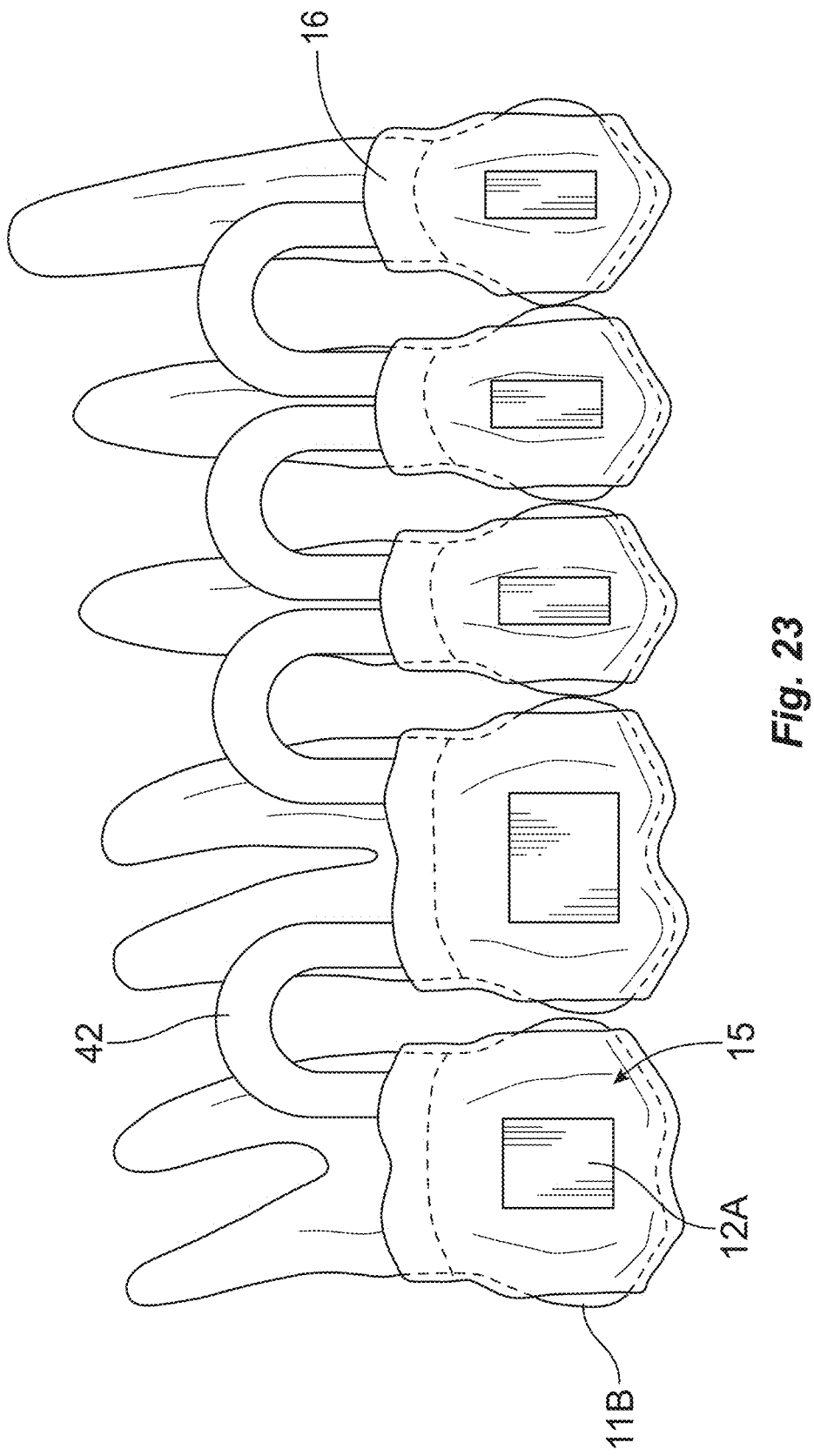
FIG. 23 is a modification of the embodiment shown in FIG. 12 in which different materials are used to fabricate the tooth-clasping elements 15 and the curved interconnecting elements 42.

The embodiment in FIG. 23 involves a modification of the materials utilized in forming positioner appliances and could be applied to any or all of the embodiments of the present invention disclosed herein. If a 3-D printer is utilized to manufacture a tooth-positioning appliance, we can take advantage of the current capabilities of some of the newer printers currently available. Multiple print nozzles can print more than one material with each pass of the printer over a given location. With this capability, we can print an appliance made entirely of one material, or we can print an appliance with blended or mixed materials, or we can print an appliance with some portions made of one material, and some portions made of another material. This capability will allow certain regions of the appliance to have greater or lesser flexibility, depending on the elastic modulus of the materials chosen for that particular region of the appliance. In the embodiment disclosed in FIG. 23, the tooth-clasping elements 15 are made of one material, while the curved interconnecting elements 42 are made of another material. The appliance will be printed as one monolithic whole, and the components will not need to be assembled or attached in a fabrication sequence. The printer will print one portion of the appliance and will go right on to print the other portion in a continuous motion as it is laying down the appliance layer by layer. The junction of the two materials can be a simple butt-joint junction where one material ends and another begins, or the junction can be a more complex intertwined zone with two materials interconnecting in such a way as to make the junction stronger, and more resistant to pulling apart. The two materials can have differing properties, such as elastic modulus, color, translucency, clarity, and strength such as yield strength, tensile strength, breaking strength, etc. The junction of the two materials may be stronger if the printer is programmed to mix or intertwine the materials in a brief junction zone.

The flexibility of the interconnecting elements can be varied depending on the type of malocclusion problem to be solved. In the early stages of treatment a very flexible interconnecting element material can be chosen to make it easier to engage a severely rotated tooth or a significantly tipped tooth. In later stages of treatment, the loops can be stiffer for better control over final tooth position just as the wire sizes are currently varied with the stage of treatment when fixed braces are used. The materials can also be chosen so that flexible materials are used for some interconnecting elements and stiffer interconnecting elements are used for other interconnecting elements.

In the embodiment shown in FIG. 12, the U-shaped interconnecting element 40 is made of the same clear material that forms the tooth-clasping elements 15. In other words, the appliance in FIG. 12 is a one-piece monolithic structure. In contrast, the appliance shown in FIG. 23 is preferably fabricated in one piece by using a 3-D printer that is capable of printing more than one material at a time. The tooth-clasping element 15 is preferably made of a clear material, and the interconnecting element 42 is preferably made of a different material, perhaps with a differing elastic modulus to control the flex properties of the curved loop. Because of the way the printer prints using multiple print nozzles, it is possible to gradually blend the materials into one another at the junction where the two materials join. It is unnecessary to attach the two portions.

Figure 24:
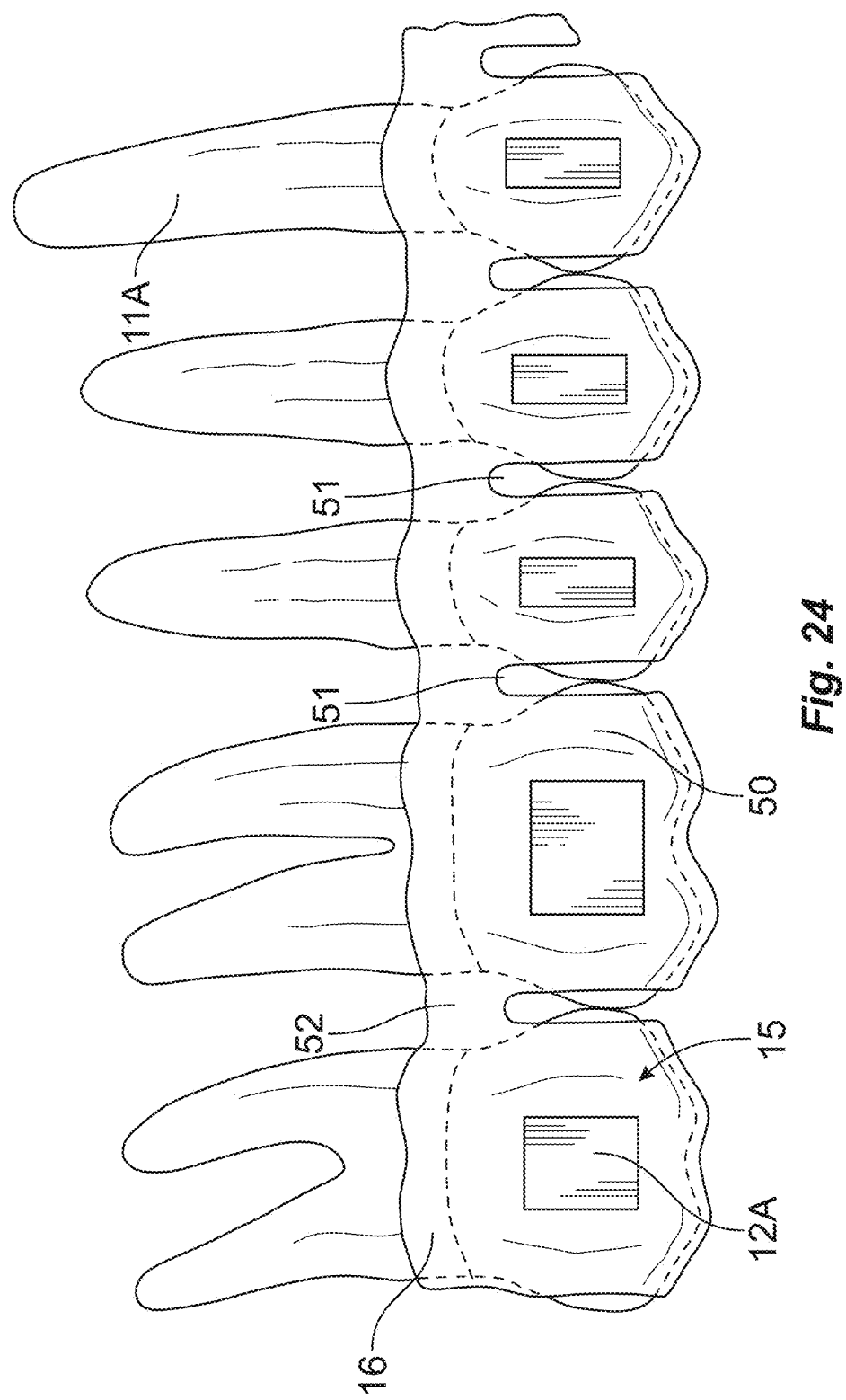
FIG. 24 shows a side view of another embodiment of the appliance fitted on some of the teeth in the upper right quadrant. This embodiment is also a single piece appliance like that shown in FIGS. 11 and 12. The difference is the flange portion 16 of the appliance covering some of the gum tissue on the facial side (shown) and lingual side (not shown) and the interdental portion 52 of the flange function as the flexible interconnecting elements.

The embodiment shown in FIG. 24 is formed of a single piece of material that is clear as it covers the anterior teeth. It can be manufactured by thermoforming a sheet of plastic material over a model of teeth, or it can be printed using a 3-D printer. There are no separately manufactured interconnecting elements as in the first embodiment. In its simplest embodiment, a single-piece tooth positioning appliance can be vacuum-formed over a plastic model. Flanges 16 of the appliance extend over the gum tissue. A difference in this embodiment is the flange 16 of the appliance also covers the interdental area including the interdental papillae, not just the gum tissue over the roots of the teeth as in the other embodiments of the present invention. Cuts are made between each tooth through the plastic shell material, but they do not entirely separate the shell into individual tooth-clasping elements. The cut-away area 51 between the teeth ends near the gum line in a small radius arch forming a U-shaped interconnecting element 52. The region of the appliance consisting of the flange portion of the appliance, including the flange area between the teeth covering the interdental papillae area adjacent to the interdental cuts 51 serves the same function as the interconnecting loop-shaped element 17 between two adjacent tooth-clasping elements in the earlier embodiments. Without the flange extension of the appliance over the gum tissue there would not be sufficient material to provide the needed flexibility for the interdental portion of this appliance to serve the function of the flexible interconnecting elements as shown in the third embodiment.

Although FIG. 24 includes cut-away areas 51 that are disposed in the interdental region and begin at the occlusal surface of the appliance and extend toward but do not reach the most gingival portion of the appliance, alternatives are possible. The cut-away areas may be arranged in the opposite direction. For example, some implementations include cut-away areas that begin at the gingival portion of the appliance and extend in the occlusal direction but do not reach the occlusal surface. Some implementations include multiple cut away areas that are arranged in opposite directions. For example, an appliance may include one cut away area that begins at the occlusal surface and another that begins at the gingival edge of the appliance in an interdental region. In some implementations, three cut away areas may be disposed in an interdental region with, for example, two cut away areas beginning at the occlusal surface having one cut away area beginning at the gingival edge being disposed between them (or vice versa). In at least some of these implementations, adjacent cut away areas extend past one another in the gingival-occlusal dimension. Even though the depths of the cut away areas extend past one another, they do not fully divide the appliance into two parts because the cut away areas are offset from one another along the arch of the appliance and therefore do not meet. In some implementations, the sum of the depth of two adjacent cut away areas exceeds the depth of the appliance in the gingival-occlusal dimension.

For example, this arrangement of cut-away areas may provide elongational flexure in the interdental region. In some implementations, this arrangement of cut-away areas may be outside of the interdental region, such as in a region of the appliance that would be in direct contact with tooth surfaces when worn. The arrangement of cut-away areas may provide a spring like force that gradually increases to resist further elongation of the interdental region (e.g., the resistive force is proportional or approximately proportional to the size of the interdental space). The cut-away areas may have various widths from very thin (e.g., 50 or 100 micrometers or even thinner) to thicker (e.g., 1 millimeter, 2 millimeters, 5 millimeters, or even thicker). The cut-away areas may also be disposed outside of the interdental areas of the appliance in some implementations. In some implementations, the arrangement of cut-away areas elongates a pathway through which stress forces pass through appliance. For example, the pathway for stress forces may curve between adjacent cutaways because the cutaways prevent the stress force from travelling along a straight line. In some implementations, the cut-away areas may define a stress force path that has a sinusoidal shape or an approximately sinusoidal shape.

If this appliance is printed using a 3-D printer, the same basic shape and size of the appliance as in the thermoformed version would be produced. Rather than making cuts in the material to produce the interdental voids, the printer would simply not print the areas where the thermoformed appliance is cut away.

Alternatively, the embodiment depicted in FIG. 24 can be fabricated by removing some of the appliance material to make the appliance more flexible. There are two ways this material can be considered to be "removed." First, if the appliance is made by thermoforming a sheet of material over a model, then a portion of that material can be removed by cutting it away using a CNC milling machine or a CNC laser cutter. Second, if the appliance is fabricated by a 3-D printer, then selected portions of the coverage of the plastic over the teeth will not be printed, leaving spaces where the coverage is chosen to be absent. The embodiment shown in FIG. 24 is much like the embodiment in FIGS. 11 and 12, in that both embodiments can be made of a single piece of material covering each dental arch. The flange material on the facial and lingual sides of the teeth covering the gum tissue area, and the additional flange material covering the interdental area, serves as the flexible interconnecting element. This additional flange material covering the interdental gum tissue area (specifically covering the interdental papillae) is shown only in FIG. 24 but it is to be understood that it could be present in any of the embodiments described herein if there is not a need for a separate tooth-clasping element for each tooth.

In some stages of treatment using an appliance system, one may use the embodiment from FIGS. 1-4 between two adjacent teeth, the embodiment from FIGS. 11-12 between the next two teeth, and possibly the embodiment from FIG. 24 between the next two teeth. In later stages of treatment, as the teeth become better aligned, there will be groups of teeth combined together into units where there are no interconnecting elements. This combining of the teeth into groups is shown in a separate related disclosure of a space closing appliance. In FIG. 24 there are no added curved loops to serve as the flexible interconnecting elements as in FIGS. 11 and 12. The flange material serves as a smaller loop or interconnecting element in FIG. 24. This embodiment is simpler and smaller than FIGS. 11 and 12, and could still be more effective for small movements than a conventional tooth positioning appliance as is now manufactured by several companies.

Figure 25:
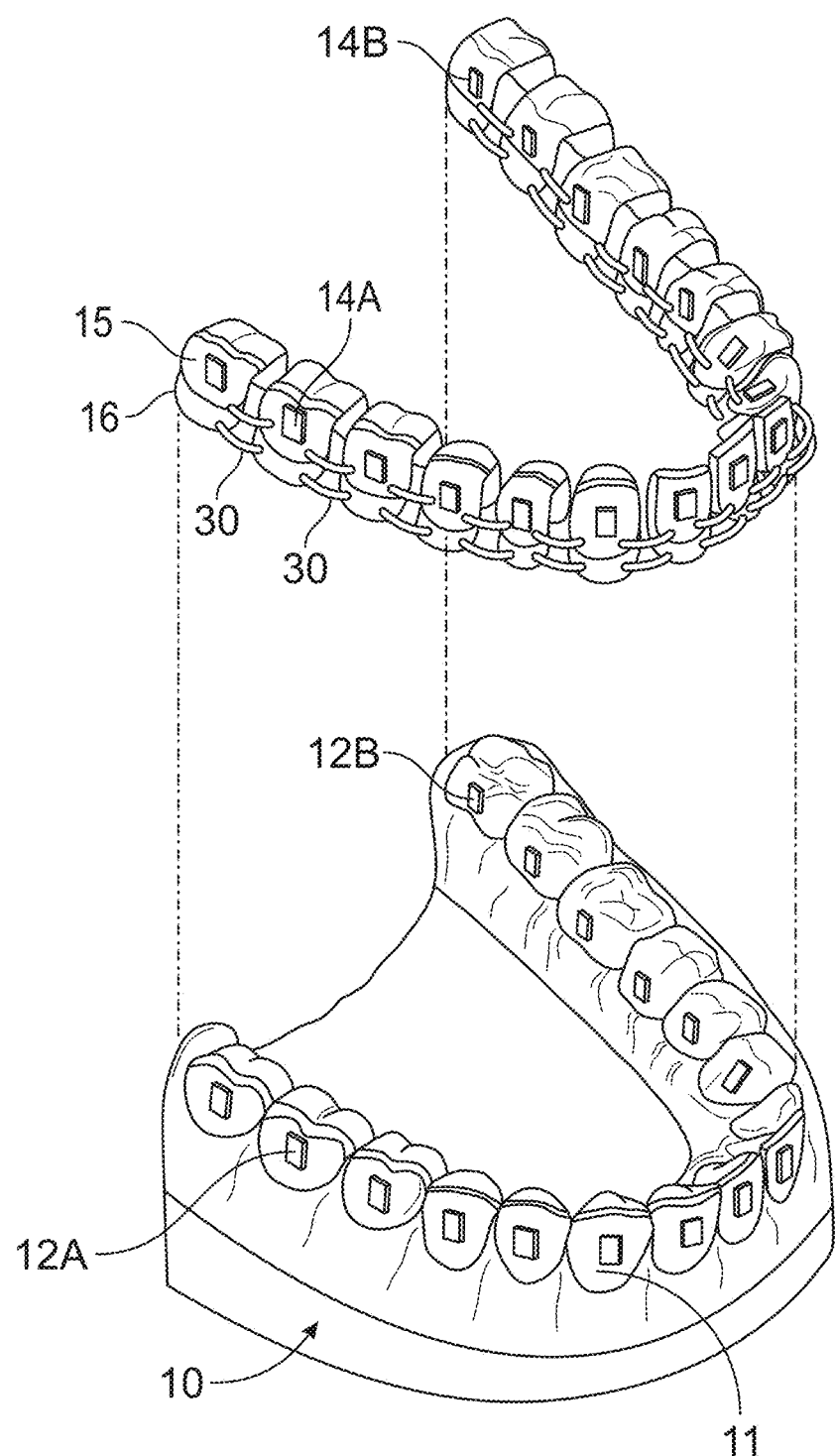
FIG. 25 shows a perspective view of a lower arch dental model with another embodiment of the appliance positioned above it. The small curved flexible polymer interconnecting elements are shown between the tooth-clasping elements. Dotted lines indicate the path the appliance would follow to be seated in place on the model.

FIGS. 25-27 show an embodiment having clear tooth-clasping elements 15 with interconnecting elements 30 that are U-shaped in horizontal planes extending outward from the tooth-clasping elements. In other words, each tooth-clasping element 15 is connected to the adjacent tooth-clasping element using short flexible U-shaped interconnecting elements 30 curving outward in horizontal planes, attached between the crown portion of the tooth-clasping elements and also between the flange section over the gum line. It should be noted that the curvature of the interconnecting elements 30 could be in more than one plane. The materials of the tooth-clasping elements 15 and the materials of the interconnecting elements 30 may be formed of differing materials, with the interconnecting elements 30 being more flexible. This embodiment could be easily printed, using a multiple nozzle 3D printer. The interconnecting elements 30 would be oriented in a flat horizontal plane with the outer portion of the curve directed away from the teeth (i.e., toward the cheek on the buccal side attachment and toward the tongue on the lingual side). Preferably, there are four interconnecting elements between each adjacent pair of tooth-clasping elements, one above the other on both the buccal and lingual sides of the teeth. However, any number of interconnecting elements could be used. It is anticipated that this embodiment would work well to correct minor rotations and crowding.

This embodiment may also offer the advantage of being less visible than the embodiments in FIGS. 1-4 and 11-12. For example, the interconnecting elements 30 can be made of any suitable flexible material including but not limited to: clear vinyl, clear silicone, and clear urethane, or some other material that is not clear. In the posterior teeth, they do not have to be clear because they will be seldom seen. If this positioner is fabricated by a 3-D digital printer, the flexible interconnecting elements can be printed simultaneously with the clear tooth-clasping portion.

In some implementations, the interconnecting elements 30 are formed from the same material as the tooth-clasping elements 15. In some implementations, the interconnecting elements are formed by cutting out or removing (e.g., in a digital representation of the appliance that is used to guide a 3-D digital printer) a portion of the appliance. In some implementations, multiple regions are not printed, cut-out, or otherwise removed from the appliance to form apertures or holes in the same general area (e.g., in the interproximal region where two adjacent teeth meet). For example, a first aperture may be formed above a second aperture (e.g., the first aperture may be offset from the second aperture in the occlusal-gingival dimension of the appliance). The portion of the appliance between the first aperture and the second aperture may form a thin band of material that is flexible like the previously described interconnecting elements. Similarly, the portion of the appliance between an aperture and the gingival edge of the appliance may also form a thin band that is flexible like the previously described interconnecting elements.

In some implementations, the interconnecting elements 30 are fabricated using vacuum-forming techniques (also referred to as suck-down processes). The vacuum-forming techniques may be performed using a physical model of the patient's dentition that is fabricated based on a CAD model representing the surface contours of the patient's dentition. For example, the physical model may be fabricated using one or more of 3-D printing and milling. In some implementations, the CAD model representing the surface contours of the patient's dentition is adjusted to facilitate formation of the interconnecting elements using vacuum-forming techniques.

In some implementations, the CAD model is modified to add a support structure for the interconnecting elements. For example, the interproximal regions of the CAD model may be modified so that the interconnecting elements do not follow the contour of the of the patient's teeth in these regions. Instead, the interproximal regions may be filled in or even supplemented (e.g., to add a bulge) so that the vacuum-formed surface that forms the interconnecting elements has a desired shape for the interconnecting elements. In some implementations, the entire interproximal region is modified, the portions of the interproximal region corresponding to the interconnecting elements are modified, or the portions of the interproximal region corresponding to the interconnecting elements and any apertures are modified. In at least some implementations, any apertures are then cut-out of the appliance after it has been fabricated using vacuum-forming techniques (e.g., cut-out manually or using milling techniques). Similar modifications may be made to other portions of the CAD model (i.e., other than the interproximal regions) to cause the shape of the interconnecting elements to differ from the contours of the patient's dentition. For example, a portion of the gum tissue may be built up on the CAD model so that interconnecting elements that pass over the gum tissue do not impinge on the patient's gum tissue. Other techniques are also described herein to reduce the likelihood that interconnecting elements of appliances impinge on patient gum tissue. These modifications may be combined with other modifications to the CAD model, such as those described with respect to FIGS. 28 and 29.

Figure 60:
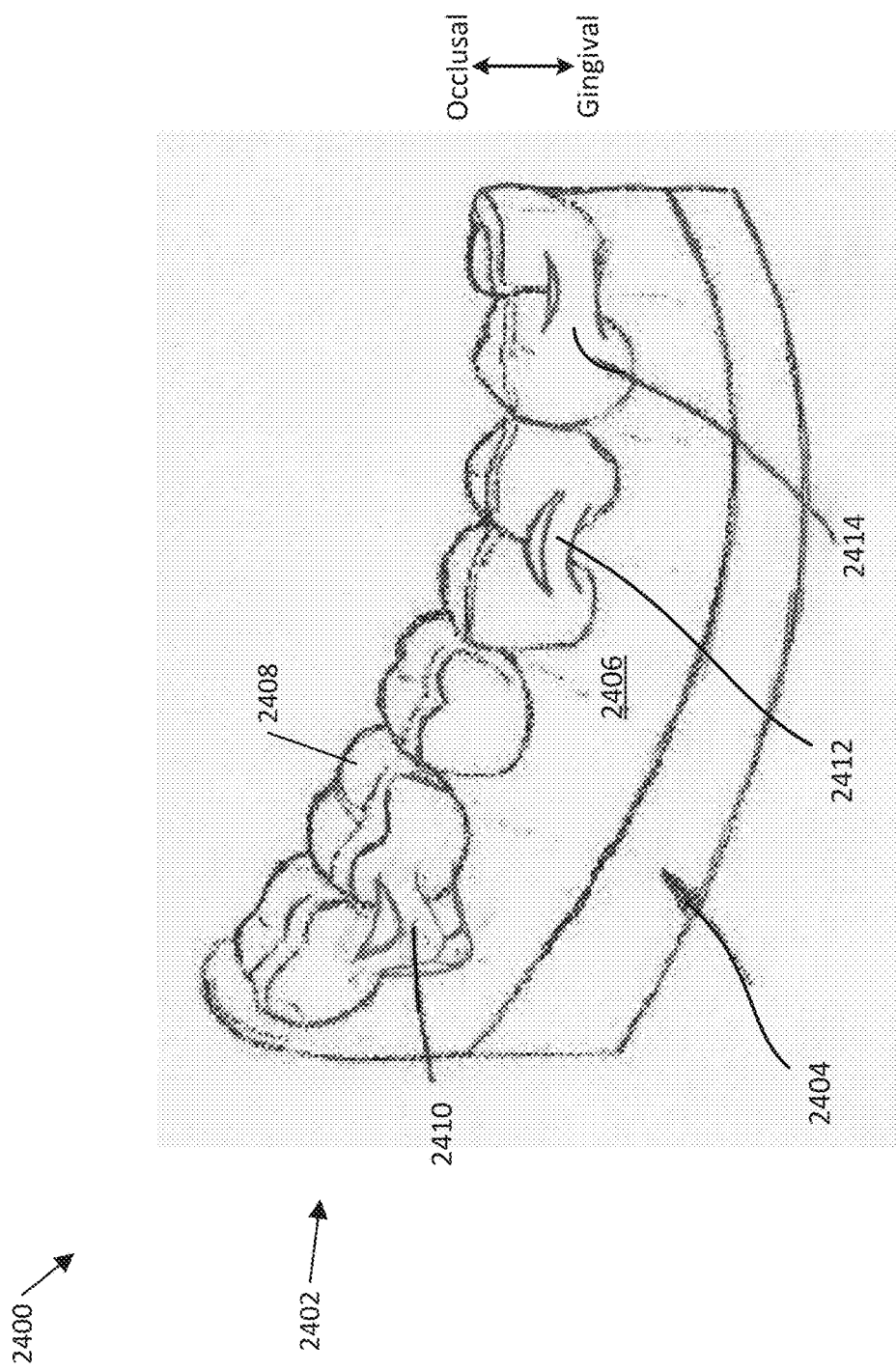
FIG. 60 is an example of CAD model that has been modified to include support structures.

An example of CAD model 2400 that has been modified to include support structures 2410, 2412, and 2414 is shown in FIG. 60. The model 2400 includes a dentition contour region 2402 and a base region 2404. The dentition contour region 2402 is based, at least in part, on surface contours of a patient's dentition. The base region 2404 is joined to the dentition contour region 2406. For example, the base region 2404 may be joined to a gingival portion of the dentition contour region 2406. The base region 2404 may include a flat surface opposite the side joined to the dentition contour region 2406. The flat surface may allow a physical model formed from the CAD model 2400 to be set down with the occlusal surface facing upward.

The dentition contour region 2402 includes a gingival portion 2406 that is based on the surface contours of the patient's gingival tissue and a tooth portion 2408 that is based on the surface contours of the patient's teeth. The model 2400 also includes support structures 2410, 2412, and 2414. The support structure 2410 includes a raised portion that begins on a molar of the tooth region 2408, passes over a portion of the gingival portion 2406, and ends at another molar of the tooth region 2408. In this example, the support structure 2410 is curved in the occlusal direction. The support structure 2412 includes a raised portion that begins on a bicuspid of the tooth region 2408, passes over n interproximal region of the tooth portion 2408, and ends at another bicuspid of the tooth region 2408. In this example, the support structure 2412 is curved in the occlusal direction. The support structure 2414 includes a raised portion that begins on a cuspid of the tooth region 2408, passes over an interproximal region of the tooth portion 2408, and ends at an incisor of the tooth region 2408. These support structures may, for example, support fabrication of a flexible interconnecting element, such as a loop-shaped flexible interconnecting element, by vacuum forming over a physical model fabricated from the model 2400. The support structures 2410, 2412, and 2414 are just examples and other implementations may include a different amount, arrangement, or style of support structures.

Figure 28:
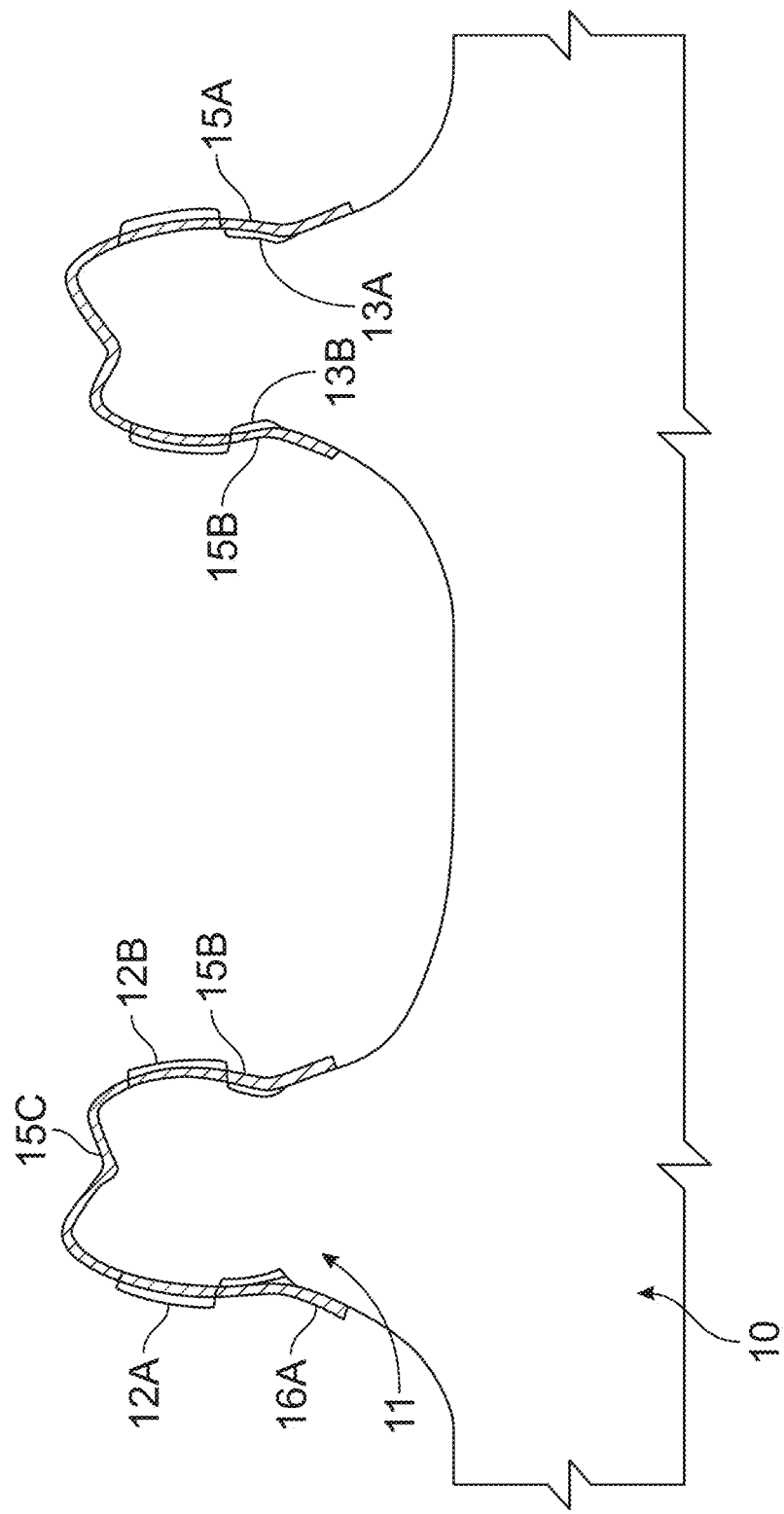
FIG. 28 is a cross-sectional view of a dental model 10 of the lower teeth with the plane passing transversely through the centers of the second premolar teeth 11. The tooth-clasping elements on the lower second premolar teeth are shown in place, seated on the teeth of the dental model. The external surfaces 13A and 13B of the teeth in the model, on both the buccal and lingual sides of the teeth, between the gum line and the bonded attachment have been moved inward (toward the center of the tooth) a small distance, as indicated by the dotted lines. In addition, portions of the dental model 10 may be expanded to, for example, minimize impingement on gingival tissue.
Figure 29:
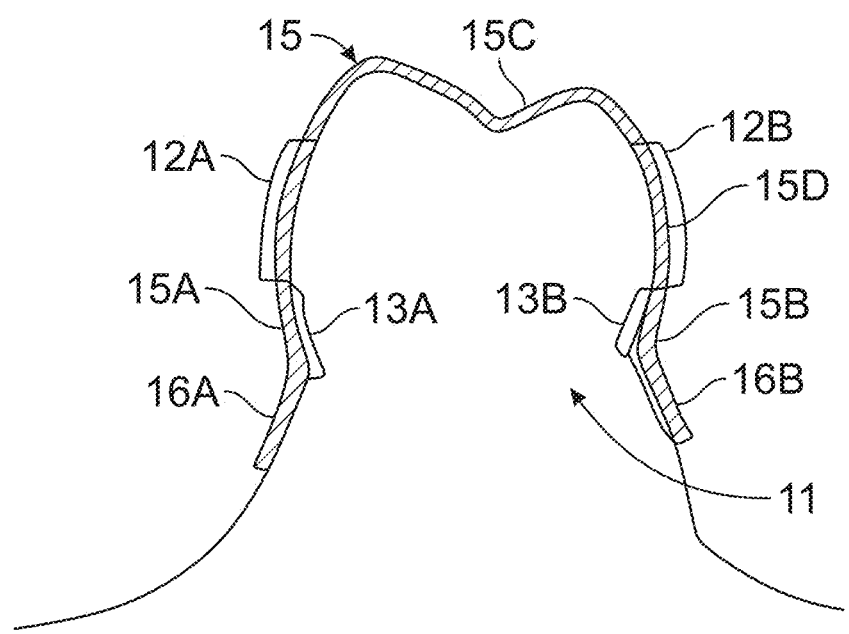
FIG. 29 is a detail cross-sectional view of the dental model with the tooth-clasping elements corresponding to FIG. 28.

FIGS. 28 and 29 show an embodiment of a tooth-clasping element 15 that is pre-loaded to more effectively engage a tooth. This modification could be applied to any or all of the previous embodiment disclosed herein. The digital data set corresponding to the shape of the dental model for any particular stage could be modified to move the labial and/or lingual surfaces 13A, 13B of the tooth (or a portion thereof), found between the level of the bonded attachment and the gum line, inward toward the center of the tooth by a small distance. Then, whether the appliance is printed, or if it is thermoformed over a digitally printed tooth model, the appliance will have a tighter fit along the gum line. Currently, thermoformed positioners have a tendency to become stretched after they have been worn for a few days. The material relaxes. The appliances become loose after they have been worn. The modification of the digital representation of the tooth surface prior to formation of the appliance will result in a tooth-clasping element that is pre-loaded when it fits over the full-sized natural tooth, resulting in a tighter fit of the appliance.

In particular, the area of the CAD model located between the bonded attachments and the gum line is modified in the digital file representing the 3-D surface contours of the model. The surfaces 13A and 13B representing the portions of the patient's tooth on both the buccal and lingual sides of the tooth from the gingival edge of the bonded attachment to the gum line are moved inward toward the center of the tooth by a distance representing about 1-25% of the thickness of the tooth. When a digital model is made of the tooth upon which to fabricate a thermoformed appliance, or when a 3-D printed appliance is fabricated which does not require the use of a 3D model under it for support for printing purposes, the corresponding modified surface contours 15A, 15B in the tooth-clasping element based with the aforementioned areas 13A, 13B of the model that were moved inward, will cause the fabricated appliance to have a pre-load so in these areas, resulting in a tighter fit in these areas. The gum line flange areas will not be affected by the change in the surface contours, but when the appliance is placed on the teeth, the real contour of the tooth will force the tooth-clasping element outward, and the gingival flange area will be forced outward slightly away from the gum tissue, providing a little more clearance to avoid having the flange region of the appliance impinge on the gum tissue.

Some implementations make additional modifications to the CAD model representing the surface contours of the patient's dentition to alter the design of the appliance. For example, the gingival area (i.e., gum tissue) of the CAD model may be expanded in some embodiments. In these embodiments, the appliance may then be designed to follow the expanded contours of the gum tissues. Based on this expansion, the interior surfaces of the fabricated appliance may not contact the patient's actual gum tissue, instead the interior surfaces will be separated from the patient's gum tissue by a buffer space corresponding to the expansion. Beneficially, in at least some implementations, this buffer space reduces the likelihood that the appliance will impinge (possibly painfully) on the patient's gum tissue. Additionally, this offset may reduce the likelihood that interconnecting elements, such as flexible U-shaped interconnecting elements, twist into the patient's gum tissue due to torsional or other forces that are placed on the interconnecting elements by the patient's teeth.

In some situations, the distortion of the aligner may be simulated based on using finite element analysis on a model of the aligner and applying forces to the aligner that would be caused by the patient's teeth. For example, the forces may correspond to the forces caused by the patient's teeth in their initial position for a stage.

In some implementations, the aligner is offset in a direction opposite the movement the aligner is shaped to induce in the root of the tooth. For example, if the aligner is shaped to move the root of the patient's tooth away from a side of the aligner (e.g., further into the gum tissue), the gingival area of the CAD model on that side of the aligner may be expanded so that when an aligner is formed from the CAD model it will have more room for the gum tissue and will not impinge on the gum tissue as the root moves further into the gum tissue. In some implementations, gum tissue on the CAD model is offset on only a single side and is left offset on the opposite side. For example, the gum tissue on the CAD model may be offset on the side the root of the tooth is moving away from. In some implementations, the magnitude of the offset applied to the gum tissue portion of the CAD model is based on the magnitude of the anticipate movement of the root of the tooth. For example, the offset may be based on scaling the distance of the anticipated root movement by a predetermined factor (e.g., the predetermined factor may be 0.1, 0.25, 0.5, 1.0, 2.0, or another value).

Figure 61A:
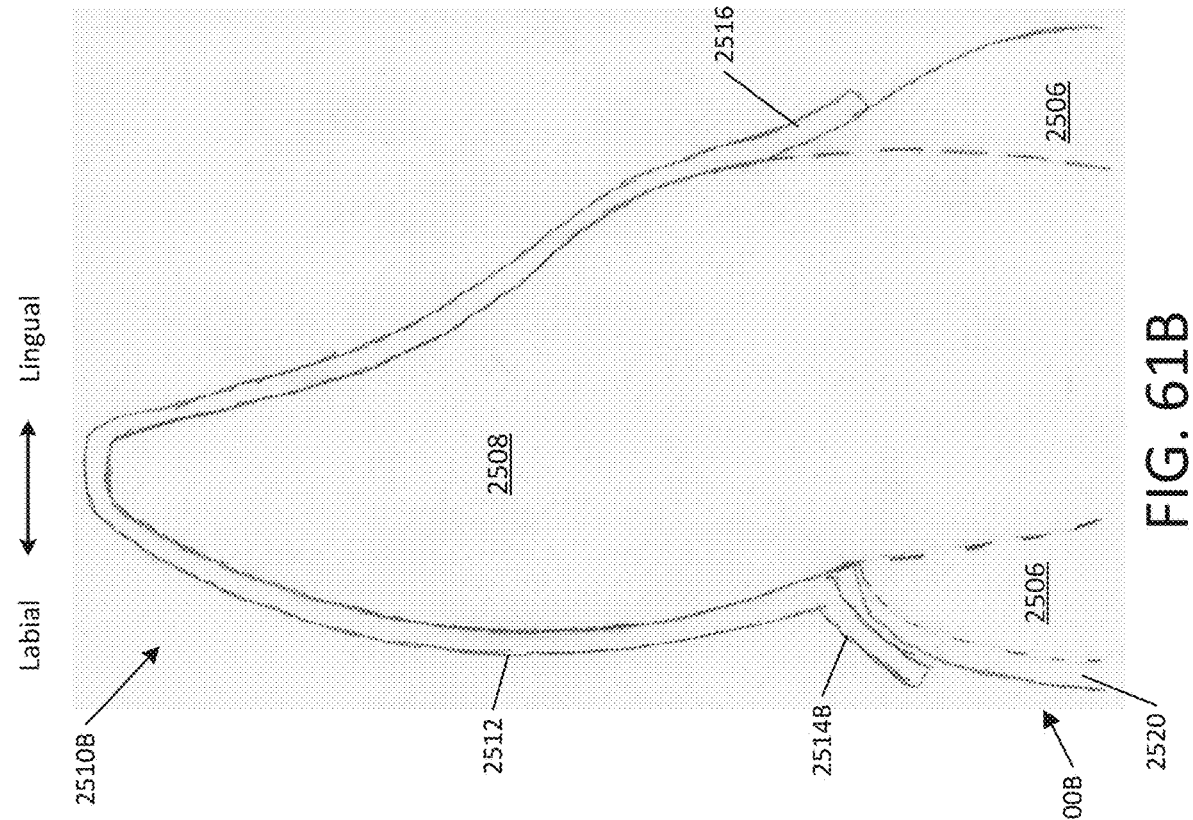
FIGS. 61A and 61B illustrate in cross-section an example of an appliance and a model for forming that appliance, In FIG. 61B an offset has been applied to expand a portion of gingival tissue of the model to prevent impingement of gingival tissue by the appliance.
Figure 61B:
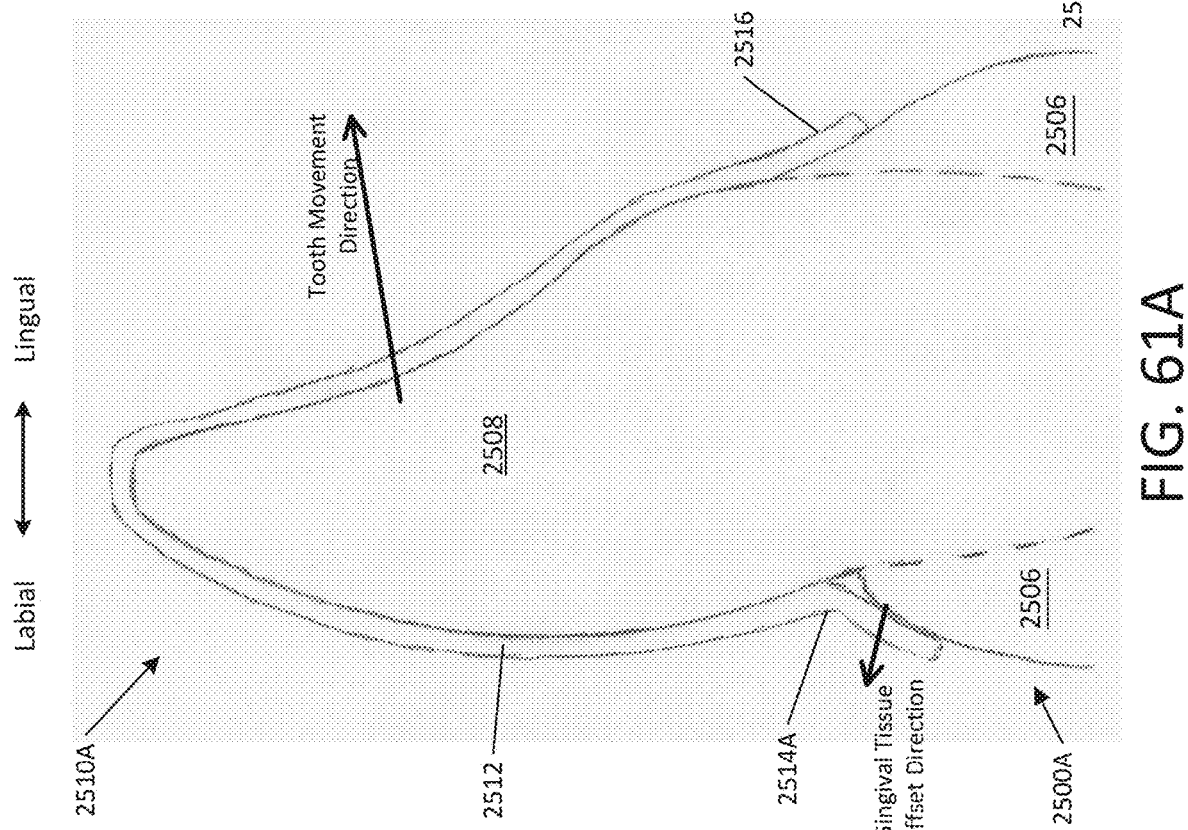

FIGS. 61A and 61B illustrate in cross-section an example of an appliance and a model for forming that appliance. In FIG. 61A, an appliance 2510a is seated on anterior tooth of a model 2500a prior to offsetting the gingival tissue of the model 2510a. FIG. 61B shows a corresponding model 2500b and appliance 2510b after applying an offset to the gingival tissue based on the intended movement of the anterior tooth.

The models 2500a and 2500b may, for example, be formed using a rapid fabrication machine, and the appliances 2510a and 2510b may formed by vacuum-forming thermoplastic materials over the models. The model 2500a includes a gingival portion 2506 that is based on the surface contours of the patient's gingival tissue and a tooth portion 2508 that is based on the surface contours of the patient's teeth. The appliance 2510 includes a tooth portion 2512, a labial gingival flange 2514A, and a lingual gingival flange 2516. In this example, the appliance 2510A is shaped to induce a movement of the anterior tooth in the lingual direction. Here, this movement would cause both the crown and the root of the anterior tooth to move in the lingual direction. In some implementations, the gum tissue would be offset (or otherwise expanded) in approximately the opposite direction. The model 2500B shown in FIG. 61B includes the gingival portion 2506, the tooth portion 2508 and an offset portion 2520. The offset portion 2520 is added based on the anticipated lingual movement of the tooth portion. The resulting appliance 2510B includes the tooth portion 2512, the lingual gingival flange 2516, and a labial gingival flange 2514B. The labial gingival flange 2514B is similar to the labial gingival flange 2514A except that it is offset further in the labial direction to being formed over the offset portion 2520 of the model 2500B.

As another example, if an appliance were shaped to cause a tipping of the crown of an anterior tooth in the labial direction, the root of the tooth would rotate in the opposite direction (i.e., the root would rotate in the lingual direction). In this case, the labial gingival flange of the appliance would need to be offset in a direction opposite of the root movement (e.g., when the root is moving in the lingual direction due to a rotation of the crown in the labial direction, the gum tissue portion of the model would need to be expanded in the labial direction).

In some implementations, expanding the gum tissue of the CAD model includes segmenting the CAD model into a tooth portion and a gum tissue portion. The segmenting of the model may be performed using various techniques, including one or more of machine learning techniques, edge detection techniques, shape detection techniques, position-based techniques, and other techniques. In some implementations, the CAD model is not segmented into separate models. The portion of the CAD model representing gum tissue may be identified. Then, the gum tissue contour surfaces (e.g., the identified portion of the CAD model or the segmented gum tissue model) may be offset using various techniques. For example, the gum tissue contours may be scaled or offset (e.g., vertices may be moved out in the direction of the normal or approximate normal to the surface). The scaling or offset may be uniform or may be non-uniform. For example, the offset or scaling may increase based on distance from the gingival margin (i.e., the interface between the gum tissue and the teeth).

In some implementations, the gum tissue of the CAD model is morphed based on the anticipated movement of the patient's gum tissue that will be caused by the patient's teeth moving or changing orientation due to forces applied by the appliance. For example, as a patient's teeth move, the roots of those teeth will also move, which will in at least some situations cause the gum tissue to change or move. Some implementations simulate the effect of the tooth movement on the patient's gum tissue and then adjust gum tissue of the model so that the appliance will fit over the altered gum tissue. This may be beneficial, for example, when a tooth has been extracted and the appliance (or series of appliances) is being used to move other teeth into the space left by the extracted tooth. Initially, the gum tissue will shrink inward as the underlying may distort into the space left by the tooth's root. But as the aligners pull other teeth into the space, the gum tissue will expand back out. In this situation, an aligner that is formed based on a CAD model with gum tissue expanded based on this anticipated expansion of the patient's actual gum tissue may be comfortable and less harmful to the patient's gum tissue.

In some implementations, the gum tissue is expanded to address dental crowding. Most orthodontic cases involve some degree of dental crowding, and mostly this crowding is in the six anterior teeth (from cuspid to cuspid, including all four incisors.) Crowding can also happen in the posterior part of the dental arch, but it is rarer. In order to eliminate this crowding, the dental arch length may be increased, which mostly occurs in the anterior area.

As the teeth are moved outward (anteriorly, facially) they can be tipped (mostly crown movement) but the roots also need to be moved as well. When the roots are moved, the entire alveolar process of the bone surrounding the root changes shape slightly, which changes the shape of the gums. In some implementations, the gum tissue is expanded based on the anticipated changes in a patient's gums based on the changes to bone caused by movement of the roots. As aligners cause the length of the dental arch to increase, the gum tissue on a model may be expanded so that curved interconnecting elements of the aligners formed on these models do not impinge on the patient's changing gum tissue. In at least some of these implementations, the gum tissue may be expanded in the direction of the expanding arch, which may be the same direction as the roots of the patient's teeth are moving.

Figure 30:
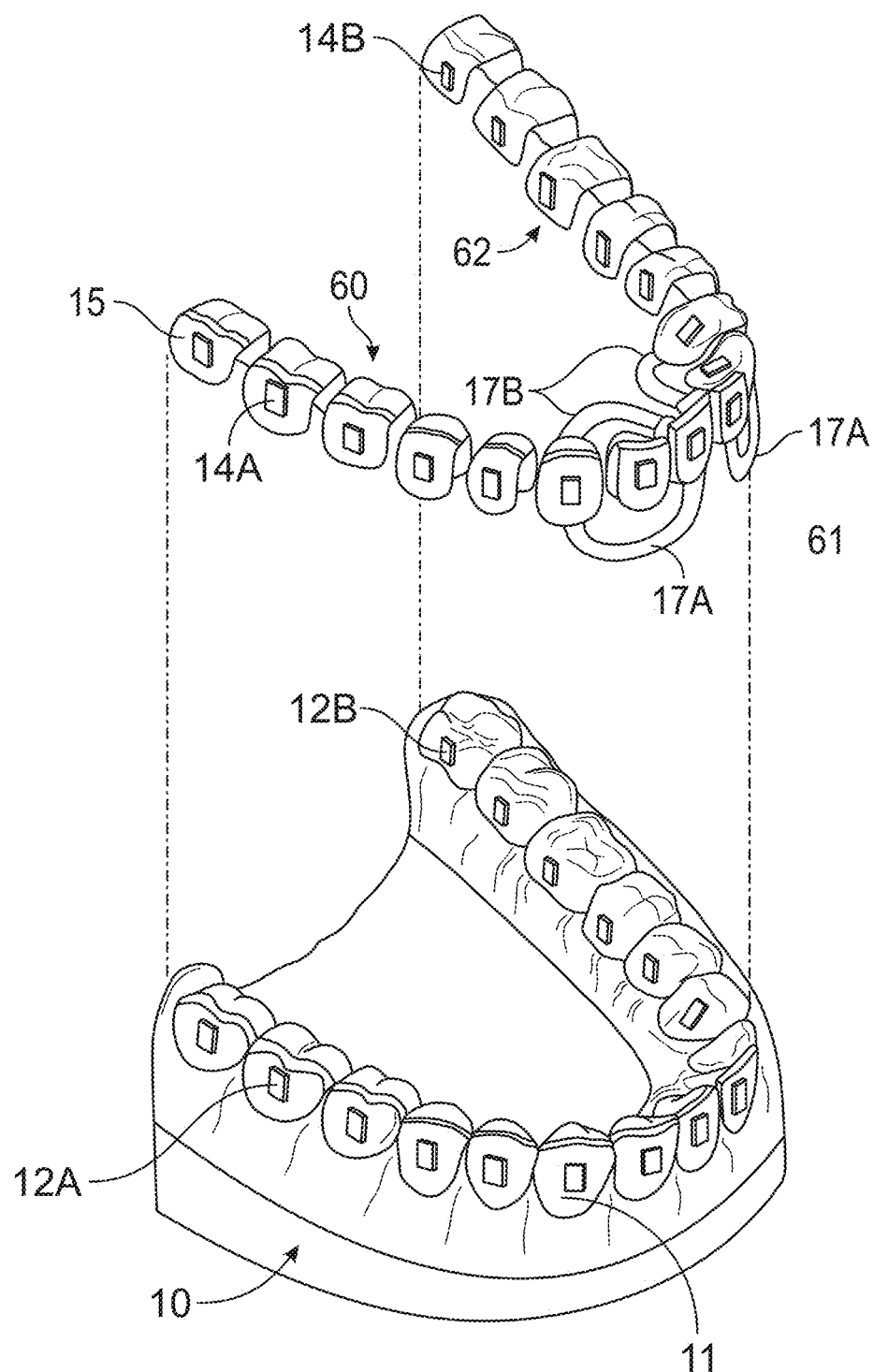
FIG. 30 is a perspective view of a lower dental arch 10 with another embodiment of an appliance having longer interconnecting elements 17A and 17B on both the buccal and lingual aspects of the appliance segments.
Figure 31:
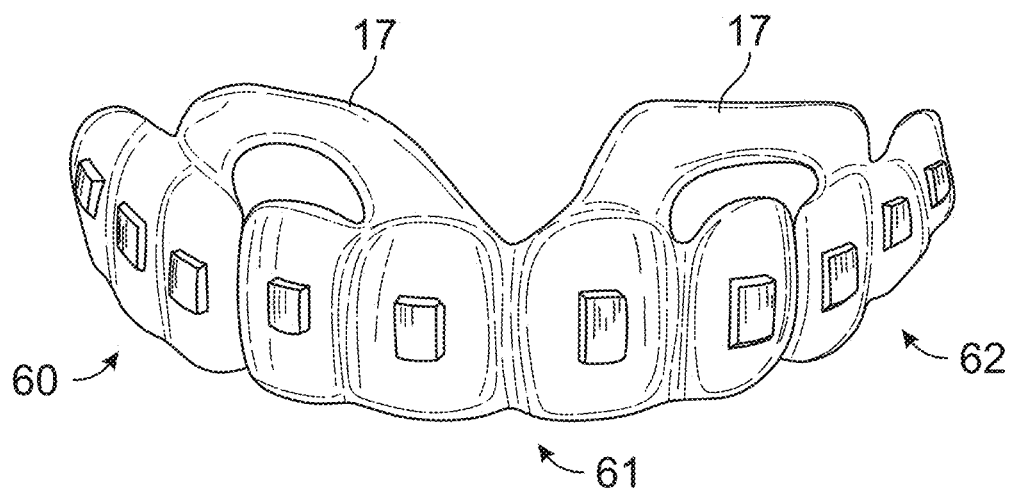
FIG. 31 is a front view of another embodiment of the appliance with longer interconnecting elements 17 on the buccal aspect of the appliance segments.
Figure 32:
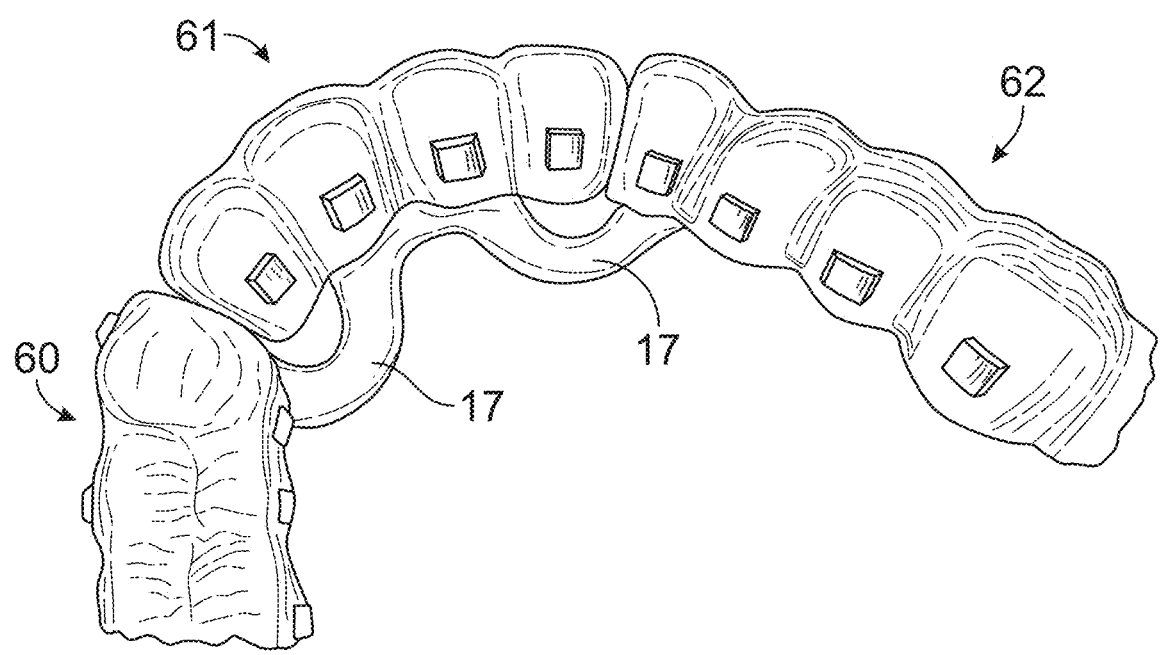
FIG. 32 is a bottom view corresponding to FIG. 31.

FIG. 30 illustrates another embodiment of the present invention having longer interconnecting elements 17A and 17B on both the buccal and lingual aspects. The interconnecting elements 17A, 17B extend between the appliance segments 60-62 and skip over one or more teeth. FIGS. 31 and 32 show another embodiment of the appliance with longer interconnecting elements 17 on only the buccal aspect of the appliance segments.

These embodiments can be used, for example, in cases where we are trying to intrude incisors. Here, the interconnecting elements 17A, 17B extend from the canine over to the central incisor, skipping the lateral incisor. All four incisors are held together as a unit by a single appliance segment 61, and the remaining teeth on either side of the incisors are held together by two appliance segments 60 and 62. These embodiments are primarily intended to overcome the problem during intrusion where most of the intrusive force is placed on the lateral incisor, and the intrusion force is dissipated somewhat by the time it is transferred to the larger central incisor, which is a larger tooth and requires more force to intrude it.

Figure 33:
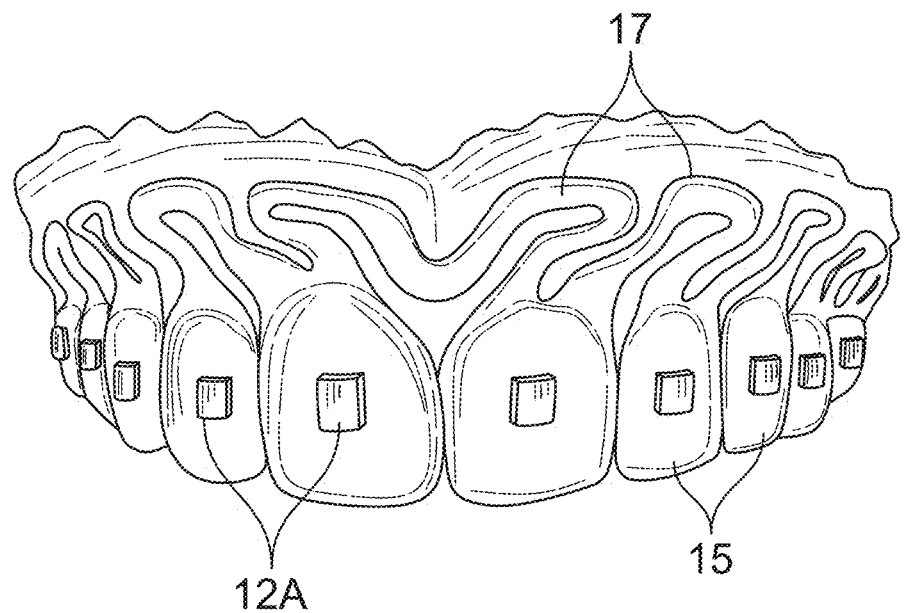
FIG. 33 is a front view of yet another embodiment of an appliance having longer interconnecting elements 17 between the tooth-clasping elements 15 on individual teeth.
Figure 34:
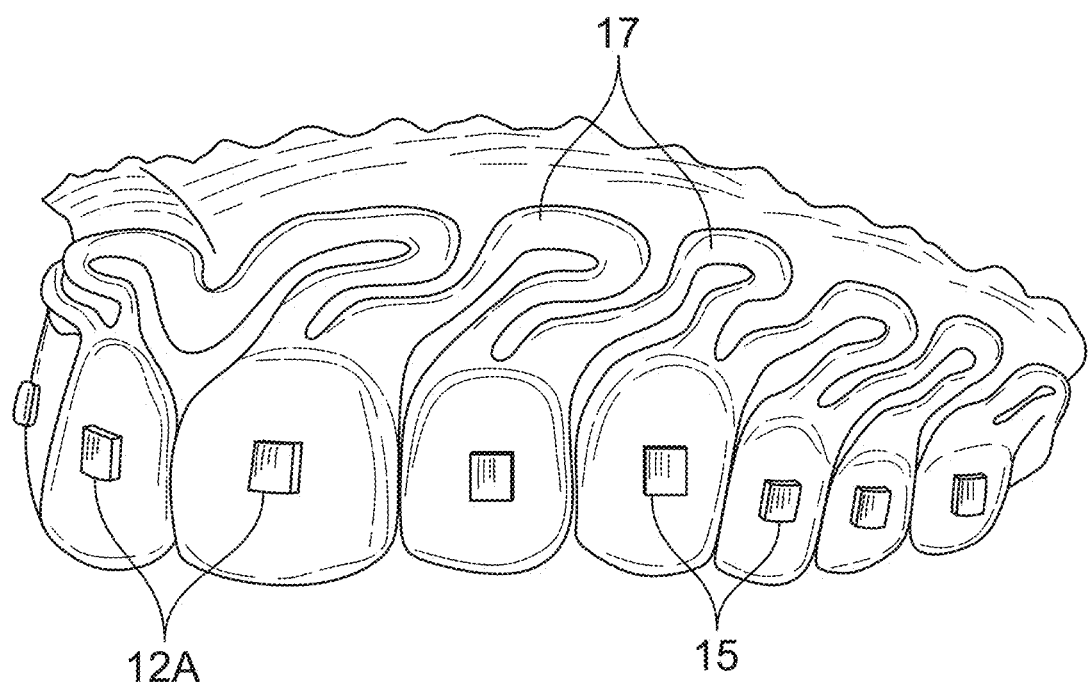
FIG. 34 is a side view corresponding to FIG. 33.

FIGS. 33 and 34 show yet another embodiment of the present invention having longer interconnecting elements 17 between the tooth-clasping elements 15 on individual teeth. These interconnecting elements 17 have a more elongated, irregular shape that allow a greater range of relative motion between the tooth-clasping elements 15 and their respective teeth. In addition, the physical properties of interconnecting elements 17 can be individually designed based on their dimensions, shapes and material properties.

Figure 35:
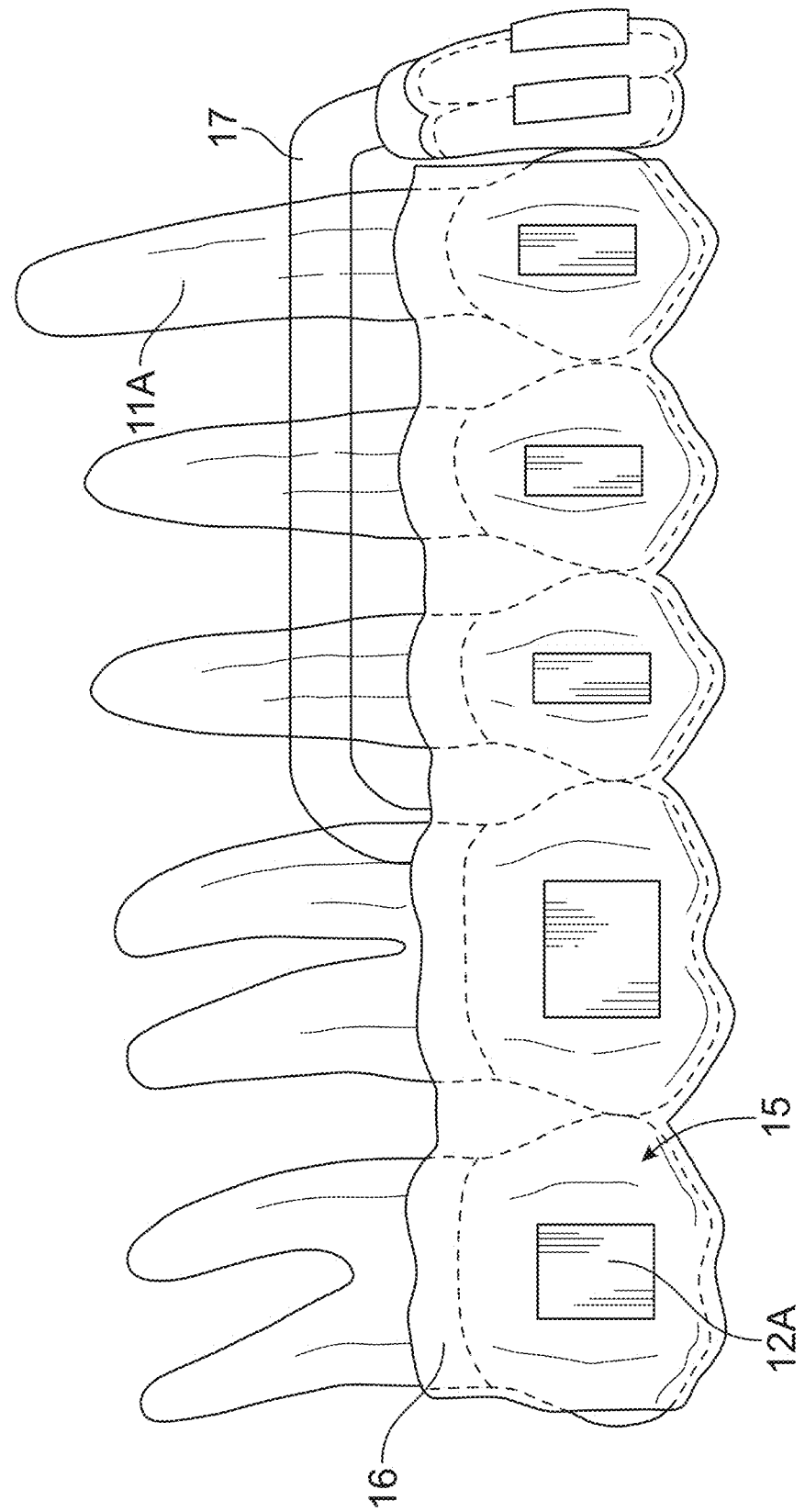
FIG. 35 is a right side view of another embodiment of an appliance on the upper right teeth with an interconnecting element 17 connected from the posterior appliance segment near the first molar tooth to the anterior appliance segment directly above the central incisors.

FIG. 35 shows the posterior teeth all connected into one tooth clasping element, extending from the second molar to the cuspid. A flexible clear plastic interconnecting element 17, (there is one on each side with only the right side shown in this figure) in this case made of the same continuous piece of plastic that forms the rest of the appliance, extends forward and drops down directly above the central incisor to engage a four-unit anterior tooth clasping element that envelopes the incisors, in much the same manner as was shown in FIGS. 33 and 34. The appliance is activated so that vertical force is directed straight up at the central incisors.

Figure 36:
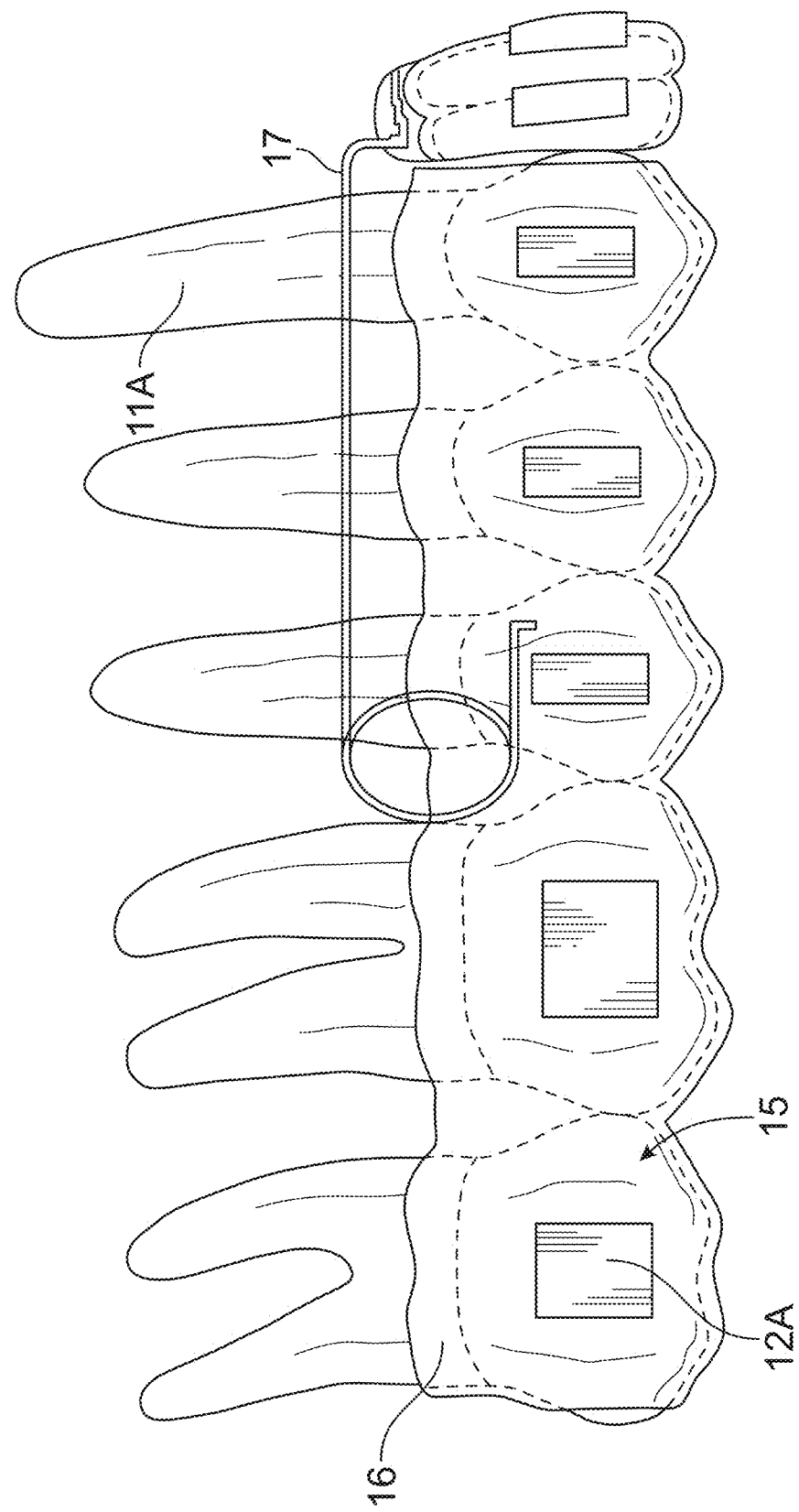
FIG. 36 is a right side view of another embodiment of an appliance on the upper right teeth with an interconnecting element 17 made of wire connecting the posterior appliance segment with the anterior appliance segment.

FIG. 36 shows a similar appliance to FIG. 35, but in this case the active interconnecting element 17 is made of wire connected to the posterior tooth clasping element. The means of attachment is not shown, but could include all of the methods discussed earlier for attaching wires. The wire has a helical coil near to where it attaches to the posterior tooth clasping element, and the anterior end of the wire extends forward to the four-unit tooth clasping element surrounding the incisor teeth. It is anticipated that the wire will be attached to the four-unit anterior tooth clasping element in the flange area covering the gum tissue above the crowns of the teeth where it will be less visible under the upper lip. Preferably, the wire will be attached and will extend all the way across above the four incisor teeth to the left side of the mouth where it will be a mirror image of the wire on the right side and will be the active arm on the left side, also containing a helical coil before it is attached to the posterior tooth clasping element on the left side. The left and right side posterior tooth clasping elements will likely be attached together across the palate by any suitable rigid means including clear plastic. The left and right posterior segments can also be attached to each other across the palate using a plastic or metal trans-palatal arch or bar.

FIGS. 37-42 show a right side view of a portion of embodiments of an orthodontic appliance covering the upper right posterior teeth 107. The supporting bone and gum tissue are not shown—only the teeth 107 with the appliances in place. In each of the figures, the roots 106 of the teeth are shown. Although the appliances in these figures appear to end at the mesial surface of the cuspid tooth, in most embodiments the appliance continues around the arch to removably attach to the incisor teeth and the posterior teeth on the opposite side of the arch. The configuration on the lingual side does not necessarily have to match the configuration shown on the facial side of the appliance.

The present orthodontic appliance includes a thin elastomeric shell with a series of recesses for removably receiving a number of teeth 107. The appliance also incorporates a number of tooth-clasping elements 110 for removably engaging the appliance to the teeth 107. For example, the tooth-clasping element 110 can be a functional region of a single-piece appliance, although some of the embodiments do not have a separately manufactured part designated for this function. The tooth-clasping element 110 can include recesses or holes designed to fit over projecting elements such as the bonded attachments 111 (also referred to as buttons) that can be bonded directly to the teeth. The bonded attachments 111 are typically not removable by the patient during the course of active orthodontic treatment.

Figure 37:
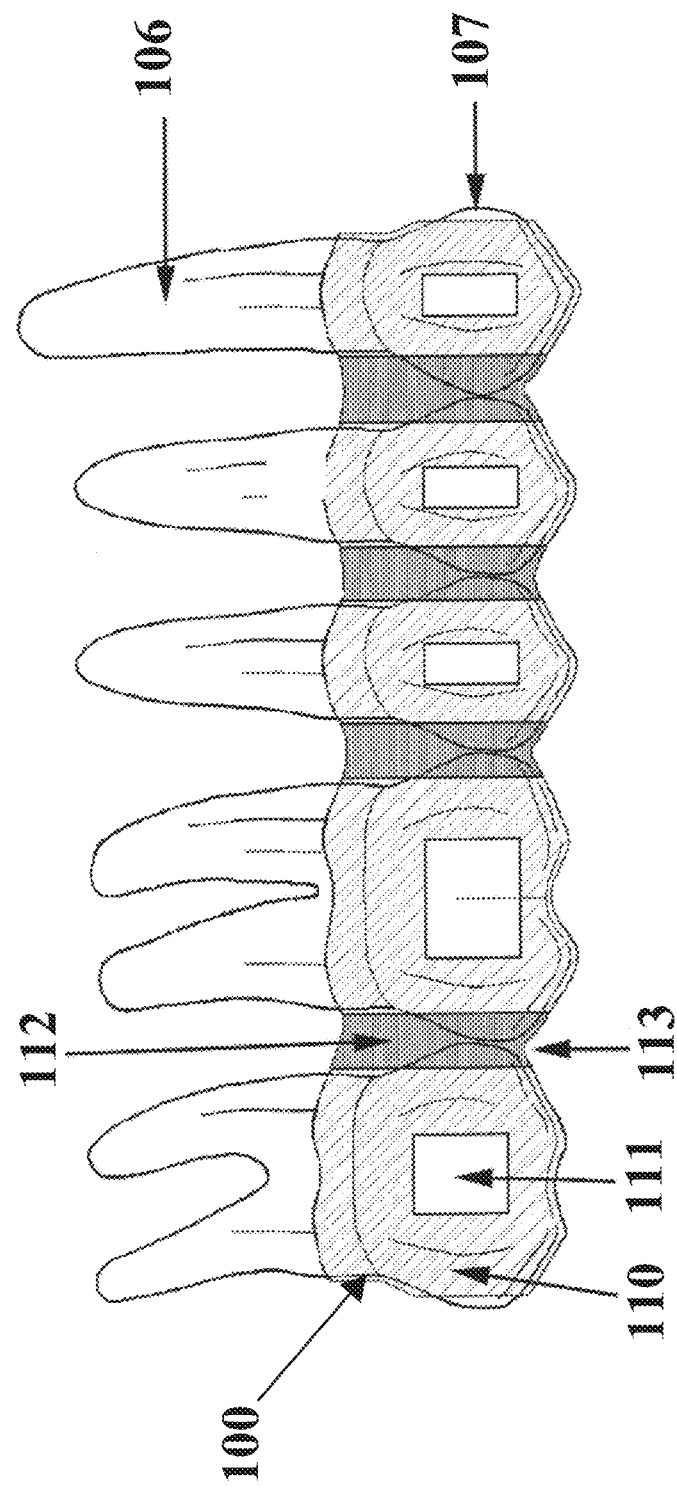
FIG. 37 is a schematic diagram of a right side view of a portion of an orthodontic appliance covering the upper right posterior teeth with tooth-clasping elements covering almost all of the tooth surfaces. Each tooth-clasping element surrounds and can optionally cover a bonded attachment here shown protruding through a hole in the shell of the appliance. Between each pair of adjacent tooth-clasping elements is a flexible zone covering the interproximal area of the teeth.

FIG. 37 shows an appliance 100 with tooth-clasping elements 110 covering almost all of the tooth surfaces. Each tooth-clasping element 110 surrounds a tooth of the teeth 107 and can optionally cover a bonded attachment 111 attached to the tooth of the teeth 107. Here, the bonded attachments 111 are shown protruding through corresponding holes in the tooth-clasping elements 110. Between each pair of adjacent tooth-clasping elements 110 is a flexible zone 112. For example, the flexible zones 112 can be made by varying the topography in two or three dimension to add thickness, for example voids, fold lines, variations in height or thickness, and other features may be added to predetermined zones of the shell of the appliance to add flexibility. In some implementations, the thickness of the material may vary across a thickness gradient (e.g., starting from a first thickness and increasing over specific distance to a second thickness). Although alternatives are possible, the topographic features (e.g., voids) are arranged in patterns in some embodiments. As an alternative, the topographic features may be disposed at locations on the shell that are identified using by a computer performing a generative design process.

In the embodiment illustrated in FIG. 37, the flexible zones 112 are narrow horizontally with the greatest dimension oriented vertically. The flexible zones 112 primarily cover the interproximal areas of the teeth 107 on the buccal and lingual sides of the teeth 107. A band of the flexible zone 112 goes across the occlusal surfaces of the teeth 107 at the marginal ridge areas and the interproximal occlusal area 113. In certain embodiments, such as when adjacent teeth are significantly misaligned, it may be desirable to have the printed pattern only on the buccal and lingual surfaces and not over the occlusal surface, as the presence of the flexible zone 112 is likely to make the appliance less flexible than simply having an opening in the appliance in this area.

Alternatively, the present orthodontic appliance can be described as requiring at least two functional zones. The first functional zone serves as the tooth-clasping element 110. This first zone can be made of any material, but preferably would be made of a clear material so as to minimize the visibility of the appliance. This zone accomplishes the purpose of grasping the tooth, including grasping any bonded attachments 111 that are optionally bonded directly to the tooth surface. Preferably, bonded attachments 111 with straight sides would be bonded on both the buccal and lingual surfaces of each tooth of the teeth 107 in the dental arch that is covered by the appliance, however any shape for the bonded attachment 111 can be used. It is not absolutely necessary to use bonded attachments at all, or they can be used only on either the buccal or lingual side. The bonded attachments 111 help to ensure that control over tooth positions in three dimensions can occur. The functional zone serving as the tooth-clasping element 110 may cover only one individual tooth, or it may cover multiple teeth depending on the malocclusion present and the needs and desires of the orthodontist to accomplish certain types of tooth movements and the need for anchorage control.

The second functional element is a flexible zone 112 of the appliance serving to enhance flexibility of the appliance shell. The flexible zone 112 can be made of the same material that comprises the tooth-clasping element 110, or it can be made of another material. It is likely that the appliance will have more than one flexible zone 112. It is possible to make an appliance that is not divided into zones, but rather most of the appliance is made of the flexible pattern.

Returning to FIG. 1, the tooth-clasping elements 110 preferably include: (a) a circumferential area immediately surrounding the bonded attachment 111 and/or covering the bonded attachment 111; (b) a zone including the areas of the teeth with the greatest undercut (typically along the gum line or the edge of the interproximal areas) for retention purposes; and (c) a connecting zone with a band of fairly rigid material going over a portion of the occlusal surface of the tooth or teeth and extending vertically to include either the circumferential areas surrounding a bonded attachment 111 on the buccal and/or lingual surfaces of the teeth or the areas with greatest undercut. This band of material extending from the buccal side of the tooth to the lingual side of the tooth acts as a U-shaped clamp or clasp, to engage the tooth. The tooth-clasping elements 110 can cover almost the entire crown of each individual tooth and include either a formed recess to surround and engage a bonded attachment 111 or a hole through which the bonded attachment 111 protrudes. Alternatively, the tooth-clasping function can be performed primarily by the patterned elastomeric shell of the appliance, with or without the use of a bonded attachment 111. If a bonded attachment 111 is used, the tooth-clasping function can be performed by having a simple border around the bonded attachment 111. The areas covered by the flexible zones 112 can be small if only limited flexibility is desired, or larger if greater flexibility is required. The bonded attachments 111 that are shown have a rectangular shape, although several other suitable geometric shapes can also be utilized.

The tooth-clasping elements 110 on the anterior teeth can be made of any suitable material, and is typically made from a clear material. The tooth-clasping elements can be formed from several different types of plastic materials including but not limited to rapid prototyping materials and vacuum forming. Example material types include but are not limited to urethanes, acrylics, and polycarbonates, which can be thermoformed over tooth models to produce the desired tooth alignment appliances. The material can be an acrylate-functional material or any other suitable material. In some embodiments, the bonded attachments 111 have a rectangular shape with parallel side surfaces and parallel top and bottom surfaces. It is to be understood that there are many possible shapes for bonded attachments that would be suitable. Many different styles and shapes have been shown in the prior art, which one of skill in the art would recognize can be used with the appliances described herein. Bonded attachments are utilized in this disclosure for at least two purposes. First, the bonded attachments increase retention of the tooth-clasping elements to the teeth, so that the appliance is less likely to become dislodged from the desired location on the teeth. When the appliance is fitted into place on the teeth, it follows an approximately vertical path described by dentists as the path of insertion, which is approximately perpendicular to the biting surfaces of the teeth called the "plane of occlusion." The curved shape of teeth provides some natural undercuts in some areas when one views the teeth from the path of insertion. However, not all teeth have undercuts when viewed from the perspective of the path of insertion. It depends on the tooth. For instance, most anterior teeth (incisors and cuspids) have only small undercuts and these are near the gum line. A tooth that is incompletely erupted, or a tooth of a young person with gum tissue partially covering the teeth may not have any undercuts when viewed from the perspective of the path of insertion. It also depends on the angulation of the tooth. If the long axis is tipped from the ideal position, there may be no undercuts on one side of the tooth relative to the path of insertion. The retention of the tooth-clasping element is enhanced by the presence of bonded attachments placed on the teeth. The bonded attachment is shaped in such a way as to provide an undercut surface when viewed from the perspective of the long axis of the tooth and from the path of insertion. The top and bottom surfaces are the primary surfaces to enhance undercuts.

The second purpose for bonded attachments 111 is to have a shape that allows the tooth-clasping element 110 to transmit desired forces to the teeth 107 in three dimensions, thereby providing control over movement of root 106. The actual forces to move the teeth are provided by the resilient properties of the flexible interconnecting elements or by regions of the appliance that are deformed when tooth-clasping elements are engaged on the teeth with the bonded attachments. The tooth-clasping elements 110 precisely grip the teeth 107, with the enabling mating shape of the bonded attachments 111. The bonded attachments 111 shown in the figures have a flat rectangular shape and provide a connection with the tooth-clasping element 110 in two dimensions. The combination of the two bonded attachments 111 on either side of the teeth 107 (with each of the bonded attachments 111 acting at the ends of a lever arm) allows forces to be applied for control of movement of root 106 in the third dimension.

In the rectangular bonded attachments 111 shown, the parallel outer edges of the bonded attachment 111 provide a surface for positive engagement to allow forces to be applied to the teeth 107 to control movement of root 106. Grooves or special shaping on the outer surface of the bonded attachment 111 can help guide the tooth clasp into position. The bonded attachments can be pre-made of any suitable material including dental composite, clear or tooth-colored ceramic materials, or any suitable clear plastic material, and bonded to the teeth using conventional bonding techniques and adhesives that are well-known in the art including the steps of mildly acid-etching the enamel prior to placing the bonded attachment. A technique well-known in the art called indirect bonding can be utilized, with a pre-formed guide made of flexible material to hold the attachments in the desired position while the adhesive is curing to ensure accurate attachment placement on the teeth. The bonded attachments 111 can alternatively be fabricated out of dental composite using pre-made hand-held molds for placement on teeth one at a time. Such pre-made hand-held molds are commercially available for this purpose. A third alternative is to utilize a mold made using computer 3D CAD/CAM technology where the shape and the size of the attachments are planned in the computer and a model of the entire dental arch with attachments in place is printed using a 3D printer. From this model a mold is made from which to fabricate and place dental composite attachments in precisely the right location directly on the teeth. The software to accomplish this task is commercially available. The tooth-clasping elements 110 shown in the figures include a rectangular hole of precise dimensions through which the bonded attachment 111 projects. A recess on the inside of the tooth-clasping element 110 of exactly the same shape and size as the attachment should work equally as well as a hole, particularly if the tooth clasp is printed because of the ability of the printing process to potentially include a better more precise fit than can be obtained by thermoforming. The tooth-clasping elements 110 are attached to flexible interconnecting elements of many types, as illustrated in the drawings. In some of the embodiments, the appliances are made of one piece of material, and the tooth-clasping element and the flexible interconnecting elements are all part of a monolithic whole unit. Functionally, different regions of the single piece positioned serve as the tooth-clasping element and the flexible interconnecting elements.

It is anticipated that the present orthodontic appliances will be primarily produced by planning and designing the appliances using computerized 3D CAD/CAM software. Many off-the-shelf software programs are currently available that are capable of this function. The standard surface mapping computer algorithms define the surface as a series of triangles. The actual physical production of the appliances can be accomplished by vacuum-forming thermoplastic materials over models produced digitally and combining the thermoformed portion of the appliance with the other necessary elements. This step is followed by using computer automated trimming technologies such as CNC milling or laser cutting (e.g., to create voids in the flexible region). In particular, the clear tooth-clasping elements could be produced by vacuum thermoforming. In the single-piece variations, the tooth-clasping elements and the flexible interconnecting elements could all be vacuum thermoformed together.

Alternatively, the present appliance can be directly produced by 3D printing without first producing 3Dimensional models. An advantage of direct 3D printing is that more complex shapes could be more easily printed, and almost no trimming of excess material would be necessary, thereby saving time and avoiding wasted material. Some new 3D printers can print more than one material at the same time. The flexible interconnecting elements could be printed along with the tooth-clasping portion. Although alternatives are possible, in some embodiments, the tooth-clasping portion and the flexible portion are formed from different materials. The materials can be blended or intertwined which will avoid the need for a separate attachment step in manufacturing.

Alternatively, the tooth-clasping portion and the flexible portion are formed from the same material. For example, the flexible portion can be thinner than the tooth-clasping portion. As another example, the material in the flexible portion can be formed with a pattern of voids that causes the material in the flexible portion to be more flexible than the material in the tooth-clasping portion. As yet another example, the flexible portion may include patterns of creases or folds that cause the flexible portion to be more flexible than the tooth clasping portion. Non-limiting example of flexible portions with various patterns are illustrated and described with respect to at least FIGS. 43-56.

Another option involves direct CNC milling of the appliances or portions of the appliances from a block of plastic material. Yet other fabrication techniques can be used to form the appliances too.

For all the variations, a series of appliances can be formed to cause the tooth movement in movement stages. Each appliance is designed to be worn during a movement stage in which the teeth are moved a small distance. After a movement stage is complete, the patient can wear a successive appliance to start a successive movement stage that continues the movement with another small step toward the desired goal tooth position.

In some embodiments, each appliance in the series is designed so as to fit over the desired position of the teeth after movement caused by the appliance. The appliances are deformed to fit over the initial position of the teeth. In some embodiments, the various flexible portions described herein allow the appliance to deform to fit over the initial position of the teeth.

Ideally, the tooth-clasping elements fully engage each tooth when placed on the patient's teeth. If the patient wears the appliance for a sufficient number of hours each day, after the appliance has been worn for a few weeks, the resiliency of the appliance will carry the teeth toward the desired position for the end of that particular movement stage. Then the appliance for the next movement stage is placed on the teeth and will carry the teeth another prescribed distance, and so on until the desired final position is reached. In some embodiments, new impressions or new digital scans during the tooth positioning process (e.g., after every movement stages), which are then used to fabricate successive appliances, to ensure the appliances continue to fit accurately as the process of straightening the teeth progresses. Alternatively, the entire series of appliances can be fabricated initially based on pre-treatment impression or scan data.

In some implementations, the desired movements of the teeth include tipping movements or any other type of tooth reorientation (e.g., rotations around the longitudinal axis of the tooth, tipping in any direction, or combinations thereof). For example, one or more aligner (or appliance) in a series of appliances may tip a tooth and one or more aligner (or appliance) in the series may move the tooth. In some implementations, an aligner may both move and tip the tooth. In some implementations, the tipping movements may tip the crowns of teeth away from the desired position of the tooth so as to cause a root-first movement of the tooth towards the desired position. This tipping movement or tipping force may be beneficial to prevent the crown from tipping in the direction of movement during a movement stage. In some implementations, the tipping movements are selected to cause the tipped teeth to load interconnecting elements (e.g., U-shaped interconnecting elements) with force so to overcome the potential drawbacks that the increased flexibility of the interconnecting elements may cause. Further, the tipping of the teeth may cause the appliance to apply force to close spaces, and not merely passively engage the teeth. In some implementations, curved interconnecting elements are included that are configured to providing a tipping force on the patient's tooth to prevent the crown of the patient's tooth from tipping in the direction of movement. In some implementations, the movements of the teeth are stages such that reorientations (e.g., tips and rotations) occur entirely or primarily in earlier stages of the treatment. Beneficially, this may provide for earlier aesthetic improvements for the patient. In some implementations, the movements of the teeth are staged in a manner do not move along a straight path from the initial position to the desired final position. Instead, the center of resistance of a tooth may be moved first, and then the tooth may pivot around the center of resistance. In some implementations, the appliance is configured to apply a consistent rotational overcorrection in some or all of the stages to offset the tipping movement that may otherwise be induced by the flexible interconnecting elements (e.g., the rotational overcorrection may be applied in a direction opposite the moment of force applied to the crown). For example, applying the overcorrection may include forming the appliance such that it would fit a tooth that were rotated away from the movement direction. The appliance may be configured to, for example, fit a tooth that were rotated away from the movement direction by 10 degrees or another amount.

As shown in FIG. 37, the tooth-clasping elements can be fitted over individual teeth. However, if adjacent teeth are aligned, and it is anticipated that this will routinely occur during later stages of treatment, it is not necessary to generate a separate tooth-clasping element for each individual tooth in each stage. Groups of adjacent teeth will have tooth-clasping portions combined if these teeth are well aligned with each other. It may also be desirable in certain stages of treatment to combine teeth together in groups to be used as anchorage units, to provide better control over the movements of other groups of teeth. This concept is commonly used in orthodontic treatment with fixed braces, especially when extraction spaces are being closed and is well-described in the prior art. It is also possible to combine features of several variations of the embodiments described in this disclosure into one appliance to accomplish certain types of movements more efficiently.

Figure 38:
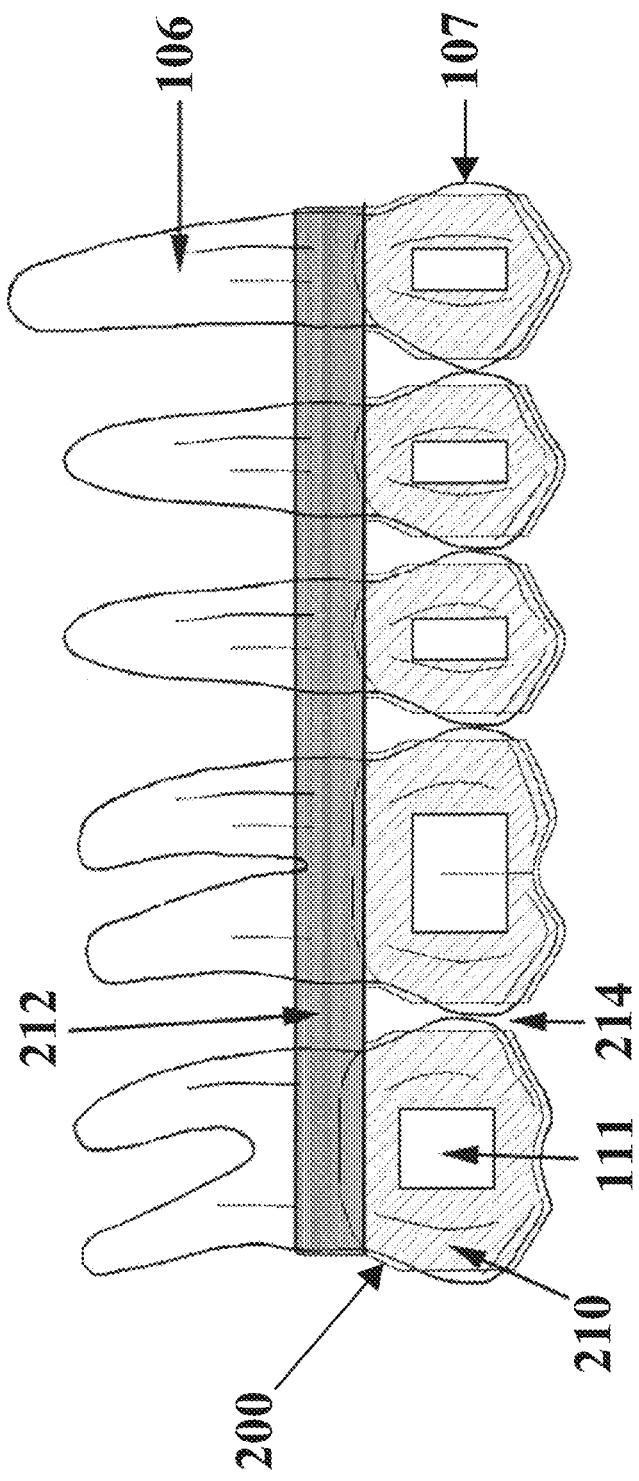
FIG. 38 is a schematic diagram of another embodiment of an orthodontic appliance similar to FIG. 37 with a flexible zone extending as a narrow horizontal band between the tooth-clasping elements.

FIG. 38 shows another embodiment of an orthodontic appliance 200 with tooth-clasping elements 210 covering most of the tooth surfaces. Here again, the tooth-clasping element 210 surrounds and can optionally cover the bonded attachment 111 shown protruding through a hole in the tooth-clasping element 210 having a characteristic shape and dimensions. In this example, the tooth-clasping element 210 includes multiple disjoint parts that are separated by gaps such as gap 214. Attached to each of the disjoint parts of the tooth-clasping element 210 (and in some embodiments made of the same material and continuous with the tooth-clasping element) is a flexible zone 212 made from a printed pattern. The flexible zone 212 is on both the buccal and lingual surfaces of the teeth and is primarily attached to the flange area of the tooth-clasping element 210 covering a portion of the gum tissue immediately adjacent to the gingival margins of the teeth. This flange area is partially obscured by the flexible zone 212 comprising a patterned band. Although not shown in FIG. 38, in some embodiments the tooth-clasping element 210 can include a large flange area that extends further toward or over the gingival tissue. The flexible zone 212 can also cover a small portion of the tooth between the bonded attachment and the gum line. The flexible zone 212 in this embodiment comprises a horizontal band of flexible material that connects each of the disjoint parts of the tooth-clasping element 210.

Figure 39:
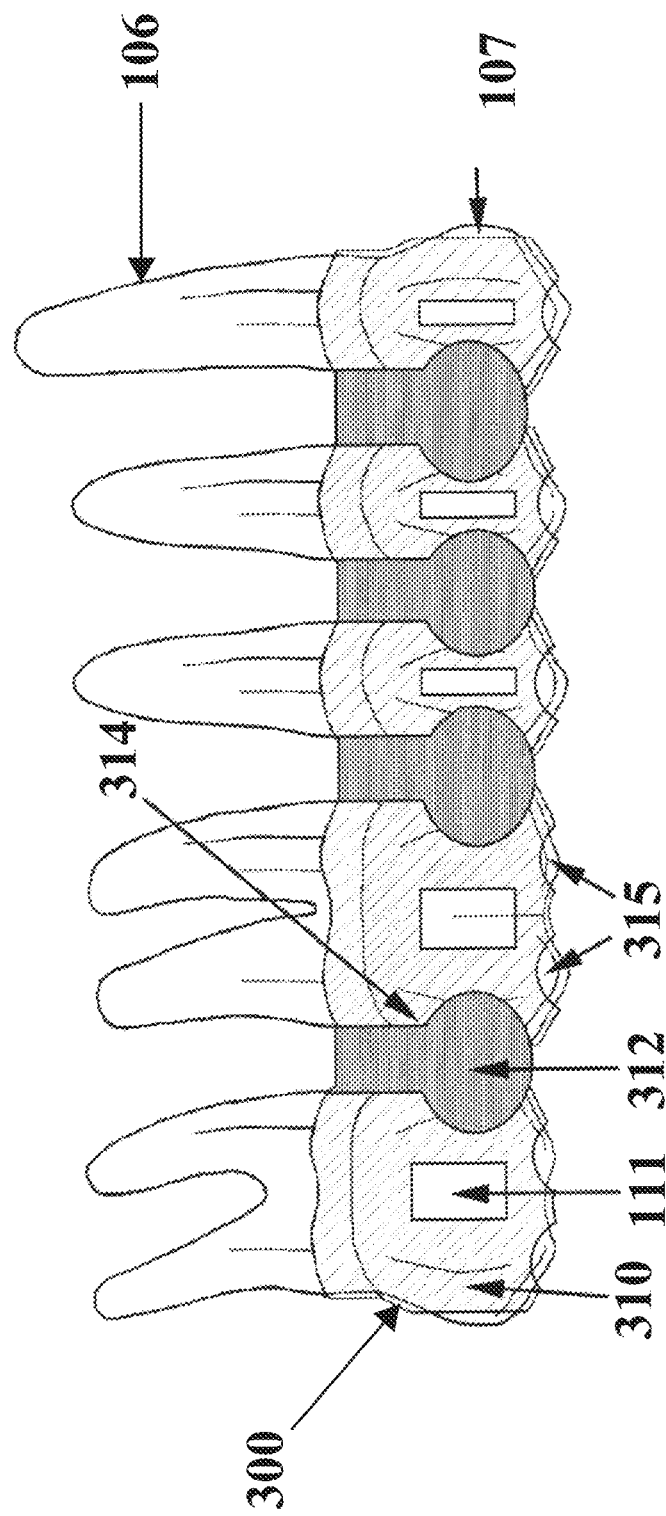
FIG. 39 is a schematic diagram of another embodiment of an appliance similar to FIG. 37 in which there is an irregular border between the tooth-clasping elements and the flexible zone of the appliance, and the flexible zone is larger in size.

FIG. 39 shows another embodiment of an orthodontic appliance 300 similar to FIG. 37 with tooth-clasping elements 310, and bonded attachments 111. The difference is that here there is an irregular border 314 between the tooth-clasping elements 310 and the flexible zone 312 of the appliance. Also, the flexible zone 312 is larger in size. In some embodiments, the larger flexible zone 312 will increase the flexibility and the range of the appliance. The shape of the flexible zone 312 shown in FIG. 39 is an illustration as to how alternative shapes of the flexible zone can be used. The shape of the flexible zone 312 is not confined to the shapes shown here. Other shapes are possible. Optionally, the cusp tips of the teeth can protrude through openings 315 in the tooth-clasping zone of the appliance. Again as in FIG. 37, the flexible zone 312 does not necessarily need to extend over the occlusal surface but can be limited to the buccal and lingual sides of the appliance.

Figure 40:
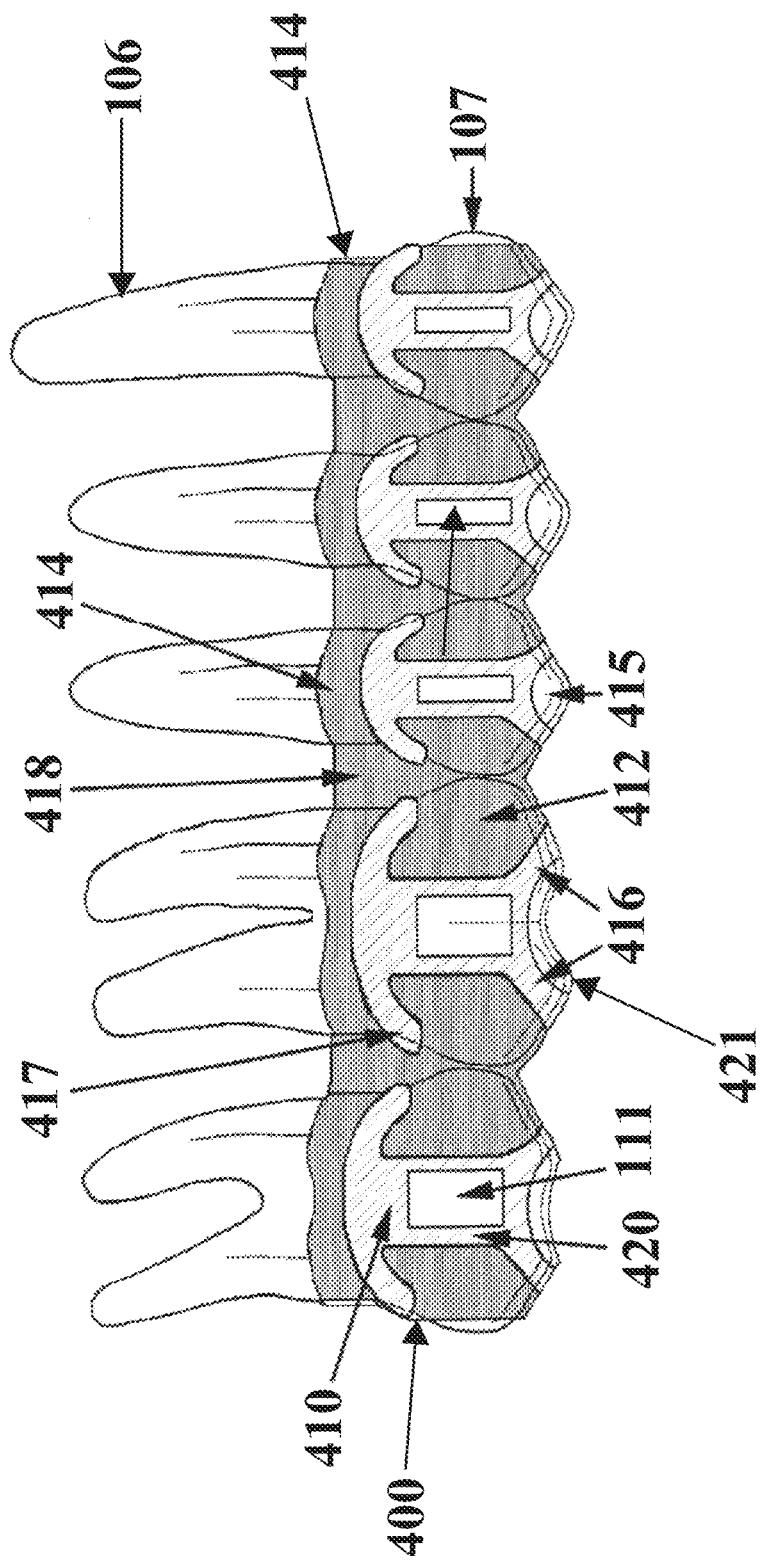
FIG. 40 is a schematic diagram of another embodiment of an appliance in which the size of the tooth-clasping elements is reduced and the flexible zones are enlarged.

FIG. 40 shows an embodiment of an orthodontic appliance 400 with another variation in the shape of the tooth-clasping elements 410. The tooth-clasping elements 410 are reduced in size so that the flexible zone 412 can be larger. Certain key functional portions of the tooth-clasping elements 410 remain. In this illustration, rectangular bonded attachments 111 are shown, although other shapes can be used instead. A border area 420, which may be a portion of the tooth-clasping element 410 immediately surrounding the bonded attachment 111 is in tight contact with the bonded attachment 111. There is also a portion of the tooth-clasping element 410 that engages the undercut areas of the teeth 107 along the gum line and includes an interproximal extension 417 that extends into the interproximal area of the teeth 107. Although alternatives are possible, FIG. 40 shows the interproximal extension 417 extending slightly into the interproximal region. The portion of the tooth-clasping elements 410 that crosses over the occlusal surface 421 of the teeth 107 also remains. In this, case the tooth-clasping element 410 has a Y-shaped configuration 416 as it is divided into two bands of material as it crosses over the occlusal surface 421 of the teeth 107.

Optionally, as it is shown in the drawing, the cusp tips can protrude through openings 415 in the tooth-clasping element 410 to reduce contact by the opposing teeth with the orthodontic appliance 400. Aligner appliances are well-known to encroach on the "freeway space" between the upper and lower teeth when the jaw muscles are at rest, and speech is often affected by the presence of the appliances. The openings in the occlusal surface will reduce the vertical height of the appliance over the teeth, making the appliances more comfortable to wear, especially when the user bites down, and less likely to interfere with speech.

The flexible zone 412 includes a flange area 414 formed of flexible patterned material that is shown extending over the gum line adjacent to the crowns of the teeth 107 into the interdental area 418 of the patient's dentition (which also may be referred to as an interdental region). The flange area 414 is also shown extending over the gum tissue in the interdental area 418 of the teeth 107 (which may include the interproximal spaces). It is not necessary for the function of this appliance 400 to have the flange area 414 extend over the interdental area 418, and it possible for the appliance 400 to be trimmed conventionally along the gum line of the teeth 107. In some embodiments, having the flexible material over the interdental area 418 adds to the strength of the appliance 400, and adds some rigidity to the appliance 400 so this is an optional feature that can be utilized or not depending on the desired rigidity of the appliance to treat a specific malocclusion.

Figure 41:
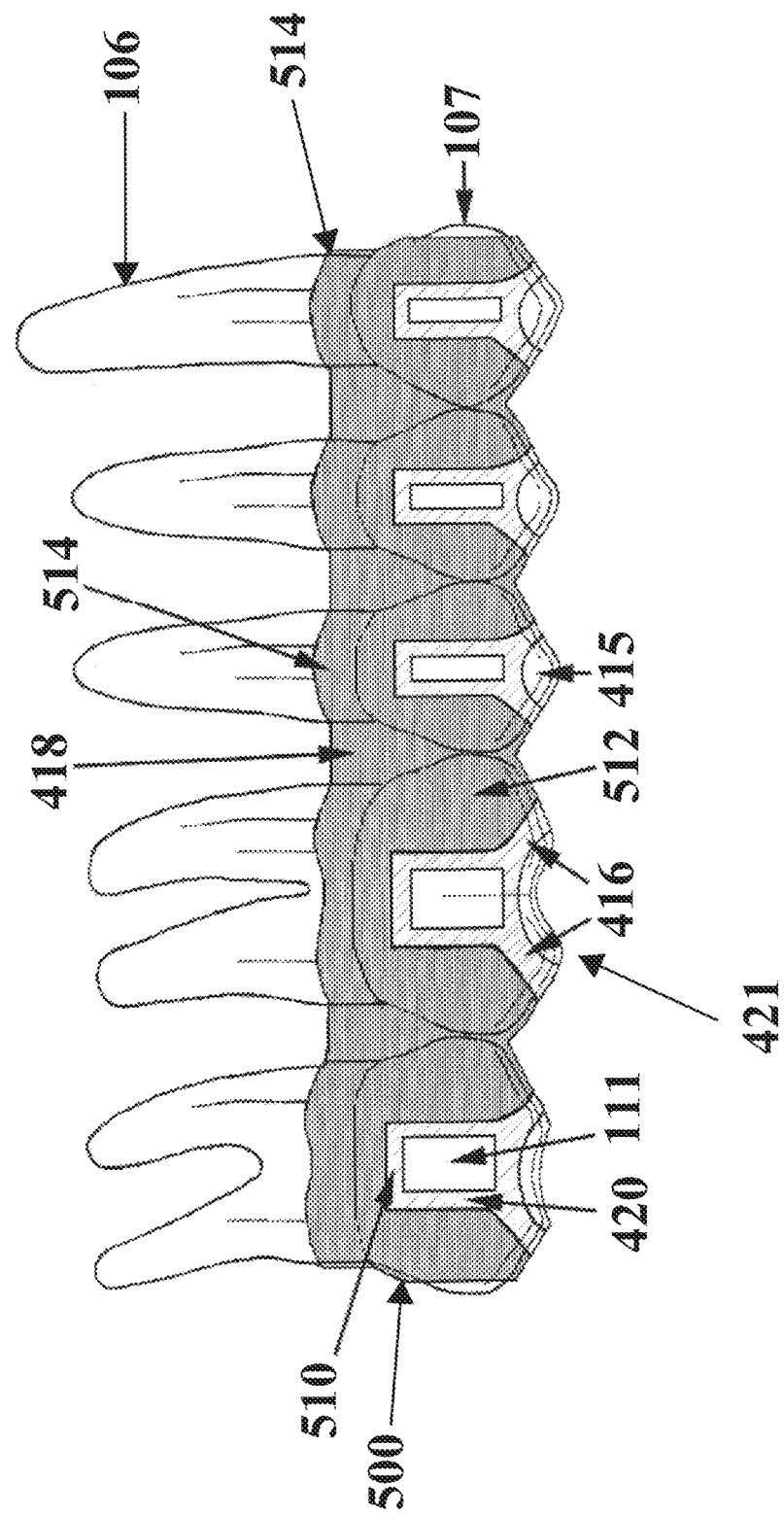
FIG. 41 is a schematic diagram of a simplified variation of an appliance similar to the one shown in FIG. 40.

FIG. 41 shows an embodiment of an orthodontic appliance 500 that is similar to the one shown in FIG. 40, but the design is simplified. The flexible zone 512 covers the lateral surfaces of the crowns of the teeth 107 and includes a flange portion 514 that extends over the over the gum line to the interdental area 418 and over the gingival tissue. The flexible zone 512 is made of a plastic material formed into a flexible pattern. The flange portion 514 that extends over the interdental areas 418 and the gingival tissue is optional and is not included in all embodiments.

Rectangular bonded attachments 111 are shown on all of the teeth. The attachments could be made in any shape where there are flat edges to engage the surrounding tooth-clasping element. In this case, the tooth-clasping element 510 includes a border area 420 surrounding the bonded attachment 111. This border area 420 is present on both the buccal side (shown) and the lingual side (not shown), and connecting each of the buccal and lingual areas is another portion crossing over the occlusal surfaces 421 of the teeth 107. In the posterior teeth shown here, the portion of the appliance crossing over the occlusal surfaces is divided into a Y-shaped configuration 416 to allow the cusp tips to protrude through openings 415 in the tooth-clasping element 510 of the appliance 500 to make it easier to wear the appliance 500. As discussed above with respect to other embodiments, the appliance 500 is shown only on the buccal side of the teeth 107, and the mesial surface of the cuspid tooth of the teeth 107 protrudes through a hole in the appliance. The appliance will usually be made to cover all of the teeth in one arch, and will not normally end at the cuspid as shown here. Ending the appliance at the cuspid is only used here to simplify the drawing.

Figure 42:
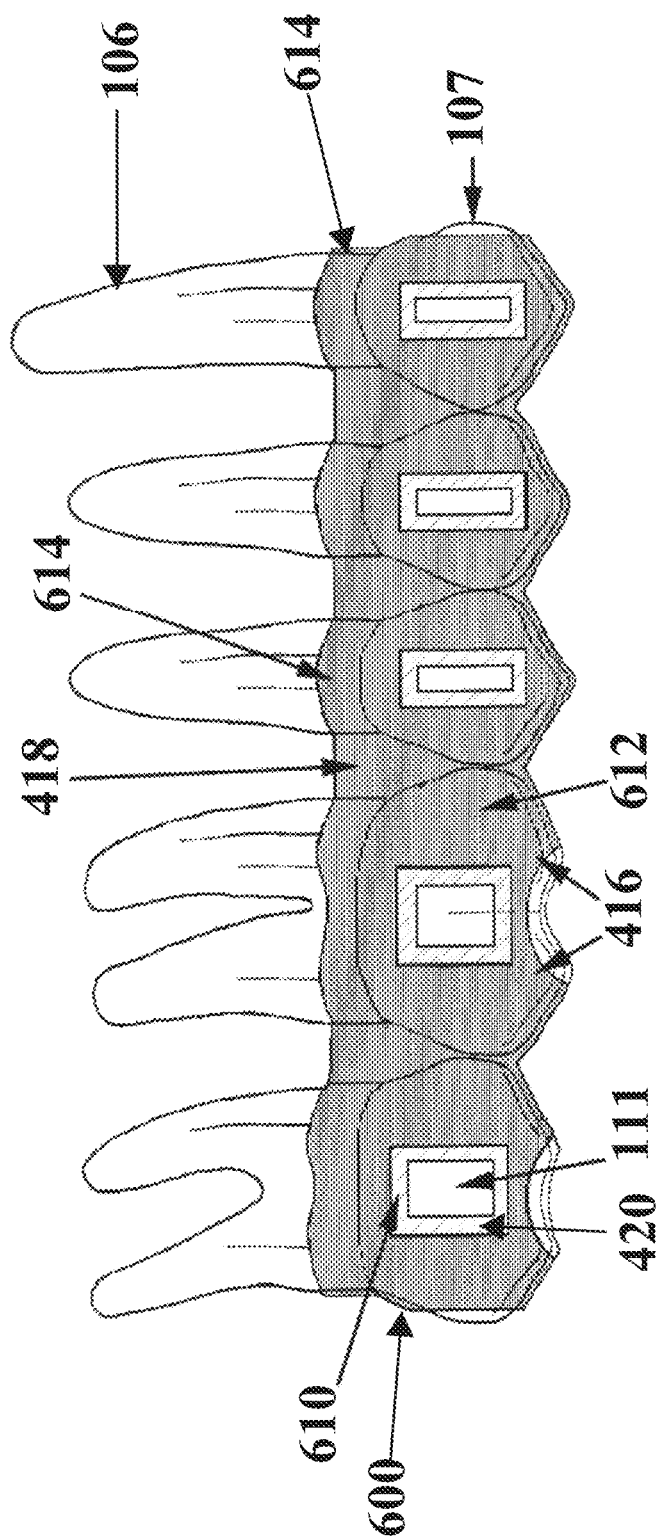
FIG. 42 is a schematic diagram of an embodiment similar to FIG. 41, but the tooth-clasping element surrounds the bonded attachment with narrow borders.

FIG. 42 shows another embodiment of an orthodontic appliance 600 that is similar to the orthodontic appliance 500 shown in FIG. 41, but the tooth-clasping element 610 includes only the border area 420 that surrounds the bonded attachment 111. If there are attachments on both the buccal and lingual sides of the teeth, then this border will surround the attachments on both sides. The remainder of the appliance will be formed by the flexible zone 612, which includes a flange 614 that covers the interdental area 418 and gingival tissue and may be formed from flexible patterned material. The openings 415 in the appliance 600 over the cusp tips of the teeth 107, as shown in FIG. 41, can be used or not used, but are shown here only on the first and second molar teeth, the teeth closest to the anatomic hinge, and therefore the area most likely to experience occlusal contact from the opposing teeth.

Figure 43:
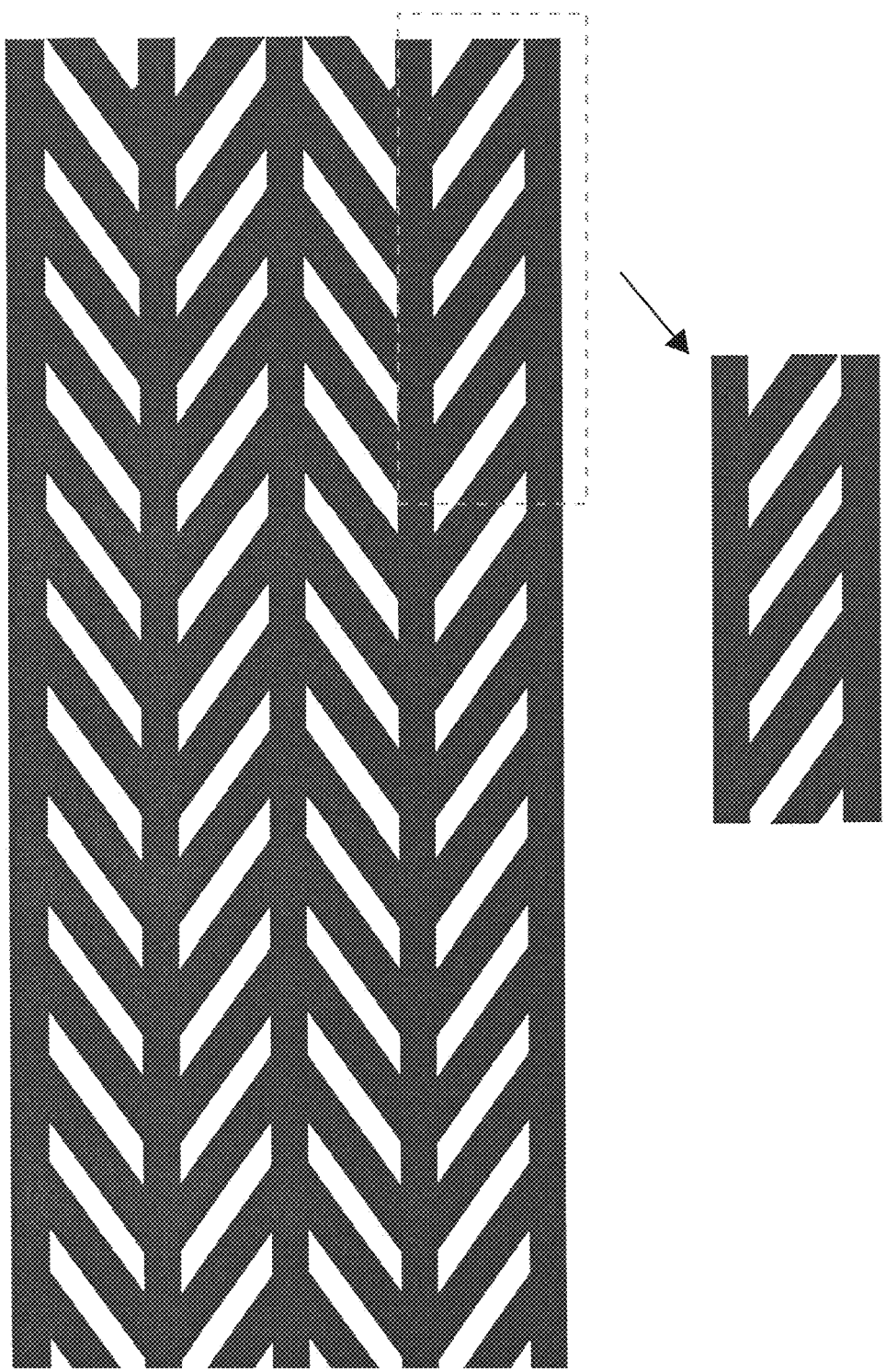
FIG. 43 is a schematic diagram of an example of a flexible pattern to produce a chevron effect.

FIG. 43 is an example of a portion 700 of a flexible zone of an orthodontic appliance, such as but not limited to the orthodontic appliances illustrated in FIGS. 37-42, that includes a flexible 3D pattern. The pattern can be alternated as is shown here to produce a chevron effect, or it can be used with a diagonal stripes going upward toward the left or upward toward the right.

Figures 44A, 44B:
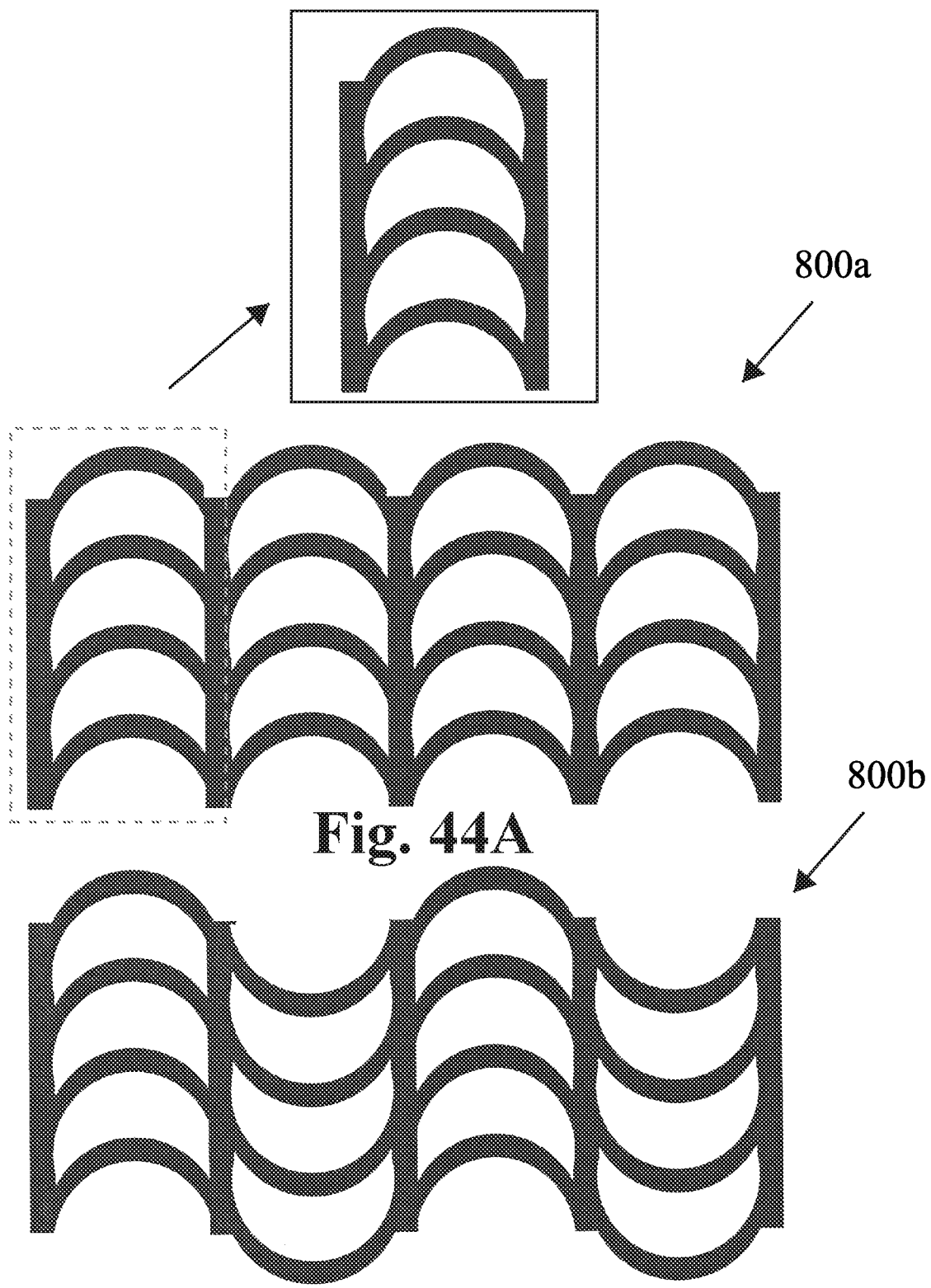
FIG. 44A is a schematic diagram of another example of a flexible pattern with curved segments.
FIG. 44B is a schematic diagram of another example of a flexible pattern with curved segments.

FIGS. 44A and 44B are schematic diagram of examples of portions 800a and 800b of embodiments of flexible zones of orthodontic appliances, such as but not limited to the orthodontic appliances illustrated in FIGS. 37-42, that includes a flexible 3D pattern with curved segments. A pattern can be repetitively combined, with all curves going the same direction as shown in FIG. 44A, or the curves can be alternated to form an "S" pattern as shown in FIG. 44B.

Figure 45:
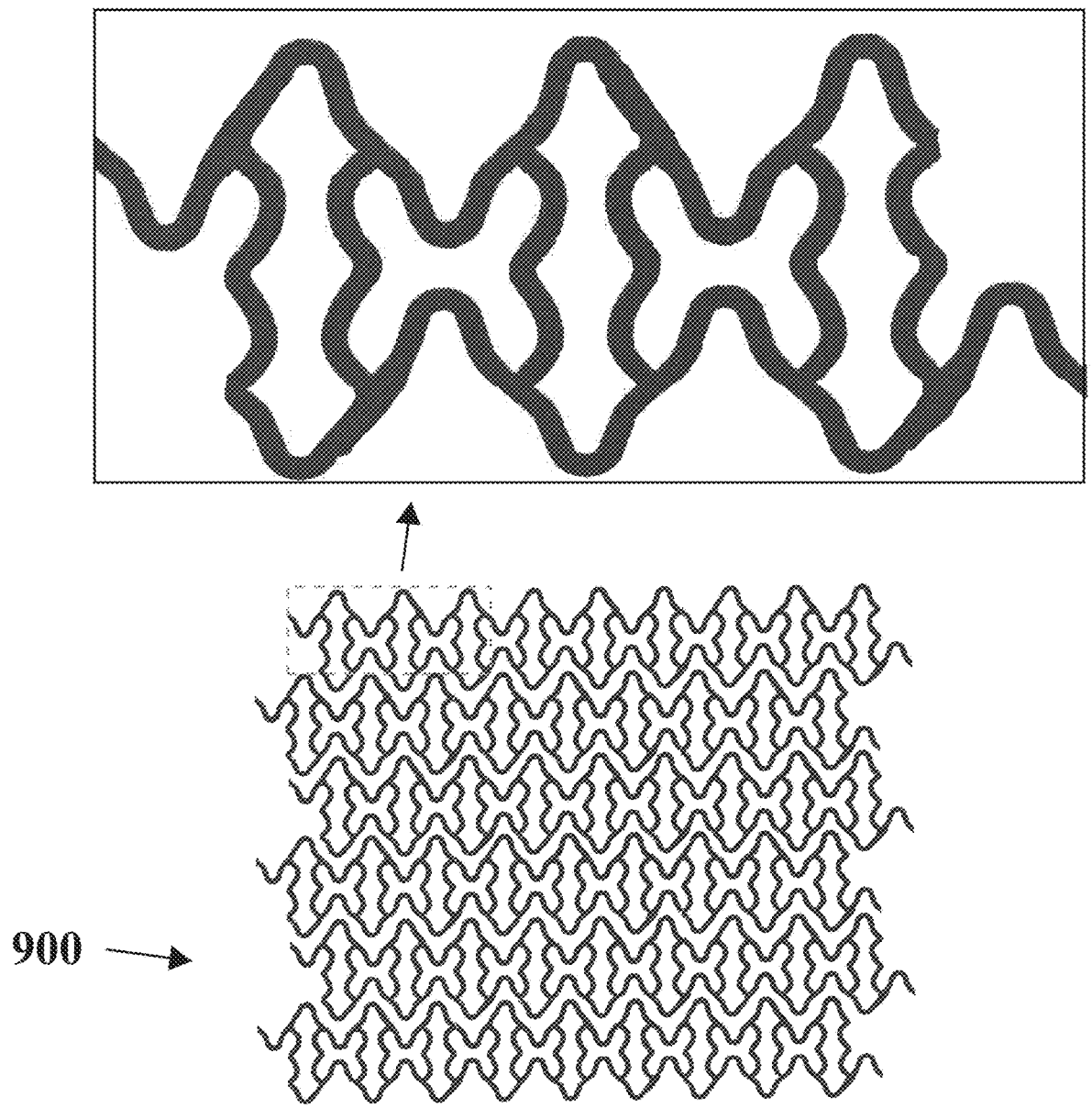
FIG. 45 is a schematic diagram of another example of a flexible pattern. The upper pattern is repeated in the field below.

FIG. 45 is a schematic diagram of another example of a portion 900 of an embodiment of a flexible zone of an orthodontic appliance, such as but not limited to the orthodontic appliances illustrated in FIGS. 37-42, that includes a flexible pattern. In at least some embodiments, the flexible pattern allows movement/flexing in one, two, or three dimension. Although the pattern shown in FIG. 45 is two dimensional, alternative three-dimensional variations of the pattern can be used as well. The upper pattern is repeated in rows in the field below. Although not shown in FIG. 45, the rows are often connected to each other in the flexible regions. For example, the row can be connected to each other with vertical connecting links disposed at intervals along the rows. In various embodiments, various numbers of connecting links can be disposed at various positions. The number and location of the connecting links can be modified when the appliance is being fabricated to affect the final properties of the flexible region, such as strength and flexibility in various directions.

Figure 46:
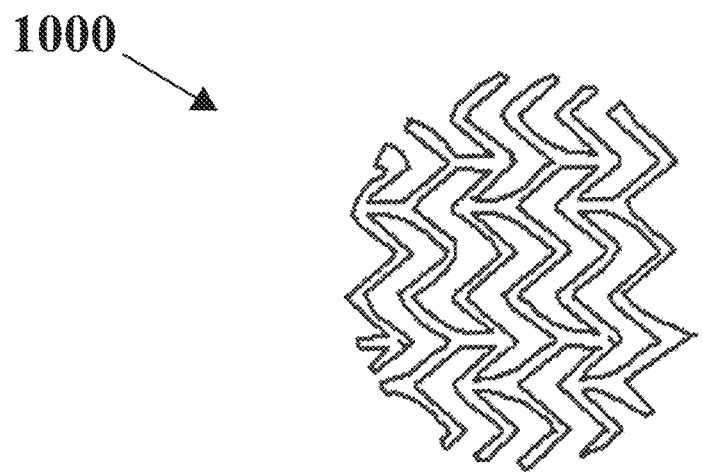
FIG. 46 is a schematic diagram of a small sample of a pattern that can be repeated to produce larger fields.

FIG. 46 is an example of a portion 1000 of a flexible zone of an orthodontic appliance, such as but not limited to the orthodontic appliances illustrated in FIGS. 37-42, that includes a flexible 3D pattern. The pattern can be repeated or combined with other patterns to produce a larger flexible zone.

Figure 47:
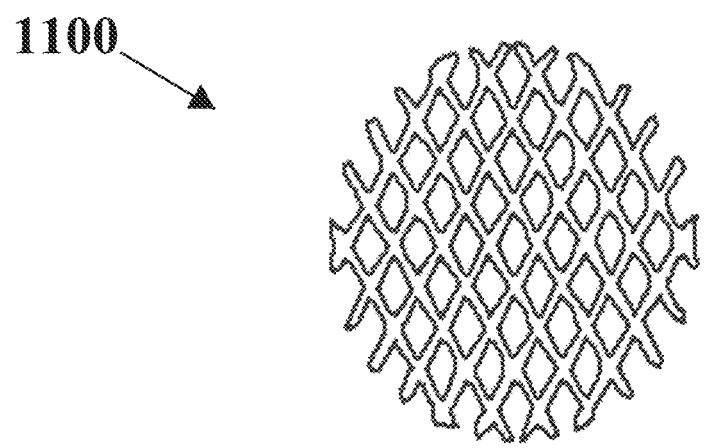
FIG. 47 is a schematic diagram of another small sample of pattern that can be repeated to produce larger fields.

FIG. 47 is an example of a portion 1100 of a flexible zone of an orthodontic appliance, such as but not limited to the orthodontic appliances illustrated in FIGS. 37-42, that includes a flexible 3D pattern. The pattern can be repeated or combined with other patterns to produce a larger flexible zone.

Figure 48:
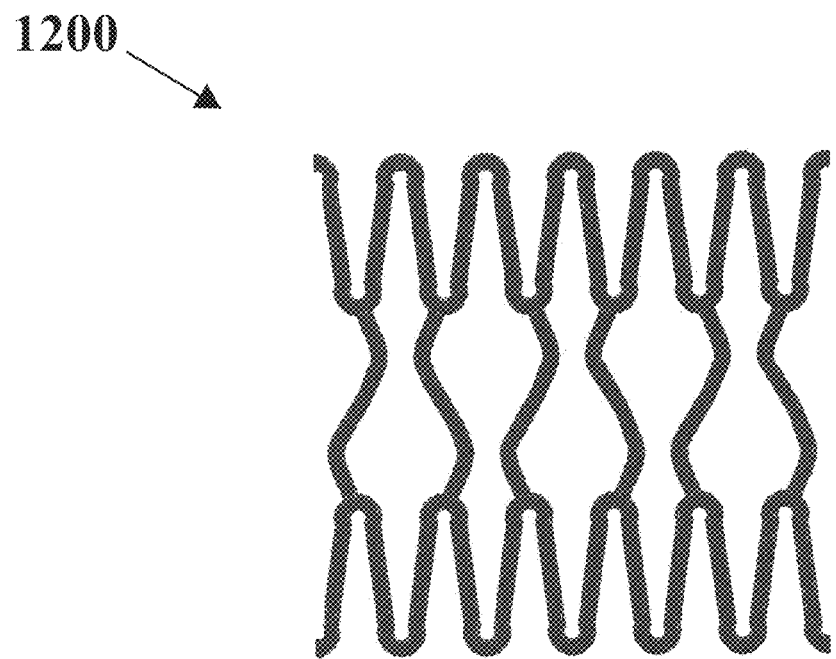
FIG. 48 is a schematic diagram of yet another example of a flexible pattern having irregular S-shaped elements alternately joining with zigzag elements in a regular repeating pattern.

FIG. 48 is an example of a portion 1200 of a flexible zone of an orthodontic appliance, such as but not limited to the orthodontic appliances illustrated in FIGS. 37-42, that includes a flexible 3D pattern. The pattern has irregular S-shaped elements alternately joining with zigzag elements in a regular repeating pattern.

Figure 49:
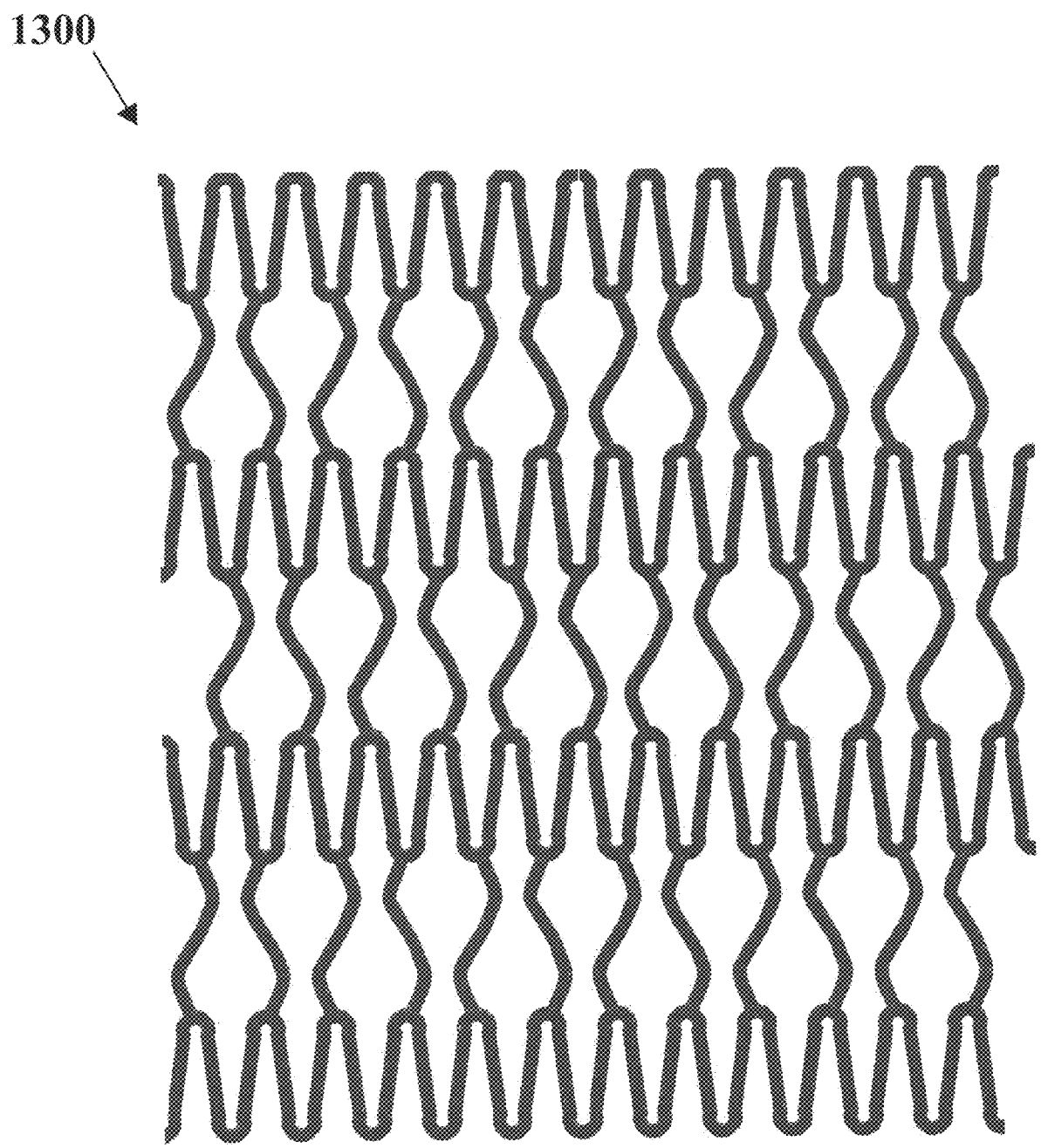
FIG. 49 is a schematic diagram of pattern formed by repeating the pattern in FIG. 48 to produce a larger field.

FIG. 49 is an example of a portion 1300 of a flexible zone of an orthodontic appliance, such as but not limited to the orthodontic appliances illustrated in FIGS. 37-42, that includes a flexible 3D pattern. The portion 1300 is formed by repeating the pattern of the portion 1200 shown in FIG. 48 to produce a larger flexible zone.

Figure 50:
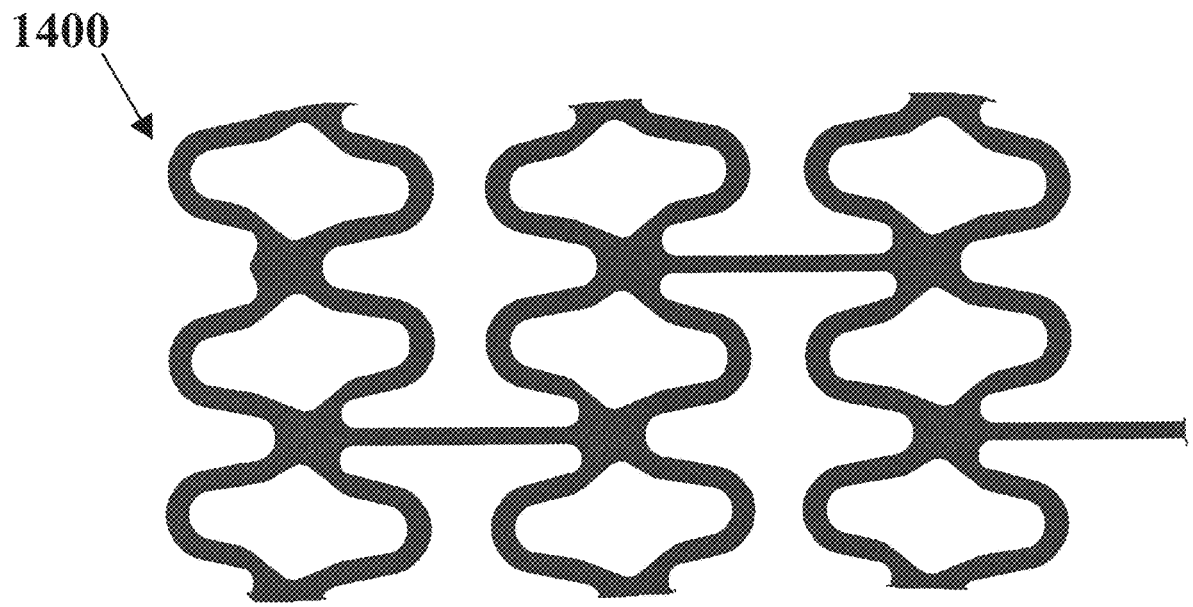
FIG. 50 is a schematic diagram of another example of a flexible pattern that can be repeated to produce a larger field.

FIG. 50 is an example of a portion 1400 of a flexible zone of an orthodontic appliance, such as but not limited to the orthodontic appliances illustrated in FIGS. 37-42, that includes a flexible 3D pattern. The pattern can be repeated or combined with other patterns to produce a larger flexible zone.

Figure 51:
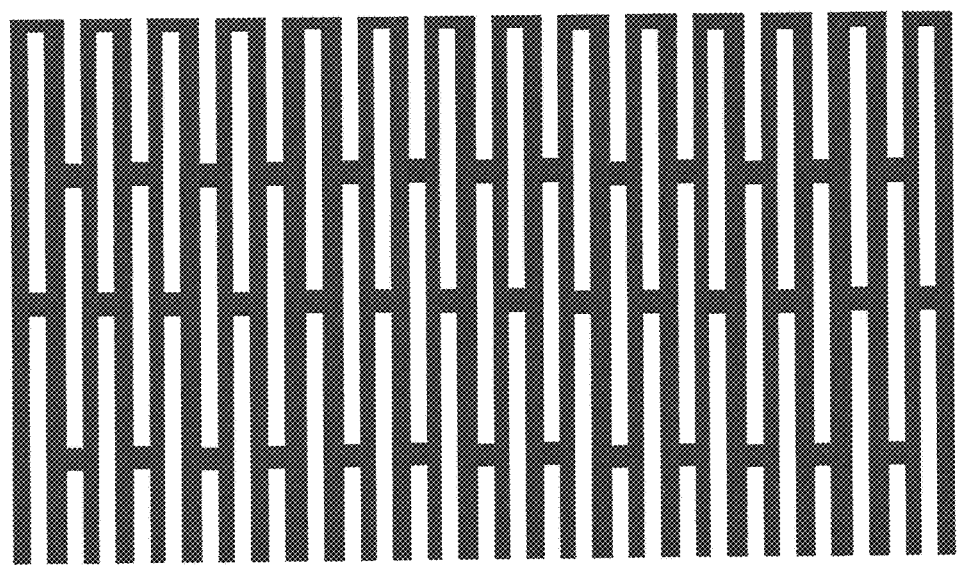
FIG. 51 is a schematic diagram of another example of a flexible pattern that can be repeated to produce a larger field.

FIG. 51 is an example of a portion 1500 of a flexible zone of an orthodontic appliance, such as but not limited to the orthodontic appliances illustrated in FIGS. 37-42, that includes a flexible 3D pattern. The pattern can be repeated or combined with other patterns to produce a larger flexible zone.

Figure 52:
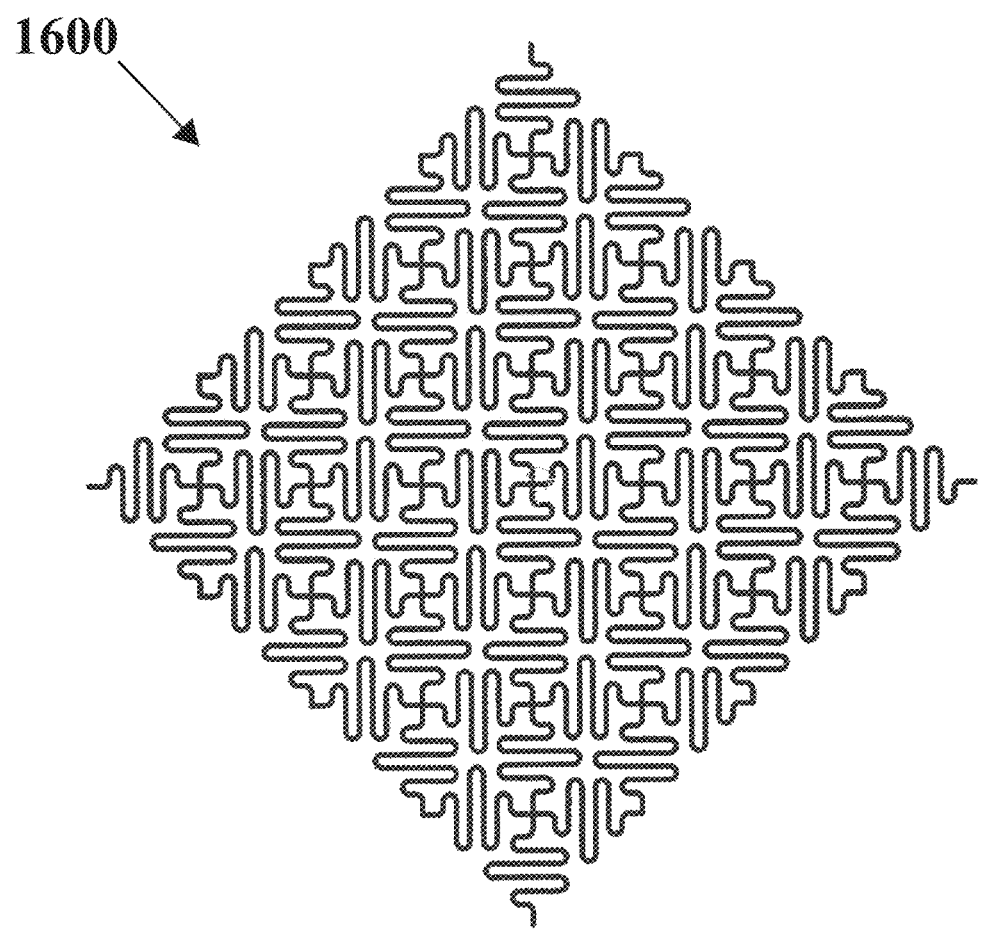
FIG. 52 is a schematic diagram of another example of a flexible pattern.

FIG. 52 is an example of a portion 1600 of a flexible zone of an orthodontic appliance, such as but not limited to the orthodontic appliances illustrated in FIGS. 37-42, that includes a flexible 3D pattern. The pattern includes a four-legged central structure and can be repeated or combined with other patterns to produce a larger flexible zone.

Figure 53:
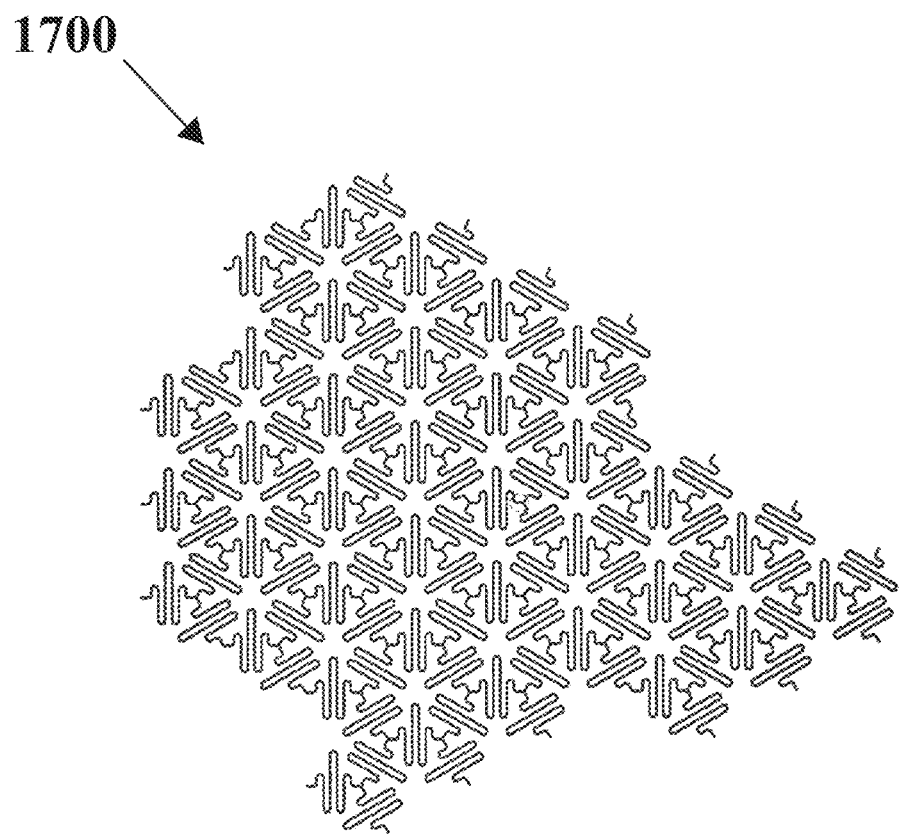
FIG. 53 is a schematic diagram of another example of a flexible pattern.

FIG. 53 is an example of a portion 1700 of a flexible zone of an orthodontic appliance, such as but not limited to the orthodontic appliances illustrated in FIGS. 37-42, that includes a flexible 3D pattern. The pattern includes a three-legged central structure and can be repeated or combined with other patterns to produce a larger flexible zone.

Figure 54:
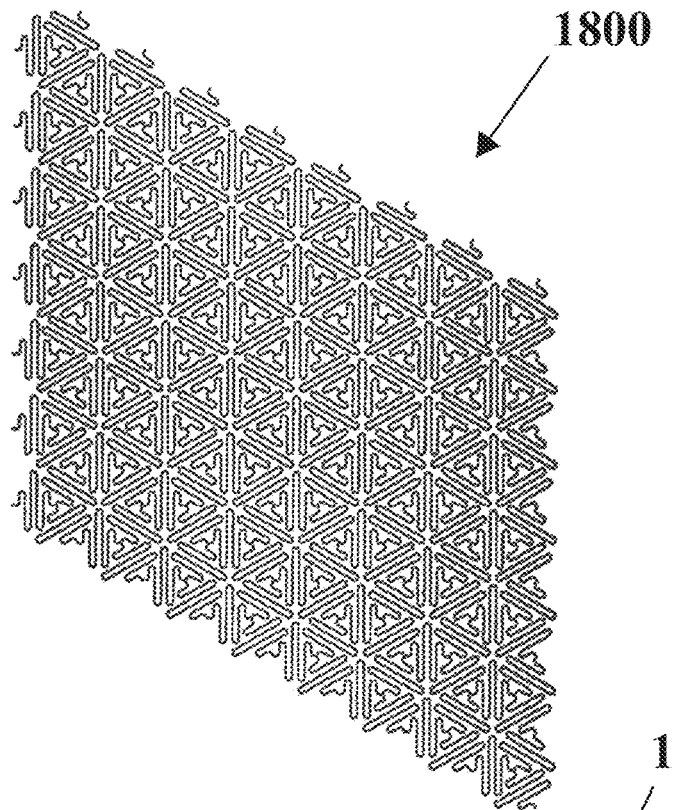
FIG. 54 is a schematic diagram of another example of a flexible pattern.

FIG. 54 is an example of a portion 1800 of a flexible zone of an orthodontic appliance, such as but not limited to the orthodontic appliances illustrated in FIGS. 37-42, that includes a flexible 3D pattern. The pattern includes a three-legged central structure and can be repeated or combined with other patterns to produce a larger flexible zone. The pattern of portion 1800 differs from the pattern of portion 1700 shown in FIG. 53 primarily in the amount of open space between internal elements.

Figure 55:
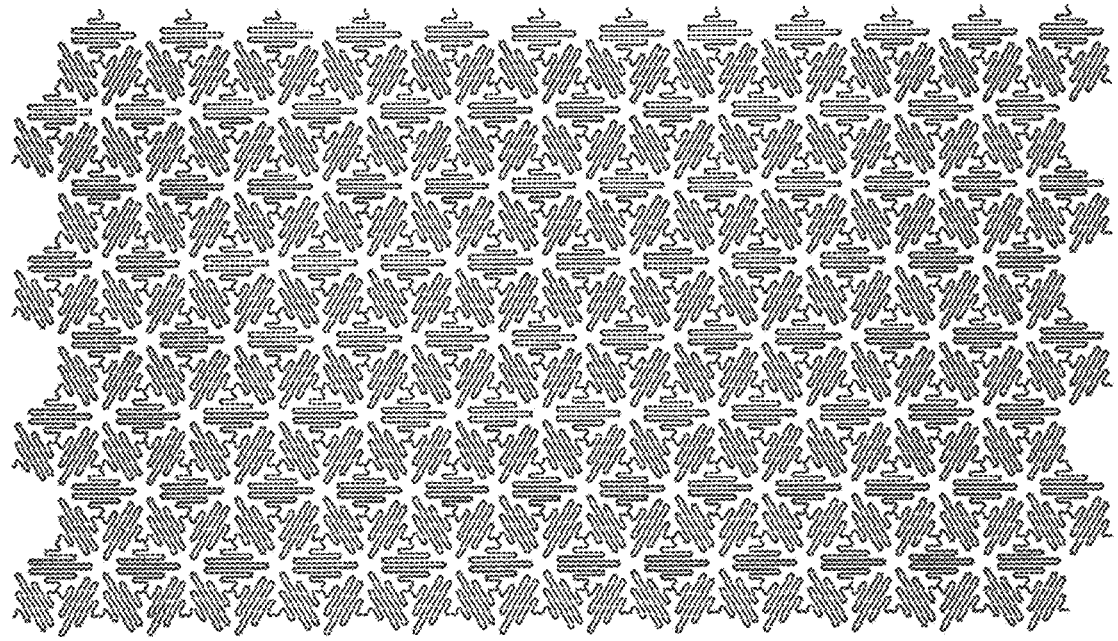
FIG. 55 is a schematic diagram of another example of a flexible pattern.

FIG. 55 is an example of a portion 1900 of a flexible zone of an orthodontic appliance, such as but not limited to the orthodontic appliances illustrated in FIGS. 37-42, that includes a flexible 3D pattern. The pattern includes a three-legged central structure and can be repeated or combined with other patterns to produce a larger flexible zone. The pattern of portion 1900 shown in FIG. 55 differs from the patterns of portion 1700 shown in FIG. 53 and portion 1800 shown in FIG. 54 primarily in the amount of open space between internal elements.

The patterns shown on the portions 1600, 1700, 1800, and 1900 that are shown in FIGS. 52-55 are based on patterns for "meso-structured materials" that are distributed by Andrew Bastian at http://www.thingiverse.com/make:88085. Meso-structured materials are repeating flexible 3D patterns that can be fabricated using rapid prototyping technologies. In other embodiments, the flexible zone can include patterns from other meso-structured materials.

Figure 56:
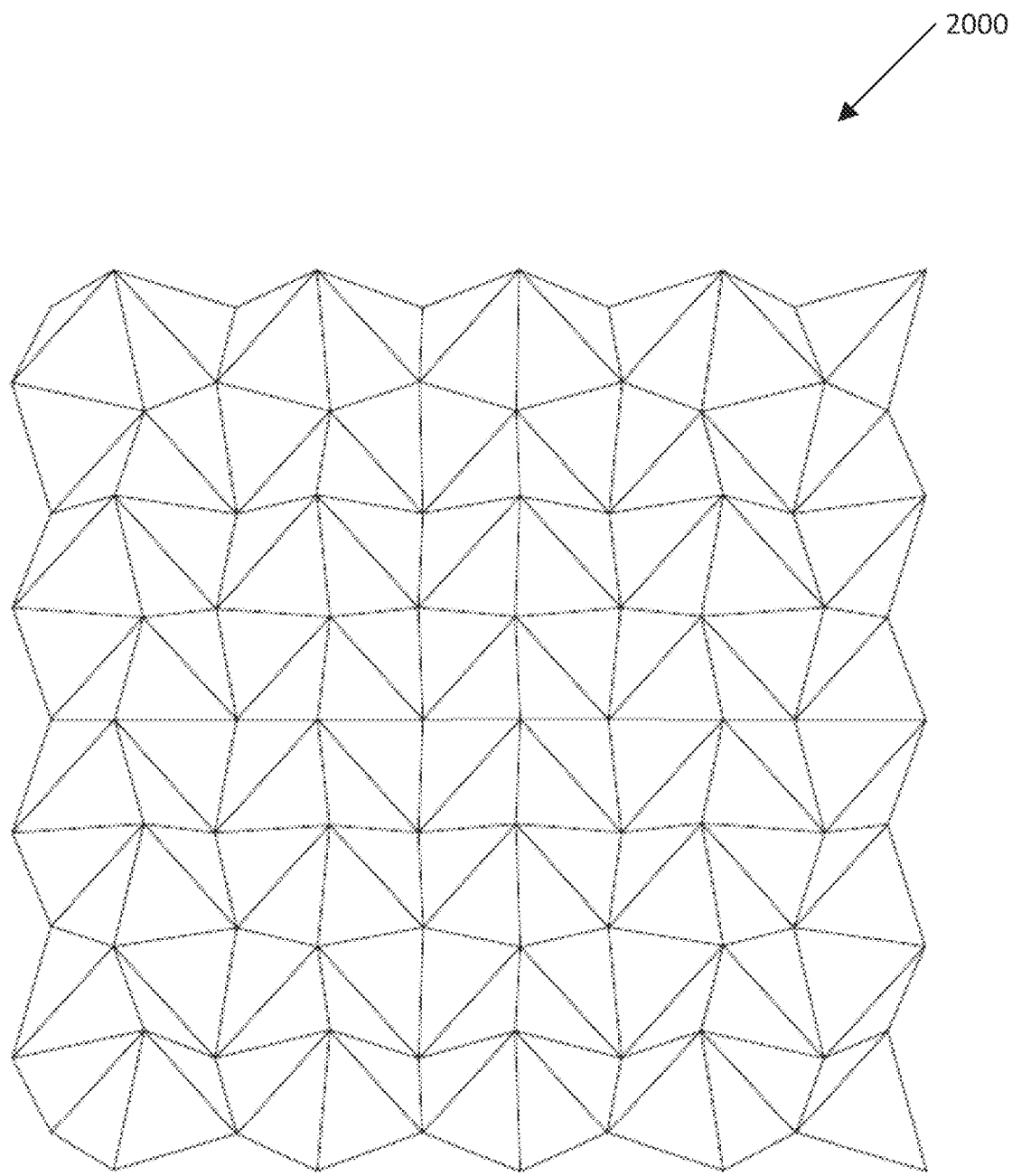
FIG. 56 is a schematic diagram of another example of a flexible pattern.

FIG. 56 is an example of a portion 2000 of a flexible zone of an orthodontic appliance, such as but not limited to the orthodontic appliances illustrated in FIGS. 37-42, that includes a flexible 3D pattern. Unlike the portions illustrated in FIGS. 43-55, the portion 2000 does not include voids. Instead, the portion 2000 includes a plurality of triangular planes with various orientations that form fold lines along which the portion 2000 can flex.

Figure 57:
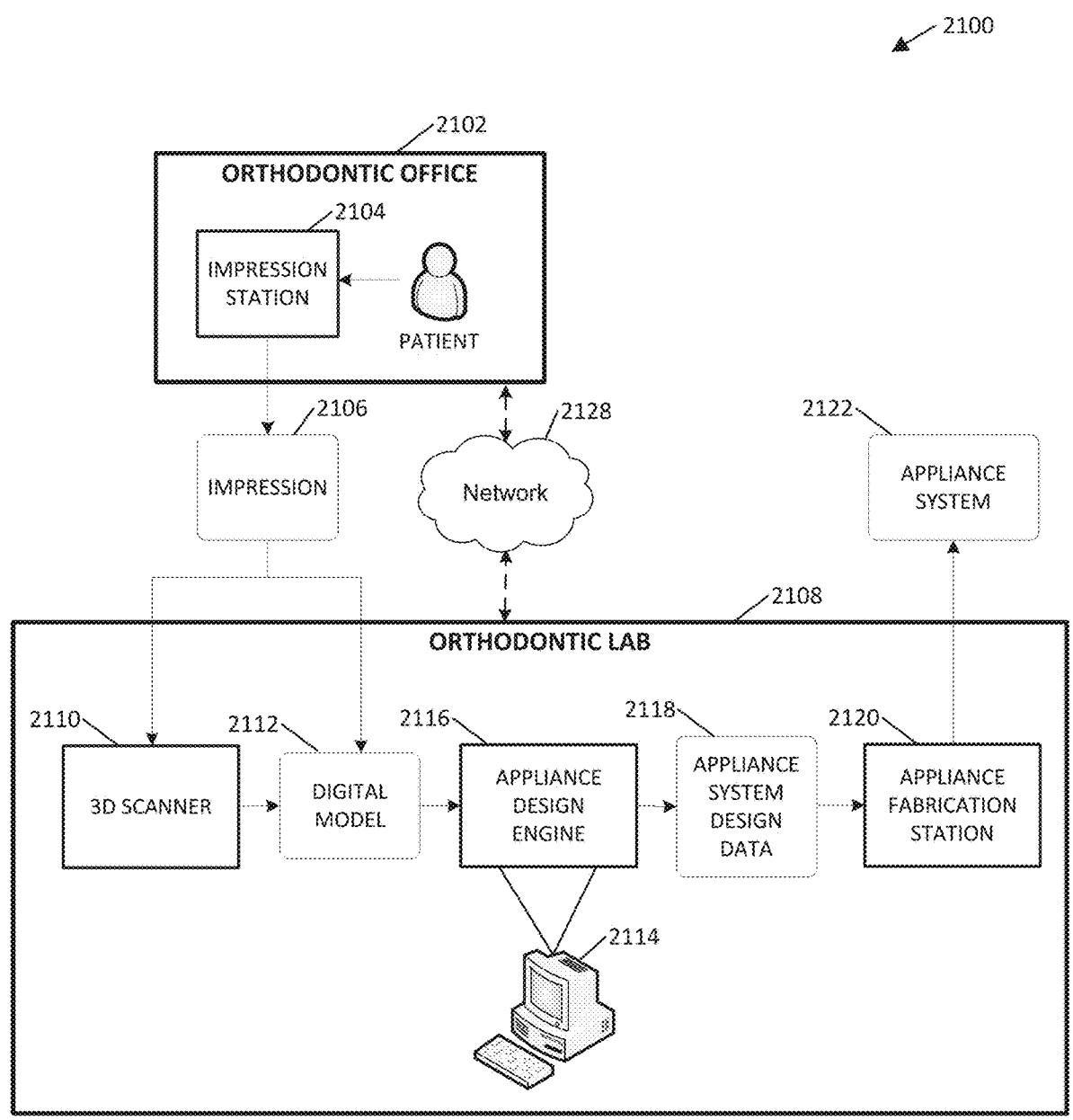
FIG. 57 is a schematic block diagram of an environment and process for producing tooth-positioning aligners.

FIG. 57 is a schematic block diagram illustrating an example of a system 2100 for producing a tooth-positioning appliance system 2122. The tooth-positioning appliance system 2122 includes of one or more tooth-positioning appliances with flexible zones. In this example, the system 2100 includes components at an orthodontic office 2102 and an orthodontic lab 2108.

The orthodontic office 2102 is an office where patients receive orthodontic treatment. The example orthodontic office 2102 includes an impression station 2104. Although FIG. 57 includes an orthodontic office, the system may be used with components from other types of offices such as dental offices or that are located elsewhere.

The example impression station 2104 generates an impression 2106 of the dentition of a patient. The impression 2106 is a geometric representation of the dentition of the patient. Although alternatives are possible, the dental impression 2106 is a physical impression captured using an impression material, such as sodium alginate, or vinyl polysiloxane. In other embodiments, other impression materials are used as well.

Alternatively, the dental impression 2106 is a digital impression. The digital impression is represented by one or more of a point cloud, a polygonal mesh, a parametric model, or voxel data. Although alternatives are possible, the digital impression can be generated directly from the dentition of the patient P, using for example an intraoral scanner. Example intraoral scanners include the TRIOS Intra Oral Digital Scanner, the Lava Chairside Oral Scanner C.O.S., the Cadent iTero, the Cerec AC, the Cyrtina IntraOral Scanner, and the Lythos Digital Impression System from Ormco. Alternatively, a digital impression is captured using other imaging technologies, such as computed tomography (CT) or magnetic resonance imaging (MRI). In yet other embodiments, the digital impression is generated from a physical impression by scanning the impression or plaster model of the dentition of the patient created from the physical impression. Examples of technologies for scanning a physical impression or model include three dimensional laser scanners and computed tomography (CT) scanners. In yet other embodiments, digital impressions are created using other technologies.

Additionally, in some embodiments, the orthodontic office 2102 sends an orthodontic setup model (not shown) that includes the patient's teeth in the desired target positions after orthodontic treatment. The orthodontic setup model is typically prepared by an orthodontist. The orthodontic setup model can be a digital model or a physical model.

The orthodontic lab 2108 is a laboratory where orthodontic appliances are fabricated. The example orthodontic lab 2108 includes a 3D scanner 2110, an appliance design system 2114, and an appliance fabrication station 2120. Although shown as a single orthodontic lab in this figure, in some embodiments, the orthodontic lab 2108 comprises multiple orthodontic labs. For example, in some embodiments, the 3D scanner 2110 is in a different orthodontic lab than one or more of the other components shown in the orthodontic lab 2108. Further, in some embodiments, one or more of the components shown in the orthodontic lab 2108 are not in an orthodontic lab. For example, in some embodiments, one or more of the 3D scanner 2110, appliance design system 2114, and appliance fabrication station 2120 are in the orthodontic office 2102. Additionally, some embodiments of the system 2100 do not include all of the components shown in the orthodontic lab 2108.

The example 3D scanner 2110 is a device configured to create a three-dimensional digital representation of the impression 2106 (when the impression 2106 includes a physical impression). In some embodiments, the 3D scanner 2110 generates a point cloud, a polygonal mesh, a parametric model, or voxel data representing the impression 2106. In some embodiments, the 3D scanner 2110 generates the digital model 2112. In some embodiments, the 3D scanner 2110 comprises a laser scanner, a touch probe, or an industrial CT scanner. Yet other embodiments of the 3D scanner 2110 are possible as well. Further, some embodiments of the system 2100 do not include the 3D scanner 2110. For example, in some embodiments of the system 2100 where the impression station 2104 generates a digital dental impression the 3D scanner 2110 is not included. In these embodiments, the digital dental impression may be used directly as or converted to the digital model 2112.

The appliance design system 2114 is system that generates appliance system design data 2118 based on the digital model 2112 and target tooth positions for the patient. The target tooth positions may be received digitally or physically from the orthodontic office. The target tooth positions may also be at least partly derived from the digital model 2112 (e.g., by aligning the teeth in the digital model 2112). Additionally, some embodiments operate without reference to target positions.

The appliance design engine 2116 can then define one or more movement stages. Although alternatives are possible, the movement stages are generally determined based on movement between the tooth positions in the digital model 2112 and the target tooth positions. As an alternative, the movement stages may be defined through simulation of orthodontic treatment or other methods without necessarily referring to target positions. Then the appliance design engine 2116 can generate appliance system design data 2118 that includes three-dimensional shape data that represents an orthodontic appliance for each of the movement stages that is in a format suitable for fabrication using the appliance fabrication station 2120.

Alternatively, the appliance system design data 2118 includes three-dimensional shape data that represents tooth models for each of the movement stages in a format suitable for fabrication using the appliance fabrication station 2120. The tooth models are then fabricated from the appliance system design data 2118 and the appliances are fabricated from the tooth models (e.g., by being thermoformed over tooth models to produce the desired tooth alignment appliances). The tooth models in the appliance system design data 2118 may include various features to form or mark the flexible zones in the appliance. For example, if the appliance includes a pattern of voids, the tooth models may include markings (e.g., ridges or indents) that can be used to guide a cutting process (e.g., using a drill, knife, ultrasonic knife, milling or CNC machine, or any other cutting technology) to cut voids in the thermoformed appliances. For appliance designs with non-void flexible zones (e.g., incorporating a folding pattern such as the portion illustrated and described with respect to at least FIG. 20), the tooth model may include a mold region for forming the shapes of the flexible zone.

In some embodiments, the appliance design system 2114 comprises a computing device including user input devices. The appliance design system 2114 includes an appliance design engine 2116. Although alternatives are possible, the appliance design engine 2116 typically includes computer-aided-design (CAD) software that generates a graphical display of one or both of the digital model 2112 and the appliance system design data 2118 and allows an operator to interact with and manipulate one or both of the digital model 2112 and the appliance system design data 2118.

The appliance design engine 2116 also includes at least some digital tools that mimic the tools used by a laboratory technician to physically design an orthodontic appliance. The appliance design engine 2116 can also include tools to identify or modify flexible zones of an orthodontic appliance that will be fabricated with a flexible pattern (e.g., one of the patterns described above with respect to FIGS. 43-56). The tools may allow the technician to select a pattern to use and to specify parameters for the selected pattern. In some embodiments, the appliance design engine 2116 also evaluates the design of the orthodontic appliance to evaluate the stresses that are likely to be imposed upon the appliance by the patient's teeth. Based on this analysis the appliance design engine 2116 may reject, approve, or modify certain appliance designs. For example, the evaluation process may use finite element analysis to evaluate the orthodontic appliance.

In some other embodiments, the appliance design engine 2116 automates the generation of the model for the appliance system. For example, the appliance design engine may generate a plurality of possible appliance designs that have flexible zones in different locations and having different parameters. The appliance design engine 2116 can then evaluate the possible appliance designs using, for example, finite element analysis. The results of the evaluation can be used to approve, reject, modify, or select for fabrication the possible appliance designs.

Once the appliance system design data 2118 is designed using the appliance design engine 2116, the appliance system design data 2118 is sent to the appliance fabrication station 2120 where the tooth-positioning appliance system 2122 is produced. Typically, the appliance system 2122 comprises one or more tooth-positioning appliances that are configured to be used to position the teeth of the patient.

Although alternatives are possible, the appliance fabrication station 2120 typically includes one or more rapid fabrication machines. Examples of the rapid fabrication machines include three-dimensional printers, such as the ProJet line of printers from 3D Systems, Inc. of Rock Hill, South Carolina Another example of a rapid fabrication machine is stereolithography equipment. Still another example of a rapid fabrication machine is a digital light processing (DLP) rapid prototyping system, such as the Perfactory system from EnvisionTEC, Inc. of Dearborn, MI Yet another example of a rapid fabrication machine is a milling device, such as a computer numerically controlled (CNC) milling device. In some embodiments, the appliance fabrication station 2120 is configured to receive files in the STL format.

The appliance fabrication station 2120 can also include thermoforming equipment that is used to thermoform appliances over tooth models fabricated from the appliance system design data 2118 using a rapid fabrication machine. The appliance fabrication station 2120 may also include cutting equipment for cutting voids thermoformed appliances to form the flexible zones. Other embodiments of the appliance fabrication station 2120 are possible as well.

In an alternative embodiment, the appliance fabrication station 2120 includes milling equipment for milling a biocompatible plastic material that can be placed in the patient's mouth. In these embodiments, the tooth-positioning appliances of the tooth-positioning appliance system 2122 are milled from a biocompatible plastic material.

The orthodontic office 2102 may be connected to the orthodontic lab 2108 by a network 2128. The impression 2106 may be transmitted from the orthodontic office 2102 to the orthodontic lab 2108 via the network 2128. Additionally, a setup model that includes the target positions of the patient's teeth may also be transmitted from the orthodontic office 2102 to the orthodontic lab 2108 via the network 2128.

The network 2128 is an electronic communication network that facilitates communication between the orthodontic office 2102 and the orthodontic lab 2108. An electronic communication network is a set of computing devices and links between the computing devices. The computing devices in the network use the links to enable communication among the computing devices in the network. The network 2128 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 138 includes various types of links. For example, the network 2128 can include one or both of wired and wireless links, including Bluetooth, ultra-wideband (UWB), 802.11, ZigBee, and other types of wireless links. Furthermore, in various embodiments, the network 2128 is implemented at various scales. For example, the network 2128 can be implemented as one or more local area networks (LANs), metropolitan area networks, subnets, wide area networks (such as the Internet), or can be implemented at another scale.

Figure 58:
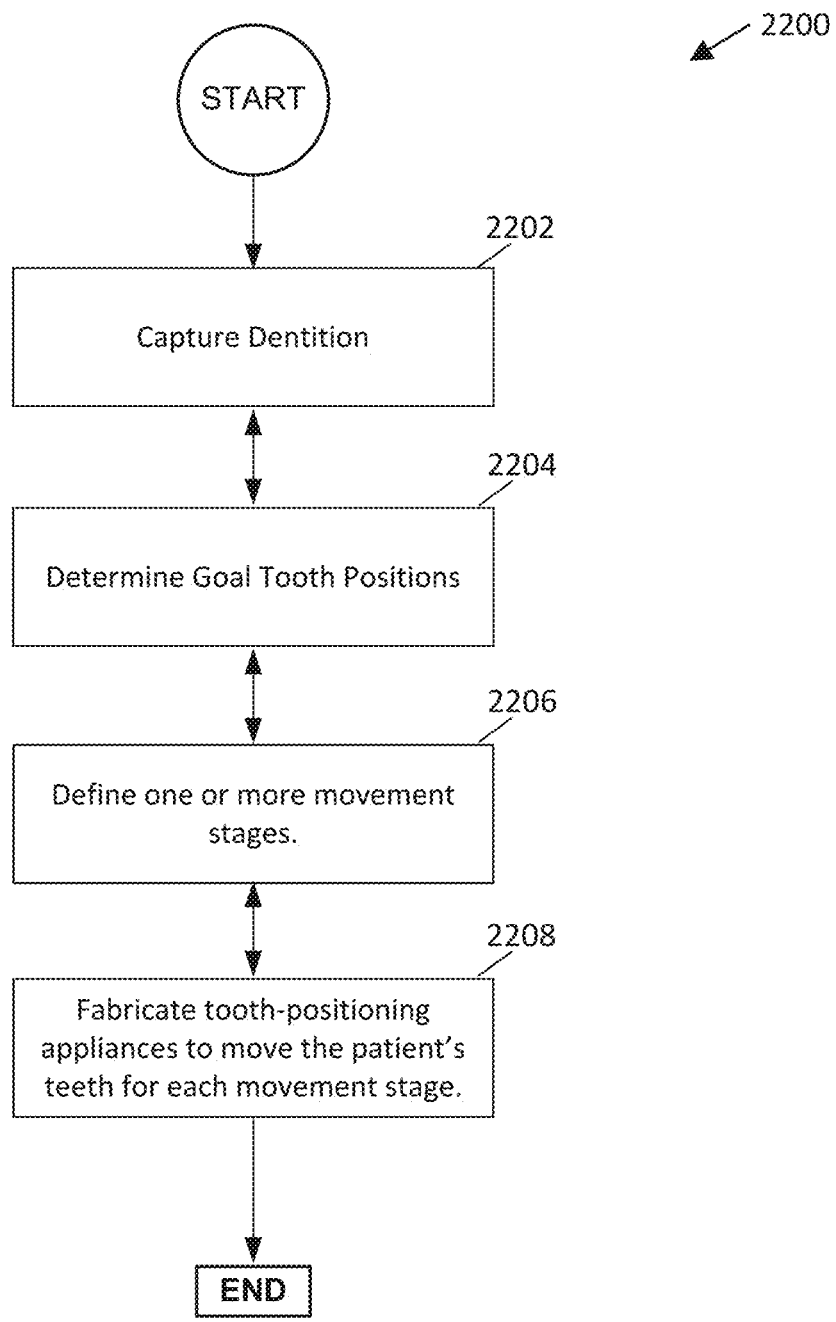
FIG. 58 is an example method performed by some embodiments of the system of FIG. 57.

FIG. 58 is a flow chart illustrating an example method 2200 of producing a tooth-positioning appliance system. In some embodiments, the method 2200 is performed by embodiments of the system 2100. In this example, the method 2200 includes operations 2202, 2204, 2206, and 2208.

At operation 2202, the patient's dentition is captured. As described previously, the patient's dentition can be captured using physical or digital impression data.

At operation 2204, the goal tooth positions are determined. As described previously, the goal tooth positions may be received in the form a physical model defined by an orthodontist. The goal tooth positions may also be determined by aligning the teeth of the patient's existing dentition.

At operation 2206, one or more movement stages are defined between the patient's current dentition and the goal tooth positions for the patient. The movement stages may defined so that movement of any tooth during a particular movement stage is limited to a threshold amount.

At operation 2208, tooth-positioning appliances are fabricated to move the patient's teeth for each movement stage. Typically, the tooth-positioning appliances are fabricated to fit the patient's teeth in the final position of a movement stage, but are designed to be placed on the patient's teeth at the beginning of the movement stage. The tooth-position appliances generally include flexible zones that allow the tooth-positioning appliances to distort to fit the position of the patient's teeth prior to movement during the movement stage. As the tooth-positioning appliance slowly returns to its undistorted form, the tooth-positioning appliance applies steady and gentle force to move the patient's teeth over time. An example process for designing the tooth-positioning appliances is illustrated and described with respect to at least FIG. 59.

Figure 59:
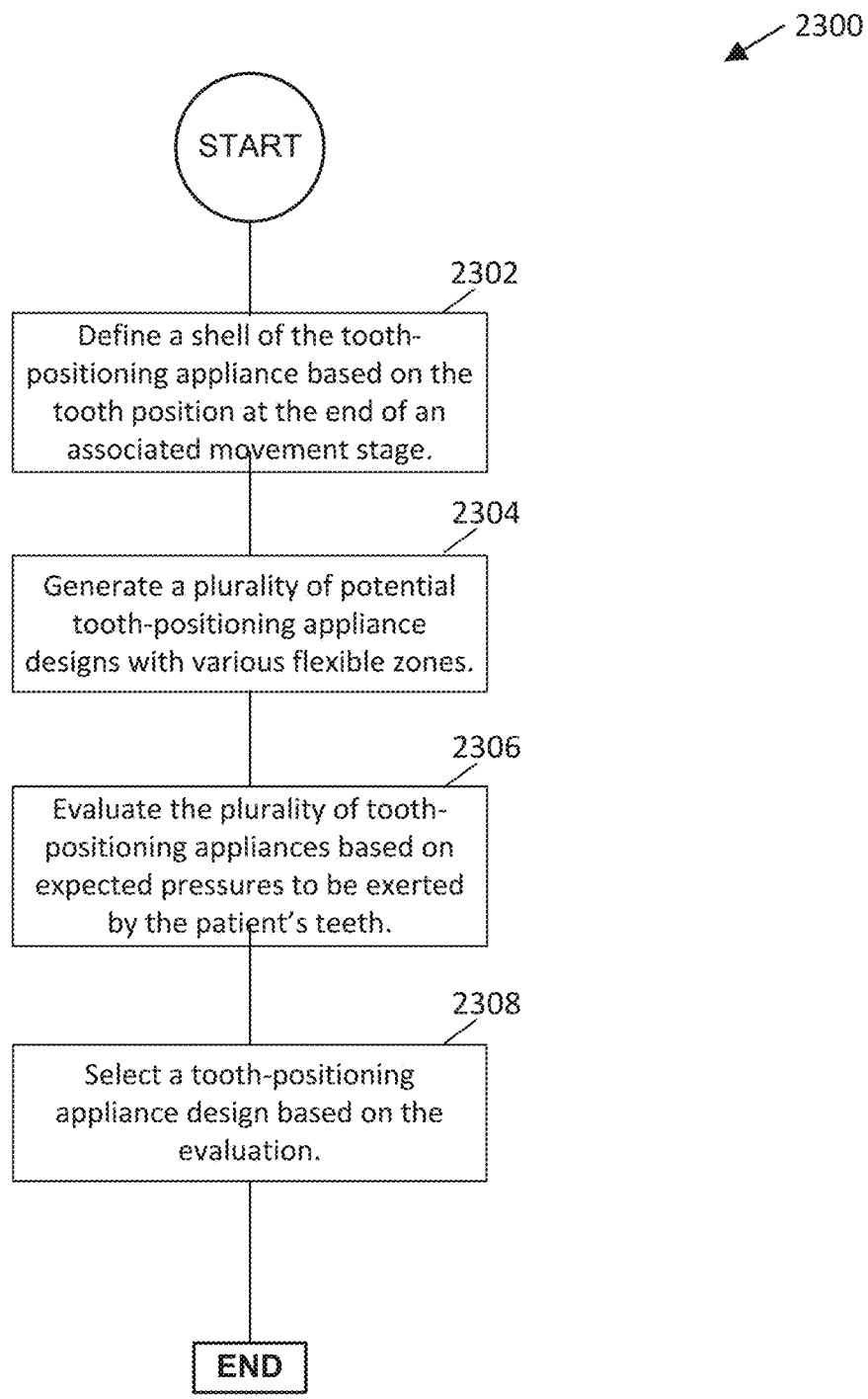
FIG. 59 is another example method performed by some embodiments of the system of FIG. 57.

FIG. 59 is a flow chart illustrating an example method 2300 of designing a tooth-positioning appliance with flexible zones for a movement stage. In some embodiments, the method 2300 is performed by embodiments of the appliance design engine 2116. In this example, the method 2300 includes operations 2302, 2304, 2306, and 2308.

At operation 2302, a shell of the tooth-positioning appliance is defined based on the desired tooth positions at the end of a movement stage. In some aspects, the shell is designed by applying an offset to a portion of a dental model of the teeth after the movement stage. In some embodiments, a first offset (e.g., 0.1-0.5 mm) is applied to create the interior surface of the tooth-positioning appliance and a second offset (e.g., 1-2 mm) is applied to create the exterior surface of the tooth-positioning appliance. The interior surface and the exterior surface can then be joined to form the shell of the tooth-positioning appliance.

At operation 2304, a plurality of potential tooth-positioning appliance designs with various flexible zones are generated from the shell. For example, potential tooth-positioning appliances could be generated with flexible zones according to one or more of the examples described in FIGS. 37-42 in combination with one or more of the patterns illustrated in FIGS. 43-56. Of course, the potential tooth-positioning appliances are not limited to the examples of FIGS. 37-42 and the patterns of FIGS. 43-56. The potential tooth-positioning appliances can also be generated by randomly adding voids to the shell (throughout or in particular regions such as near interproximal areas), randomly removing voids in some of the previously described, or a combination thereof. In some embodiments, many (e.g., between dozens and thousands) potential tooth-positioning appliances are generated.

At operation 2306, the plurality of potential tooth-positioning appliances designs are evaluated based on the expected pressures to be exerted by the patient's teeth. As described above, finite element analysis or other techniques may be used to evaluate the stresses on the potential tooth-positioning appliance designs when the tooth-positioning appliance is distorted to fit over the patient's teeth (e.g., in the expected tooth positions at the start of a movement stage). In some embodiments, the plurality of potential tooth-positioning appliance designs are evaluated to determine the amount of pressure that will be applied on the patient's teeth as well (e.g., the teeth in the initial tooth positions for a movement stage or at various points during the movement stage).

At operation 2308, a tooth-positioning appliance is selected based on the evaluation. For example, a tooth-positioning appliance may be selected that minimizes the stress on the tooth-positioning appliance (e.g., either throughout the appliance or in particular regions such as the tooth-clasping regions). Alternatively, the tooth-positioning appliance may be selected to provide an even force on the patient's teeth throughout the movement stage. In some embodiments, various thresholds are used to eliminate some of the tooth-positioning appliances are used (e.g., designs that result in pressures that exceed the likely breaking point of the appliance material are eliminated, designs that apply so little pressure to the patient's that the patient's teeth are unlikely to move, etc.).

Although alternatives are possible, some embodiments of the appliance design engine 216 include a generative design system. Examples of generative design system include AutoDesk Within generative design software from Autodesk, Inc. of San Rafael, CA and Element design software from nTopology Inc., of New York, NY.

In some aspects, the tooth-positioning appliances are designed by the appliance design engine 2116 using a generative design process. In some aspects, the shell of the tooth positioning appliance is designed as described in 2302. Then the shell is analyzed by the generative design system to determine where to remove material and where to generate flexible regions. The generative design system may use finite element analysis to analyze the shell and identify regions under pressure and subject to stress. To perform the analysis the generative design system may receive various parameters such as the tooth positions or desired positions. The parameters may also identify the teeth that should be moved by the appliance. The generative design process will then identify regions that need flexibility based on for example, identifying regions that need elongation. The generative design process will also then identify areas where material can be removed to create voids by, for example, identifying regions that are not under stress and that are not in forceful contact with the teeth. The flexible regions may then be formed using the patterns above or may be formed without a pattern by the generative design system.

Figure 63:
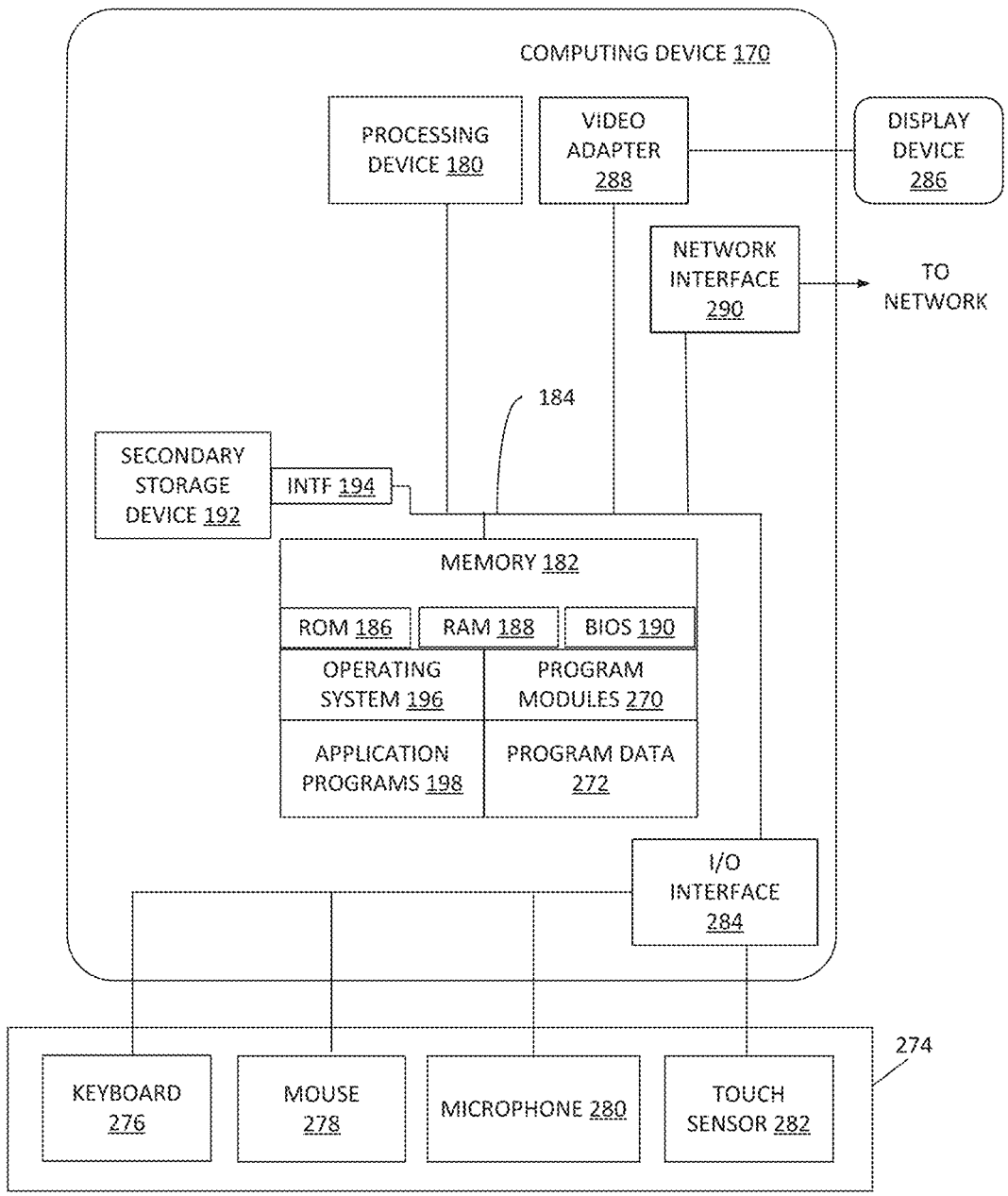
FIG. 63 is an example architecture of a computing device, which can be used to implement aspects according to the present disclosure.

FIG. 63 illustrates an exemplary architecture of a computing device 170 that can be used to implement aspects of the present disclosure, including any of the plurality of computing devices described herein, such as a computing device of the impression station 2104, appliance design system 2114, appliance fabrication station 2120, or any other computing devices that may be utilized in the various possible embodiments.

The computing device illustrated in FIG. 63 can be used to execute the operating system, application programs, and software modules (including the software engines) described herein.

The computing device 170 includes, in some embodiments, at least one processing device 180, such as a central processing unit (CPU). A variety of processing devices are available from a variety of manufacturers, for example, Intel or Advanced Micro Devices. In this example, the computing device 170 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 170 include a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 170, such as during start up, is typically stored in the read only memory 186.

The computing device 170 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 170.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or system memory 182, including an operating system 196, one or more application programs 198, other program modules 270 (such as the software engines described herein), and program data 272. The computing device 170 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 170 through one or more input devices 274. Examples of input devices 274 include a keyboard 276, mouse 278, microphone 280, and touch sensor 282 (such as a touchpad or touch sensitive display). Other embodiments include other input devices 274. The input devices are often connected to the processing device 180 through an input/output interface 284 that is coupled to the system bus 184. These input devices 274 can be connected by any number of input/output interfaces, such as a parallel port, serial port, game port, or a universal serial bus. Wireless communication between input devices and the interface 284 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 286, such as a monitor, liquid crystal display device, projector, or touch sensitive display device, is also connected to the system bus 184 via an interface, such as a video adapter 288. In addition to the display device 286, the computing device 170 can include various other peripheral devices (not shown), such as speakers or a printer.

When used in a local area networking environment or a wide area networking environment (such as the Internet), the computing device 170 is typically connected to the network through a network interface 290, such as an Ethernet interface. Other possible embodiments use other communication devices. For example, some embodiments of the computing device 170 include a modem for communicating across the network.

The computing device 170 typically includes at least some form of computer readable media. Computer readable media includes any available media that can be accessed by the computing device 170. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 170.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 63 is also an example of programmable electronics, which may include one or more such computing devices, and when multiple computing devices are included, such computing devices can be coupled together with a suitable data communication network so as to collectively perform the various functions, methods, or operations disclosed herein.

Some examples are provided below:

Example 1

A thin-shell tooth-positioning appliance for adjusting positions of teeth of a patient, comprising: a plurality of tooth-clasping elements for removably engaging teeth of a patient; and at least one flexible interconnecting element connecting the tooth-clasping elements.

Example 2

The thin-shell tooth-positioning appliance of example 1, wherein the plurality of tooth-clasping elements are formed integrally with the at least one flexible interconnecting element as a monolithic single piece of material.

Example 3

The thin-shell tooth-positioning appliance of example 2, wherein a topography of the at least one flexible interconnecting element is different than a topography of the plurality of the tooth-clasping elements.

Example 4

The thin-shell tooth-positioning appliance of any of examples 1-3, wherein the tooth-clasping element is configured to secure the thin-shell tooth-positioning appliance to multiple teeth.

Example 5

The thin-shell tooth-positioning appliance of any of examples 1-4, wherein at least one of the plurality of the tooth-clasping elements is configured to mate with a bonded attachment secured to the teeth of the patient.

Example 6

The thin-shell tooth-positioning appliance of example 5, wherein the at least one of the plurality of the tooth-clasping elements includes at least one rigid border region positioned to surround the bonded attachment when the thin-shell tooth-positioning appliance is worn by the patient.

Example 7

The thin-shell tooth-positioning appliance of any of examples 1-6, wherein at least one of the plurality of the tooth-clasping elements includes an occlusal portion formed of a rigid material and wherein the occlusal portion has as least one opening configured to allow passage of a cusp tip of the teeth when the thin-shell tooth-positioning appliance is worn by the patient.

Example 8

The thin-shell tooth-positioning appliance of any of examples 1-7, wherein the at least one flexible interconnecting element is formed from a material with a flexible pattern.

Example 9

The thin-shell tooth-positioning appliance of example 8, wherein the flexible pattern comprises a plurality of voids arranged in a pattern.

Example 10

The thin-shell tooth-positioning appliance of any of examples 8 and 9, wherein the flexible pattern comprises 3D topographic features.

Example 11

The thin-shell tooth-positioning appliance of example 10, wherein the flexible pattern comprises a plurality of fold lines arranged in a pattern.

Example 12

The thin-shell tooth-positioning appliance of any of examples 1-11, wherein the at least one flexible interconnecting elements includes a thin shell with a plurality of voids passing therethrough.

Example 13

The thin-shell tooth-positioning appliance of any of examples 1-12, wherein the at least one flexible interconnecting element include a plurality of flexible interconnecting elements arranged as a continuous flexible region.

Example 14

An orthodontic appliance system for adjusting positions of teeth of a patient, comprising: a first thin-shell tooth-positioning appliance comprising: a first tooth-clasping arrangement shaped to secure the first thin-shell tooth-positioning appliance to at least one tooth; and a first flexible arrangement connected to the first tooth-clasping arrangement, wherein the first flexible arrangement is more flexible than the first tooth-clasping arrangement; and a second thin-shell tooth-positioning appliance comprising: a second tooth-clasping arrangement shaped to secure the second thin-shell tooth-positioning appliance to at least one tooth; and a second flexible arrangement connected to the second tooth-clasping arrangement, wherein the second flexible arrangement is more flexible than the second tooth-clasping arrangement, wherein the first thin-shell tooth-positioning appliance is configured to be used to cause a first movement of the teeth of the patient, and the second thin-shell tooth-positioning appliance is configured to be used to cause a second movement of the teeth of the patient.

Example 15

The thin-shell tooth-positioning appliance of example 14, wherein the first flexible arrangement is formed integrally with the first tooth-clasping arrangement as a monolithic single piece of material.

Example 16

The thin-shell tooth-positioning appliance of any of examples 14 and 15, wherein the first flexible arrangement is configured to allow elongation of the first thin-shell tooth-positioning appliance.

Example 17

An orthodontic appliance for adjusting positions of teeth of a patient, comprising: a thin-shell structure formed from at least one plastic material and configured to fit over at least two of the patient's teeth, the structure having topographic features that allow for increased elongational flexure of the structure.

Example 18

The orthodontic appliance of example 17, wherein the topographic features include variations in thickness.

Example 19

The orthodontic appliance of any of examples 17 and 18, wherein the topographic features include voids arranged in a repeating pattern.

Example 20

The orthodontic appliance of any of examples 17-19, wherein the topographic features that allow for increase elongational flexure of the structure allow the structure to distort when worn on the teeth of the patient and the structure is configured to apply a force on the patient's teeth as the structure returns to an undistorted state.

Example 21

A thin-shell tooth-positioning appliance for adjusting positions of teeth of a patient, comprising: a first tooth-clasping element for removably engaging a first tooth of a patient; a second tooth-clasping element for removably engaging a second tooth of the patient; and a flexible interconnecting region disposed between the first tooth-clasping element and the second tooth-clasping element, the flexible interconnecting region including a first flexible interconnecting element and a second interconnecting element, the first flexible interconnecting element joining the first tooth-clasping element to the second tooth-clasping element and the second flexible interconnecting element joining the first tooth-clasping element to the second tooth-clasping element.

Example 22

The thin-shell tooth-positioning appliance of example 21, wherein the first interconnecting region includes an elongate structure extending between a lateral edge of the first tooth-clasping element and a lateral edge of the second tooth-clasping element.

Example 23

The thin-shell tooth-positioning appliance of example 22, wherein the elongate structure is curved.

Example 24

The thin-shell tooth-positioning appliance of example 23, wherein the elongate structure has a first end joined to the lateral edge of the first tooth-clasping element, second end joined to the lateral edge of the second tooth-clasping element, and an intermediate region disposed between the first end and the second end, wherein at least one of the first end and the second end is offset in an occlusal direction from the intermediate region.

Example 25

The thin-shell tooth-positioning appliance of any of examples 22-24, wherein the second flexible interconnecting region includes an elongate structure extending between a lateral edge of the first tooth-clasping element and a lateral edge of the second tooth-clasping element.

Example 26

The thin-shell tooth-positioning appliance of any of examples 21-25, further comprising an aperture disposed between the first flexible interconnecting element and the second interconnecting element.

Example 27

The thin-shell tooth-positioning appliance of any of examples 21-26, further comprising an occlusal connecting zone joining the first tooth-clasping element and the second tooth-clasping element.

Example 28

The thin-shell tooth-positioning appliance of example 27, wherein the flexible interconnecting region is more flexible than the occlusal connecting zone.

Example 29

The thin-shell tooth-positioning appliance of any of examples 27 and 28, wherein the first flexible interconnecting region is more flexible than the occlusal connecting zone and the second flexible interconnecting region is more flexible than the occlusal connecting zone.

Example 30

The thin-shell tooth-positioning appliance of any of examples 27-29, further comprising: a first aperture disposed between the first flexible interconnecting element and the second interconnecting element; and a second aperture disposed between the flexible interconnecting region and the occlusal connecting zone.

Example 31

The thin-shell tooth-positioning appliance of any of examples 21-30, wherein the first tooth-clasping element, the second tooth-clasp element, and the flexible interconnecting region are formed integrally as a monolithic single piece of material.

Example 32

The thin-shell tooth-positioning appliance of any of examples 21-31, wherein the first flexible interconnecting element is offset from the second interconnecting element in an occlusal direction.

Example 33

A dental model for forming a thin-shell tooth-positioning appliance, comprising: surface contours representing at least a portion of a patient's dentition; and a raised support region joined to a portion of the surface contours, the support region being disposed between a gingival region of the surface contours and an occlusal region of the surface contours.

Example 34

The dental model of example 33, wherein the raised support region is raised in a direction approximately normal to the surface contours.

Example 35

The dental model of any of examples 33 and 34, wherein the raised support region is disposed over a region of the surface contours corresponding to an interproximal region of the patient's dentition.

Example 36

The dental model of any of examples 33-35, wherein the raised support region includes a portion is offset in an occlusal direction from the gingival region of the surface contours.

Example 37

The dental model of any of examples 33-36, wherein the raised support region is disposed over a region of the surface contours corresponding to gingival tissue of the patient's dentition.

Example 38

The dental model of any of examples 33-37, wherein the dental model further comprises a base joined to the gingival region of the surface contours.

Example 39

The dental model of any of examples 33-38, wherein the raised support region includes a protrusion on the surface contours sized to support a flexible interconnecting region.

Example 40

The dental model of any of examples 33-39, wherein the raised support region includes a first protrusion on the surface contours sized to support a first flexible interconnecting region and a second protrusion on the surface contours sized to support a second flexible interconnecting region.

Example 41

The dental model of example 40, wherein the first protrusion is separated from the second protrusion by a region of the surface contours that are not raised.

Example 42

The dental model of any of examples 33-41, wherein the dental model is formed by a rapid prototyping machine based on a digital model.

Example 43

The dental model of example 42, wherein the digital model is based on surface contours of a patient's dentition and includes modifications to the surface contours to form the raised support region.

Example 44

A method of forming a thin-shell tooth-positioning appliance comprising: receiving a digital model representing surface contours of a patient's dentition; modifying the digital model to add a raised support region; fabricating a physical model based on the modified digital model; and vacuum-forming a thermoplastic material over the modified digital model to form a thin-shell tooth-positioning appliance.

Example 45

The method of example 44, further comprising: trimming the thin-shell tooth-positioning appliance to remove excess vacuum-formed thermoplastic material.

Example 46

The method of any of examples 44 and 45, wherein the modifying the digital model includes altering a surface of the digital model in a region shaped to support a flexible interconnecting element.

Example 47

The method of example 46, wherein the altering the surface of the digital model in the region includes expanding the surface of the model out in a direction approximately normal to the surface.

Example 48

The method of any of examples 44-47, wherein at least one of a shape, size, or position of the raised support region is specific to the patient.

Example 49

The method of any of examples 44-48, further comprising: joining a gingival region of the digital model to a base structure that is separate from the raised support region.

Example 50

The method of example 49, wherein the base structure is selected from a library of one or more base structures that are usable for multiple patients.

Example 51

A thin-shell tooth-positioning appliance for adjusting positions of teeth of a patient, comprising: a first tooth-clasping element for removably engaging a first tooth of a patient; a second tooth-clasping element for removably engaging a second tooth of the patient, the second tooth-clasping element being configured to engage the second tooth in a tipped orientation in which an occlusal portion of the second tooth is tipped away from the first tooth; and a flexible interconnecting region disposed between the first tooth-clasping element and the second tooth-clasping element, the flexible interconnecting region including a flexible interconnecting element joining the first tooth-clasping element to the second tooth-clasping element.

Example 52

The thin-shell tooth-positioning appliance of example 51, wherein the flexible interconnecting element is configured to apply a movement force on the second tooth in a direction toward the first tooth.

Example 53

The thin-shell tooth-positioning appliance of example 52, wherein the flexible interconnecting element is configured to apply the movement force while maintaining the tipped orientation of the second tooth.

Example 54

The thin-shell tooth-positioning appliance of any of examples 52 and 53, wherein the flexible interconnecting element includes a curved interconnecting element.

Example 55

The thin-shell tooth-positioning appliance of example 54, wherein the curved interconnecting element is pre-loaded to apply the movement force to the second tooth.

Example 56

The thin-shell tooth-positioning appliance of any of examples 54 and 55, wherein the curved interconnecting element is configured to apply force directed to a gingival portion of a crown of the second tooth.

Example 57

The thin-shell tooth-positioning appliance of example 56, wherein the curved interconnecting element is configured to apply a greater force to the gingival portion of the crown of the second tooth than to an occlusal portion of the crown of the second tooth.

Example 58

The thin-shell tooth-positioning appliance of any of examples 54-57, wherein the curved interconnecting element is configured to apply a force to the second tooth at a position on the second tooth that is below a midpoint between a gingival margin of the second tooth and an occlusion of the second tooth.

The above disclosure sets forth a number of embodiments that are described in detail with respect to the accompanying drawings. Those skilled in this art will appreciate that various changes, modifications, other structural arrangements, and other embodiments could be practiced under the teachings of the present disclosure without departing from the scope of this disclosure.

What is claimed is:

1. A thin-shell tooth-positioning appliance for adjusting positions of teeth of a patient, comprising:
   a plurality of disjoint tooth-clasping elements for removably engaging teeth of a patient, the tooth-clasping elements including a region of the thin shell tooth-positioning appliance having recesses for receiving teeth, the plurality of tooth-clasping elements including a first tooth-clasping element and a second tooth-clasping element that are separated by a cut-away area forming an opening in the thin shell between the first tooth-clasping element and the second tooth-clasping element, over an occlusal surface in an interproximal area that extends in a gingival direction, wherein the cut-away area penetrates completely through both buccal and lingual sides of a portion of the thin shell between the first tooth-clasping element and the second tooth-clasping element, the cut-away area having a first edge and a second edge opposite to each other; and
   a first curved, u-shaped flexible interconnecting element comprising a first arm and a second arm formed from the thin shell that connects the tooth-clasping elements, the first curved, u-shaped flexible interconnecting element including a curved portion configured to be positioned at an interdental region of the teeth and overlap a gum region of the patient when the thin-shell tooth-positioning appliance is worn by the patient and wherein the first curved, u-shaped flexible interconnecting element joins the first tooth-clasping element and the second tooth-clasping element, wherein the first arm is interconnected to the first tooth-clasping element and the second arm is interconnected with the second tooth-clasping element.

2. The thin-shell tooth-positioning appliance of claim 1, wherein the plurality of tooth-clasping elements are formed integrally with the at least one flexible interconnecting element as a monolithic single piece of material.

3. The thin-shell tooth-positioning appliance of claim 2, wherein a topography of the at least one flexible interconnecting element is different than a topography of the plurality of the tooth-clasping elements.

4. The thin-shell tooth-positioning appliance of claim 1, wherein the first and second tooth-clasping elements are configured to secure the thin-shell tooth-positioning appliance to multiple teeth.

5. The thin-shell tooth-positioning appliance of claim 1, wherein at least one of the plurality of the tooth-clasping elements is configured to mate with a bonded attachment secured to the teeth of the patient.

6. The thin-shell tooth-positioning appliance of claim 5, wherein the at least one of the plurality of the tooth-clasping elements includes at least one rigid border region positioned to surround the bonded attachment when the thin-shell tooth-positioning appliance is worn by the patient.

7. The thin-shell tooth-positioning appliance of claim 1, wherein the at least one flexible interconnecting elements include a region of the thin shell tooth-positioning appliance that has a plurality of voids passing therethrough.

8. The thin-shell tooth-positioning appliance of claim 1, wherein at least a portion of the flexible interconnecting element is formed based on expanded gum tissue so as to be offset from the patient's actual gum tissue when the appliance is worn by the patient.

9. The thin-shell tooth-positioning appliance of claim 1, further comprising a second curved, u-shaped flexible interconnecting element comprising a first arm and a second arm formed from the thin shell, the second curved, u-shaped flexible interconnecting element including a curved portion configured to be positioned at an interdental region between the teeth and overlap a gum region of the patient when the thin-shell tooth-positioning appliance is worn by the patient and wherein the second curved, u-shaped flexible interconnecting element joins the second tooth-clasping element and a third tooth-clasping element, wherein the first arm of the second curved, u-shaped flexible interconnecting element is interconnected to the second tooth-clasping element and the second arm of the second curved, u-shaped flexible interconnecting element is interconnected with the third tooth-clasping element.

10. The thin-shell tooth-positioning appliance of claim 9, wherein the first curved, u-shaped flexible interconnecting element and the second curved, u-shaped flexible interconnecting element are both similarly shaped.

11. The thin-shell tooth-positioning appliance of claim 9, wherein the first curved, u-shaped flexible interconnecting element and the second curved, u-shaped flexible interconnecting element each have reinforcing ribs formed therein.

* * * * *